United States Patent
Park et al.

(10) Patent No.: US 11,678,264 B2
(45) Date of Patent: *Jun. 13, 2023

(54) WIRELESS COMMUNICATIONS AND POWER CONFIGURATIONS

(71) Applicant: Comcast Cable Communications, LLC, Philadelphia, PA (US)

(72) Inventors: Kyungmin Park, Vienna, VA (US); Esmael Dinan, Herndon, VA (US); Hyoungsuk Jeon, Centreville, VA (US); Hua Zhou, Herndon, VA (US); Alireza Babaei, Fairfax, VA (US); Ali Cirik, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,621

(22) Filed: Dec. 8, 2021

(65) Prior Publication Data

US 2022/0104121 A1 Mar. 31, 2022

Related U.S. Application Data

(63) Continuation of application No. 16/277,110, filed on Feb. 15, 2019, now Pat. No. 11,228,974.

(Continued)

(51) Int. Cl.
*H04W 52/02* (2009.01)
*H04W 28/02* (2009.01)
(Continued)

(52) U.S. Cl.
CPC .......... *H04W 52/0212* (2013.01); *H04L 5/00* (2013.01); *H04W 8/24* (2013.01);
(Continued)

(58) Field of Classification Search
CPC ......... H04W 52/0209; H04W 52/0212; H04W 52/0229; H04W 28/0221; H04W 8/24; H04W 74/08; H04W 92/20; H04L 5/00
See application file for complete search history.

(56) References Cited

U.S. PATENT DOCUMENTS

| 8,798,093 B2 | 8/2014 | Wu |
| 9,432,847 B2 | 8/2016 | Yi et al. |

(Continued)

FOREIGN PATENT DOCUMENTS

| CN | 102448060 A | 5/2012 | |
| WO | WO-2017138978 A1 * | 8/2017 | ............ H04W 36/18 |

(Continued)

OTHER PUBLICATIONS

3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).

(Continued)

*Primary Examiner* — Kevin D Mew
(74) *Attorney, Agent, or Firm* — Banner & Witcoff, Ltd.

(57) ABSTRACT

Systems, apparatuses, and methods are described for wireless communications. A wireless device may receive at least one power configuration parameter from a base station. The at least one power configuration parameter may be based on information that the wireless device sends to the base station.

31 Claims, 23 Drawing Sheets

Related U.S. Application Data

(60) Provisional application No. 62/631,401, filed on Feb. 15, 2018.

(51) Int. Cl.
  *H04W 8/24* (2009.01)
  *H04L 5/00* (2006.01)
  *H04W 74/08* (2009.01)
  *H04W 92/20* (2009.01)

(52) U.S. Cl.
  CPC ... *H04W 28/0221* (2013.01); *H04W 52/0209* (2013.01); *H04W 52/0229* (2013.01); *H04W 74/08* (2013.01); *H04W 92/20* (2013.01)

(56) References Cited

U.S. PATENT DOCUMENTS

| | | | |
|---|---|---|---|
| 9,596,674 | B2 | 3/2017 | Somasundaram et al. |
| 2008/0310367 | A1 | 12/2008 | Meylan |
| 2009/0175163 | A1 | 7/2009 | Sammour et al. |
| 2009/0190480 | A1 | 7/2009 | Sammour et al. |
| 2010/0034169 | A1 | 2/2010 | Maheshwari et al. |
| 2012/0069732 | A1 | 3/2012 | Xu et al. |
| 2013/0250828 | A1 | 9/2013 | Chou et al. |
| 2014/0079022 | A1 | 3/2014 | Wang et al. |
| 2014/0171143 | A1 | 6/2014 | Liu et al. |
| 2014/0192775 | A1 | 7/2014 | Li et al. |
| 2015/0016312 | A1 | 1/2015 | Li et al. |
| 2015/0264631 | A1 | 9/2015 | Zhang et al. |
| 2016/0073344 | A1 | 3/2016 | Vutukuri et al. |
| 2016/0192376 | A1 | 6/2016 | Lee et al. |
| 2016/0219474 | A1 | 7/2016 | Singh et al. |
| 2016/0270061 | A1* | 9/2016 | Dinan .................. H04W 48/12 |
| 2017/0041767 | A1 | 2/2017 | Vajapeyam et al. |
| 2017/0150408 | A1 | 5/2017 | Joseph et al. |
| 2017/0202053 | A1 | 7/2017 | Rune |
| 2017/0231011 | A1 | 8/2017 | Park et al. |
| 2017/0311312 | A1* | 10/2017 | Koo .................. H04W 72/0413 |
| 2017/0332291 | A1* | 11/2017 | Sirotkin ............... H04W 24/10 |
| 2018/0006770 | A1 | 1/2018 | Guo et al. |
| 2018/0083688 | A1 | 3/2018 | Agiwal et al. |
| 2018/0098311 | A1 | 4/2018 | Hong et al. |
| 2018/0110047 | A1 | 4/2018 | Babaei et al. |
| 2018/0124642 | A1 | 5/2018 | Phuyal et al. |
| 2018/0124825 | A1 | 5/2018 | Lee et al. |
| 2018/0199328 | A1 | 7/2018 | Sang et al. |
| 2018/0249390 | A1 | 8/2018 | Agiwal et al. |
| 2018/0279168 | A1* | 9/2018 | Jheng ..................... H04L 5/001 |
| 2018/0279169 | A1 | 9/2018 | Wang et al. |
| 2018/0279182 | A1 | 9/2018 | Sang et al. |
| 2018/0279193 | A1 | 9/2018 | Park et al. |
| 2018/0279204 | A1 | 9/2018 | Kim et al. |
| 2018/0279218 | A1 | 9/2018 | Park et al. |
| 2018/0279262 | A1 | 9/2018 | Babaei et al. |
| 2018/0279401 | A1 | 9/2018 | Hong et al. |
| 2018/0287677 | A1 | 10/2018 | Nagaraja et al. |
| 2018/0343646 | A1* | 11/2018 | Chou .................. H04W 16/14 |
| 2018/0352601 | A1 | 12/2018 | Park et al. |
| 2018/0359783 | A1* | 12/2018 | Abedini ........... H04W 74/0833 |
| 2018/0367288 | A1 | 12/2018 | Vizic et al. |
| 2018/0368107 | A1 | 12/2018 | Babaei et al. |
| 2019/0007993 | A1 | 1/2019 | Bergquist et al. |
| 2019/0037635 | A1 | 1/2019 | Guo et al. |
| 2019/0053325 | A1 | 2/2019 | Yu et al. |
| 2019/0116613 | A1* | 4/2019 | Abedini ............... H04W 74/02 |
| 2019/0132790 | A1 | 5/2019 | Lee et al. |
| 2019/0150220 | A1 | 5/2019 | Byun et al. |
| 2019/0174311 | A1 | 6/2019 | Hayashi et al. |
| 2019/0268799 | A1 | 8/2019 | Hong et al. |
| 2019/0320483 | A1 | 10/2019 | Palat et al. |
| 2020/0092814 | A1* | 3/2020 | Zhou .................. H04W 76/28 |
| 2020/0296765 | A1 | 9/2020 | Kim et al. |
| 2021/0029737 | A1 | 1/2021 | Pan et al. |

FOREIGN PATENT DOCUMENTS

| | | |
|---|---|---|
| WO | 2018143703 A1 | 8/2018 |
| WO | 2018147677 A1 | 8/2018 |
| WO | 2018175199 A1 | 9/2018 |
| WO | 2018183085 A1 | 10/2018 |
| WO | 2018202933 A1 | 11/2018 |
| WO | 2018203736 A1 | 11/2018 |
| WO | 2018231425 A1 | 12/2018 |
| WO | 2018237001 A1 | 12/2018 |
| WO | 2019139530 A1 | 7/2019 |

OTHER PUBLICATIONS

3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).

3GPP TS 38.463 V0.2.0 (Apr. 2018), Technical Specification, 3rd Generation Partnership Project; Technical Specification Group Radio Access Network; NG-RAN; E1 application protocol (E1AP) (Release 15).

3GPP TS 38.473 V15.0.0 (Dec. 2017), Technical Specification, 3rd Generation Partnership Project; Technical Specification Group Radio Access Network; NG-RAN; F1 application protocol (F1AP) (Release 15).

3GPP TS 38.473 V15.3.0 (Sep. 2018), Technical Specification, 3rd Generation Partnership Project; Technical Specification Group Radio Access Network; NG-RAN; F1 application protocol (F1AP) (Release 15).

R2-1801279 3GPP TSG-RAN WG2 AH, Vancouver, Canada, Jan. 22-26, 2018, Source: LG Electronics Inc., Title: Restart condition of sCellDeactivationTimer with skipping operation.

R2-1712238 3GPP TSG-RAN WG2 Meeting #100, Reno, USA, Nov. 27-Dec. 1, 2017, Source: OPPO, Title: Discussion on Detailed Issues on RLM.

R2-1712276 3GPP TSG-RAN WG2 Meeting #100, Reno, USA, Nov. 27-Dec. 1, 2017, Source: Spreadtrum Communications, Title: Discussions on the IS and OOS Counting Procedure.

R2-1712308 3GPP TSG-RAN WG2 Meeting #100, Reno, USA, Nov. 27-Dec. 1, 2017, Source: TCL, Title: Interaction between PDCP and RLC Entities for duplication in NR-NR DC.

R2-1712435 3GPP TSG-RAN WG2 Meeting #100, Reno, USA, Nov. 27-Dec. 1, 2017, Source: ZTE Corporation, Title: Consideration on PDCP Duplication in NR.

R2-1712559 3GPP TSG-RAN WG2 Meeting #100, Reno, USA, Nov. 27-Dec. 1, 2017, Source: Huawei, HiSilicon, Title: RLF for NR.

R2-1712736 3GPP TSG-RAN WG2 Meeting #100, Reno, USA, Nov. 27-Dec. 1, 2017, Source: Huawei, ASUSTeK, HiSilicon, Title: PDCP operation for packet duplication.

R2-1712737 3GPP TSG-RAN WG2 Meeting #100, Reno, USA, Nov. 27-Dec. 1, 2017, Source: Huawei, HiSilicon, Title: PDCP data volume calculation for packet duplication.

R2-1712738 3GPP TSG-RAN WG2 Meeting #100, Reno, USA, Nov. 27-Dec. 1, 2017, Source: Huawei, HiSilicon, Title: Clarification on bearer type for packet duplication.

R2-1712739 3GPP TSG-RAN WG2 Meeting #100, Reno, USA, Nov. 27-Dec. 1, 2017, Source: Huawei, HiSilicon, Title: Enhancements for DL packet duplication.

R2-1712753 3GPP TSG-RAN WG2 Meeting #100, Reno, USA, Nov. 27-Dec. 1, 2017, Source: vivo, Title: RLM/RLF in NR.

R2-1712914 3GPP TSG-RAN WG2 Meeting #100, Reno, USA, Nov. 27-Dec. 1, 2017, Source: Lenovo, Motorola Mobility, Title: PDCP packet duplication.

R2-1712926 3GPP TSG-RAN WG2 Meeting #100, Reno, USA, Nov. 27-Dec. 1, 2017, Source: Ericsson, Title: PDCP duplication and discard.

R2-1712928 3GPP TSG-RAN WG2 Meeting #100, Reno, USA, Nov. 27-Dec. 1, 2017, Source: Ericsson, Title: PDCP duplication for AM operation.

(56) References Cited

OTHER PUBLICATIONS

R2-1712929 3GPP TSG-RAN WG2 Meeting #100, Reno, USA, Nov. 27-Dec. 1, 2017, Source: Ericsson, Title: PDCP duplication transmit procedure.
R2-1712932 3GPP TSG-RAN WG2 Meeting #100, Reno, USA, Nov. 27-Dec. 1, 2017, Source: Ericsson, Title: PDCP data volume reporting in duplication.
R2-1712964 3GPP TSG-RAN WG2 Meeting #100, Reno, USA, Nov. 27-Dec. 1, 2017, Source: Samsung, Title: Discussion on PDCP data volume calculation during PDCP Duplication.
R2-1712965 3GPP TSG-RAN WG2 Meeting #100, Reno, USA, Nov. 27-Dec. 1, 2017, Source: Institute for Information Industry (III), Title: Discussion on Uplink Packet Duplication.
R2-1713004 3GPP TSG-RAN WG2 Meeting #100, Reno, USA, Nov. 27-Dec. 1, 2017, Source: vivo, Title: Layer-2 behaviors of PDCP duplication deactivation.
R2-1713005 3GPP TSG-RAN WG2 Meeting #100, Reno, USA, Nov. 27-Dec. 1, 2017, Source: vivo, Title: PDCP duplication impacts on LCP.
R2-1713006 3GPP TSG-RAN WG2 Meeting #100, Reno, USA, Nov. 27-Dec. 1, 2017, Source: vivo, Title Discussion on the PDCP data volume.
R2-1713009 3GPP TSG-RAN WG2 Meeting #100, Reno, USA, Nov. 27-Dec. 1, 2017, Source: vivo, Title: UE layer-2 behaviors at Scell-failure.
R2-1713584 3GPP TSG-RAN WG2 Meeting #100, Reno, USA, Nov. 27-Dec. 1, 2017, Source: Qualcomm Incorporated, Title: PDCP duplication.
R2-1713588 3GPP TSG-RAN WG2 Meeting #100, Reno, USA, Nov. 27-Dec. 1, 2017, Source: Ericsson, Title: Remaining open issues of RLM and RLF in NR.
R2-1713641 3GPP TSG-RAN WG2 Meeting #100, Reno, USA, Nov. 27-Dec. 1, 2017, Source: ITL, Title: Configuration of PDCP duplication on default DRB.
R2-1713829 3GPP TSG-RAN WG2 Meeting #100, Reno, USA, Nov. 27-Dec. 1, 2017, Source: Samsung, Title: Activation and Deactivation of PDCP Duplication.
R2-1713830 3GPP TSG-RAN WG2 Meeting #100, Reno, USA, Nov. 27-Dec. 1, 2017, Source: Samsung, Title: Discussion on CA Duplication.
R2-1713831 3GPP TSG-RAN WG2 Meeting #100, Reno, USA, Nov. 27-Dec. 1, 2017, Source: Samsung, Title: Initial State of Uplink Packet Duplication.
R2-1713848 3GPP TSG-RAN WG2 Meeting #100, Reno, USA, Nov. 27-Dec. 1, 2017, Source: Samsung, Title: The Necessity of Fast RLF Recovery based on T312 in NR.
R2-1800155 3GPP TSG-RAN WG2 AH, Vancouver, Canada, Jan. 22-26, 2018, Source: OPPO, Title: Discussion on behaviour of ConfiguredGrantTimer.
R2-1800165 3GPP TSG-RAN WG2 AH, Vancouver, Canada, Jan. 22-26, 2018, Source: CATT, Title: UE behavior on configured grant timer upon DCI reception.
R2-1800334 3GPP TSG-RAN WG2 AH, Vancouver, Canada, Jan. 22-26, 2018, Source: Ericsson, Title: SPS and BWP inactivity timer interaction.
R2-1800373 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH, Vancouver, Canada, Jan. 22-26, 2018, Source: Samsung Electronics R&D Institute UK, Title: Corrections to preventing simultaneous Type 1 configured grants on SUL and UL.
R2-1800566 3GPP TSG-RAN WG2 AH, Vancouver, Canada, Jan. 22-26, 2018, Source: LG Electronics Inc., Title: BWP timer restart for DL SPS.
R2-1800586 3GPP TSG-RAN WG2 AH, Vancouver, Canada, Jan. 22-26, 2018, Source: Nokia, Nokia Shanghai Bell, Title: Prioritization between dynamic grant and configured grant.
R2-1800587 3GPP TSG-RAN WG2 AH, Vancouver, Canada, Jan. 22-26, 2018, Source: Nokia, Nokia Shanghai Bell, Title: Correction on prioritization between dynamic grant and configured grant.
R2-1800622 3GPP TSG-RAN WG2 AH, Vancouver, Canada, Jan. 22-26, 2018, Source: Samsung, Title: Correction for SPS and Type-2 Configured Grant Calculation.
R2-1800624 3GPP TSG-RAN WG2 AH, Vancouver, Canada, Jan. 22-26, 2018, Source: Samsung, Title: Impact of Flexible Transmission on Configured Grant Operation.
R2-1800659 3GPP TSG-RAN WG2 AH, Vancouver, Canada, Jan. 22-26, 2018, Source: Samsung, Title: Draft CR for correction on SPS and Type-2 configured grant.
R2-1800661 3GPP TSG-RAN WG2 AH, Vancouver, Canada, Jan. 22-26, 2018, Source: Samsung, Title: Draft CR tor flexible configured grant transmission.
R2-1800708 3GPP TSG-RAN WG2 AH, Vancouver, Canada, Jan. 22-26, 2018, Source: Ericsson, Title: Confirmation of Configured UL Grant Type 2 Activation for Multiple Aggregated Cells.
R2-1800709 3GPP TSG-RAN WG2 AH, Vancouver, Canada, Jan. 22-26, 2018, Source: Ericsson, Title: Alignment of terminology for Configured Scheduling and SPS.
R2-1800818 3GPP TSG-RAN WG2 AH, Vancouver, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R3-174611 3GPP TSG-RAN WG3 Meeting #98, Reno, USA, Nov. 27-Dec. 1, 2017, Source: Samsung, KT, Title: Mobility procedures with high layer split.
R3-174612 3GPP TSG-RAN WG3 Meeting #98, Reno, USA, Nov. 27-Dec. 1, 2017, Source: Samsung, KT, Title: Stage 2 TP for TS38.470 on mobility related procedures.
R3-174613 3GPP TSG-RAN WG3 Meeting #98, Reno, USA, Nov. 27-Dec. 1, 2017, Source: Samsung, KT, Title: Stage 3 TP for TS38.473 on mobility related procedures.
R3-174618 3GPP TSG-RAN WG3 Meeting #98, Reno, USA, Nov. 27-Dec. 1, 2017, Source: Samsung, KT, Title: Further discussions on PDCP duplication in high-layer split.
R3-174637 3GPP TSG-RAN WG3 Meeting #98, Reno, USA, Nov. 27-Dec. 1, 2017, Source: Intel Corporation, Title: Flow Control enhancements fordownlink PDCP duplication.
R3-174638 3GPP TSG-RAN WG3 Meeting #98, Reno, USA, Nov. 27-Dec. 1, 2017, Source: Intel Corporation, Title: Flow Control enhancements for uplink PDCP duplication.
R3-174663 3GPP TSG-RAN WG3 Meeting #98, Reno, USA, Nov. 27-Dec. 1, 2017, Source: CMCC, Title: UE initial access procedure for CU-DU architecture.
R3-174769 3GPP TSG-RAN WG3 Meeting #98, Reno, USA, Nov. 27-Dec. 1, 2017, Source: Ericsson, Title: Discard the duplicated transmissions of PDCP PDUs.
R3-174772 3GPP TSG-RAN WG3 Meeting #98, Reno, USA, Nov. 27-Dec. 1, 2017, Source: Ericsson, Title: Benefits of F1AP Transaction IDs.
R3-174773 3GPP TSG-RAN WG3 Meeting #98, Reno, USA, Nov. 27-Dec. 1, 2017, Source: Ericsson, Title: Further discussion about TNL solution for F1-C.
R3-174774 3GPP TSG-RAN WG3 Meeting #98, Reno, USA, Nov. 27-Dec. 1, 2017, Source: Ericsson, Title On parallel transactiosn over F1.
R3-174781 3GPP TSG-RAN WG3 Meeting #98, Reno, USA, Nov. 27-Dec. 1, 2017, Source: Ericsson, Title: Mobility procedures.
R3-174782 3GPP TSG-RAN WG3 Meeting #98, Reno, USA, Nov. 27-Dec. 1, 2017, Source: Ericsson, Title: Content for UE mobility command messages.
R3-174786 3GPP TSG-RAN WG3 Meeting #98, Reno, USA, Nov. 27-Dec. 1, 2017, Source: NTT Docomo, Inc., Title: How to acquire status of re-transmitted packets.
R3-174850 3GPP TSG-RAN WG3 Meeting #98, Reno, USA, Nov. 27-Dec. 1, 2017, Source: NTT Docomo, Inc., Title: Consideration on data volume reporting.

(56) References Cited

OTHER PUBLICATIONS

R3-174854 3GPP TSG-RAN WG3 Meeting #98, Reno, USA, Nov. 27-Dec. 1, 2017, Source: KT Corp., Title: Considerations for F1 Setup Procedure.
R3-180123 3GPP TSG-RAN WG3 NR Ad Hoc, Sophia Antipolis, France, Jan. 22-26, 2018, Source: ZTE, Title: QoS information transfer over F1 interface.
R3-180124 3GPP TSG-RAN WG3 NR Ad Hoc, Sophia Antipolis, France, Jan. 22-26, 2018, Source: ZTE, Title: Update on QoS information transfer for TS38.473.
R3-180139 3GPP TSG-RAN WG3 NR Ad Hoc, Sophia Antipolis, France, Jan. 22-26, 2018, Source: ZTE, Title: NW slicing for high layer functional split.
R3-180164 3GPP TSG-RAN WG3 NR Ad Hoc, Sophia Antipolis, France, Jan. 22-26, 2018, Source: CATT, Title: TP for 38.401 BL on UE Reconfiguration Completion procedure.
R3-180179 3GPP TSG-RAN WG3 NR Ad Hoc, Sophia Antipolis, France, Jan. 22-26, 2018, Source: CATT, Title: Discussion on UE Context Management procedure.
R3-180180 3GPP TSG-RAN WG3 NR Ad Hoc, Sophia Antipolis, France, Jan. 22-26, 2018, Source: CATT, Title: TP for TS 38.473 on UE Context Management procedure.
R3-180188 3GPP TSG-RAN WG3 NR Ad Hoc, Sophia Antipolis, France, Jan. 22-26, 2018, Source: Nokia, Nokia Shanghai Bell, Title: QoS handling for F1.
R3-180189 3GPP TSG-RAN WG3 NR Ad Hoc, Sophia Antipolis, France, Jan. 22-26, 2018, Source: Nokia, Nokia Shanghai Bell, Title: TP of QoS handling for F1 (TS38.473).
R3-180190 3GPP TSG-RAN WG3 NR Ad Hoc, Sophia Antipolis, France, Jan. 22-26, 2018, Source: Nokia, Nokia Shanghai Bell, KT, Title: User inactivity monitoring.
R3-180234 3GPP TSG-RAN WG3 NR Ad Hoc, Sophia Antipolis, France, Jan. 22-26, 2018, Source: LG Electronics Inc., KT Corp., Title: QoS aspect in UE context management function.
R3-180235 3GPP TSG-RAN WG3 NR Ad Hoc, Sophia Antipolis, France, Jan. 22-26, 2018, Source: LG Electronics Inc., KT Corp., Title: Stage 3 on QoS aspect in UE context management function.
R3-180244 3GPP TSG-RAN WG3 NR Ad Hoc, Sophia Antipolis, France, Jan. 22-26, 2018, Source: Samsung, KT, Title: UE context management update considering parameters over X2 for EN-DC.
R3-180285 3GPP TSG-RAN WG3 NR Ad Hoc, Sophia Antipolis, France, Jan. 22-26, 2018, Source: Samsung, KT, Title: User inactivity monitoring in CU-DU architecture.
R3-180286 3GPP TSG-RAN WG3 NR Ad Hoc, Sophia Antipolis, France, Jan. 22-26, 2018, Source: Samsung, KT, Title: TP for TS 38.473 on user inactivity monitoring.
R3-180300 3GPP TSG-RAN WG3 NR Ad Hoc, Sophia Antipolis, France, Jan. 22-26, 2018, Source: NEC, Title: RLC Mode indication in F1AP.
R3-180330 3GPP TSG-RAN WG3 NR Ad Hoc, Sophia Antipolis, France, Jan. 22-26, 2018, Source: CMCC, Title: QoS management over F1.
R3-180343 3GPP TSG-RAN WG3 NR Ad Hoc, Sophia Antipolis, France, Jan. 22-26, 2018, Source: Huawei, Title: Further discussions on QoS info transfer over F1.
R3-180344 3GPP TSG-RAN WG3 NR Ad Hoc, Sophia Antipolis, France, Jan. 22-26, 2018, Source: Huawei, Title: pCR to 38.473 on QoS info transfer over F1.
R3-180352 3GPP TSG-RAN WG3 NR Ad Hoc, Sophia Antipolis, France, Jan. 22-26, 2018, Source: Huawei, Title: Further discussions on UE context management.
R3-180355 3GPP TSG-RAN WG3 NR Ad Hoc, Sophia Antipolis, France, Jan. 22-26, 2018, Source: Huawei, Title: CR to BL 38.473 on inter-gNB-DU or intra-gNB-DU handover case for SA operation.
R3-180356 3GPP TSG-RAN WG3 NR Ad Hoc, Sophia Antipolis, France, Jan. 22-26, 2018, Source: Huawei, Title: pCR to 38.473 on the introduction of Handover Preparation Information for SA Operation.
R3-180357 3GPP TSG-RAN WG3 NR Ad Hoc, Sophia Antipolis, France, Jan. 22-26, 2018, Source: Huawei, Title: Further discussions on the content of serving cell info.
R3-180367 3GPP TSG-RAN WG3 NR Ad Hoc, Sophia Antipolis, France, Jan. 22-26, 2018, Source: Huawei, Title: Further discussions on confirmation to gNB-DU about completion of RRC messages.
R3-180425 3GPP TSG-RAN WG3 NR Ad Hoc, Sophia Antipolis, France, Jan. 22-26, 2018, Source: Ericsson, Title: UE radio capabilities over F1.
R3-180426 3GPP TSG-RAN WG3 NR Ad Hoc, Sophia Antipolis, France, Jan. 22-26, 2018, Source: Ericsson, Title: Cell information over F1.
R3-180427 3GPP TSG-RAN WG3 NR Ad Hoc, Sophia Antipolis, France, Jan. 22-26, 2018, Source: Ericsson, Title: UE Context Setup over the F1.
R3-180428 3GPP TSG-RAN WG3 NR Ad Hoc, Sophia Antipolis, France, Jan. 22-26, 2018, Source: Ericsson, Title: UE Reject Indication and gNB-DU admission result.
R3-180429 3GPP TSG-RAN WG3 NR Ad Hoc, Sophia Antipolis, France, Jan. 22-26, 2018, Source: Ericsson, Title: Further analysis on inactivity monitoring.
R3-180430 3GPP TSG-RAN WG3 NR Ad Hoc, Sophia Antipolis, France, Jan. 22-26, 2018, Source: Ericsson, Title: Creation of signalling connection.
R3-180431 3GPP TSG-RAN WG3 NR Ad Hoc, Sophia Antipolis, France, Jan. 22-26, 2018, Source: Ericsson, Title: RRC Container in UE Context Setup Request.
R3-180432 3GPP TSG-RAN WG3 NR Ad Hoc, Sophia Antipolis, France, Jan. 22-26, 2018, Source: Ericsson, Title: RLC mode indication.
R3-180433 3GPP TSG-RAN WG3 NR Ad Hoc, Sophia Antipolis, France, Jan. 22-26, 2018, Source: Ericsson, Title: Introduction of UE Reconfiguration Complete procedure.
R3-180518 3GPP TSG-RAN WG3 NR Ad Hoc, Sophia Antipolis, France, Jan. 22-26, 2018, Source: Ericsson, Vodafone, Title: UE context Setup over the F1.
R3-180596 3GPP TSG-RAN WG3 NR Ad Hoc, Sophia Antipolis, France, Jan. 22-26, 2018, Source: Ericsson, Title: UE Reject Indication.
R3-180599 3GPP TSG-RAN WG3 NR Ad Hoc, Sophia Antipolis, France, Jan. 22-26, 2018, Source: Huawei, Title: pCR to 38.473 on UE context management for mobility handling for SA operation.
R3-180606 3GPP TSG-RAN WG3 NR Ad Hoc, Sophia Antipolis, France, Jan. 22-26, 2018, Source: NTT Docomo, Inc., Title: Summary of offline discussion on CU-DU QoS handling.
R3-180807 3GPP TSG-RAN WG3 Meeting #99, Athens, Greece, Feb. 26-Mar. 2, 2018, Source: CATT, Title: Discussion on activation of PDCP Duplication.
R3-181732 3GPP TSG RAN WG3 Meeting #99bis, Sanya, China, Apr. 16-20, 2018, Source: ZTE, Title: Bearer Context Modification over E1 interface for TS38.460.
R3-181733 3GPP TSG RAN WG3 Meeting #99bis, Sanya, China, Apr. 16-20, 2018, Source: ZTE, Title: Bearer Context Modification over E1 interface for TS38.463.
R3-181735 3GPP TSG RAN WG3 Meeting #99bis, Sanya, China, Apr. 16-20, 2018, Source: ZTE, Title: Discussion on PDCP Count wrap around.
R3-181736 3GPP TSG RAN WG3 Meeting #99bis, Sanya, China, Apr. 16-20, 2018, Source: ZTE, Title: Discussion on E1 interface setup.
R3-181833 3GPP TSG RAN WG3 Meeting #99bis, Sanya, China, Apr. 16-20, 2018, Source: NEC (Rapporteur), Title: Baseline CR for June version of TS 38.401 covering agreements of RAN3#99 on CPUP_Split.
R3-181842 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) Support of change of gNB-CU-UP.
R3-181843 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) FFS resolution for E1 overall procedures.

(56) References Cited

OTHER PUBLICATIONS

R3-181844 3GPP TSG RAN WG3 Meeting #99bis, Sanya, China, Apr. 16-20, 2018, Source: Nokia, Nokia Shanghai Bell, Title: Definition of gNB-CU-CP/UP.
R3-181845 3GPP TSG RAN WG3 Meeting #99bis, Sanya, China, Apr. 16-20, 2018, Source: Nokia, Nokia Shanghai Bell, Title: E1 non-UE associated functions.
R3-181846 3GPP TSG RAN WG3 Meeting #99bis, Sanya, China, Apr. 16-20, 2018, Source: Nokia, Nokia Shanghai Bell, Title: E1 non-UE associated procedures.
R3-181847 3GPP TSG RAN WG3 Meeting #99bis, Sanya, China, Apr. 16-20, 2018, Source: Nokia, Nokia Shanghai Bell, Title: gNB-CU-UP notification function.
R3-181848 3GPP TSG RAN WG3 Meeting #99bis, Sanya, China, Apr. 16-20, 2018, Source: Nokia, Nokia Shanghai Bell, Title: gNB-CU-UP notification procedure.
R3-181849 3GPP TSG RAN WG3 Meeting #99bis, Sanya, China, Apr. 16-20, 2018, Source: Nokia, Nokia Shanghai Bell, Title: Bearer Context Management procedures.
R3-181850 3GPP TSG RAN WG3 Meeting #99bis, Sanya, China, Apr. 16-20, 2018, Source: Nokia, Nokia Shanghai Bell, Title: Signalling transport for E1.
R3-181893 3GPP TSG RAN WG3 Meeting #99bis, Sanya, China, Apr. 16-20, 2018, Source: LG Electronics, KT Corp. Title: Procedures for Security Support in CU-CP/UP Separation.
R3-182056 3GPP TSG RAN WG3 Meeting #99bis, Sanya, China, Apr. 16-20, 2018, Source: LG Electronics, KT Corp. Title: Discussion on Bearer Context Modification.
R3-182078 3GPP TSG RAN WG3 Meeting #99bis, Sanya, China, Apr. 16-20, 2018, Source: Samsung, Title: E1 Interface management procedures.
R3-182079 3GPP TSG RAN WG3 Meeting #99bis, Sanya, China, Apr. 16-20, 2018, Source: Samsung, Title: CU-UP Security Capability indication to CU-CP.
R3-182080 3GPP TSG RAN WG3 Meeting #99bis, Sanya, China, Apr. 16-20, 2018, Source: Samsung, Title: TP for TS 38.463 on E1 interface management.
R3-182081 3GPP TSG RAN WG3 Meeting #9 9bis, Sanya, China, Apr. 16-20, 2018, Source: Samsung, Title: Additional UE-associated E1 procedures.
R3-182082 3GPP TSG RAN WG3 Meeting #99bis, Sanya, China, Apr. 16-20, 2018, Source: Samsung, Title: TP for TS 38.463 on additional UE-associated E1 procedures.
R3-182109 3GPP TSG RAN WG3 Meeting #99bis, Sanya, China, Apr. 16-20, 2018, Source: Huawei, Title: Initial TPs to 38.462.
R3-182110 3GPP TSG RAN WG3 Meeting #99bis, Sanya, China, Apr. 16-20, 2018, Source: Huawei, Title: Rapporteur editorial updates to 38.462.
R3-182129 3GPP TSG RAN WG3 Meeting #99bis, Sanya, China, Apr. 16-20, 2018, Source: Huawei, Title: Inactivity monitoring in CP/UP separation.
R3-182130 3GPP TSG RAN WG3 Meeting #99bis, Sanya, China, Apr. 16-20, 2018, Source: Huawei, Title: (TP for NR BL CR for TS 38.401) On RRC state transition for CP-UP separation.
R3-182131 3GPP TSG RAN WG3 Meeting #99bis, Sanya, China, Apr. 16-20, 2018, Source: Huawei, Title: Data Forwarding in CP/UP separation.
R3-182132 3GPP TSG RAN WG3 Meeting #99bis, Sanya, China, Apr. 16-20, 2018, Source: Huawei, Title: pCR to 38.460 on QoS handling over E1.
R3-182134 3GPP TSG RAN WG3 Meeting #99bis, Sanya, China, Apr. 16-20, 2018, Source: Huawei, Title: pCR to 38.460 on secondary node modification triggered by gNB-CU-CP.
R3-182136 3GPP TSG RAN WG3 Meeting #99bis, Sanya, China, Apr. 16-20, 2018, Source: Huawei, Title: pCR to 38.460 on centralized retransmission for CP-UP separation.
R3-182224 3GPP TSG RAN WG3 Meeting #99bis, Sanya, China, Apr. 16-20, 2018, Source: Ericsson, Title: E1 support for RRC-inactive.
R3-182225 3GPP TSG RAN WG3 Meeting #9 9bis, Sanya, China, Apr. 16-20, 2018, Source: Ericsson, Title: Dual-connectivity configuration over E1.
R3-182226 3GPP TSG RAN WG3 Meeting #99bis, Sanya, China, Apr. 16-20, 2018, Source: Ericsson, Title: Potentials of RAN UP network function virtualization.
R3-182227 3GPP TSG RAN WG3 Meeting #99bis, Sanya, China, Feb. 26-Mar. 2, 2018, Source: Ericsson, Title: PDCP duplication configuration.
R3-182228 3GPP TSG RAN WG3 Meeting #99bis, Sanya, China, Apr. 16-20, 2018, Source: Ericsson, Vodafone, KT, AT&T, Title: Support of RAN UP network function virtualization at handover.
R3-182229 3GPP TSG RAN WG3 Meeting #99bis, Sanya, China, Apr. 16-20, 2018, Source: Ericsson, Title: Support of RAN UP network function virtualization at handover—for 38.300.
R3-182230 3GPP TSG RAN WG3 Meeting #99bis, Sanya, China, Apr. 16-20, 2018, Source: Ericsson, Title: Support of RAN UP network function virtualization at handover—for 38.413.
R3-182231 3GPP TSG RAN WG3 Meeting #99bis, Sanya, China, Apr. 16-20, 2018, Source: Ericsson, Title: Support of Ran Up network function virtualization at handover—for 38.423.
R3-182232 3GPP TSG RAN WG3 Meeting #99bis, Sanya, China, Apr. 16-20, 2018, Source: Ericsson, Title: Support of RAN UP network function virtualization at handover—for 36.300.
R3-182233 3GPP TSG RAN WG3 Meeting #99bis, Sanya, China, Apr. 16-20, 2018, Source: Ericsson, Title: Bearer Context definition.
R3-182234 3GPP TSG RAN WG3 Meeting #99bis, Sanya, China, Apr. 16-20, 2018, Source: Ericsson, Title: Resolve FFS in procedures in TS 38.401.
R3-182235 3GPP TSG RAN WG3 Meeting #99bis, Sanya, China, Apr. 16-20, 2018, Source: Ericsson, Title: Multiple FNL associations over E1.
R3-182237 3GPP TSG RAN WG3 Meeting #99bis, Sanya, China, Apr. 16-20, 2018, Source: Ericsson, Title: E1 Setup procedure.
R3-182238 3GPP TSG RAN WG3 Meeting #99bis, Sanya, China, Apr. 16-20, 2018, Source: Ericsson, Title: E1 Reset procedure.
R3-182239 3GPP TSG RAN WG3 Meeting #99bis, Sanya, China, Apr. 16-20, 2018, Source: Ericsson, Title: E1 Release procedure.
R3-182240 3GPP TSG RAN WG3 Meeting #99bis, Sanya, China, Apr. 16-20, 2018, Source: Ericsson, Title: E1 Error Indication.
R3-182241 3GPP TSG RAN WG3 Meeting #99bis, Sanya, China, Apr. 16-20, 2018, Source: Ericsson, Title: Bearer Context Modification procedure.
R3-182242 3GPP TSG RAN WG3 Meeting #99bis, Sanya, China, Apr. 16-20, 2018, Source: Ericsson, Title: E1 Configuration Update.
R3-172401 3GPP TSG-RAN3 NR AdHoc Meeting, Qingdao, China, Jun. 27-29, 2017, Source: CMCC, Title: gNB ID and NCGI considering CU-DU split.
R3-172417 3GPP TSG-RAN3 NR AdHoc Meeting, Qingdao, China, Jun. 27-29, 2017, Source: ZTE, China Unicom, Title: Discussion on CU DU ID and NCGI.
R3-172418 3GPP TSG-RAN3 NR AdHoc Meeting, Qingdao, China, Jun. 27-29, 2017, Source: ZTE, China Unicom, Title: CUDU ID and NCGI for TS 38.300.
R3-172481 3GPP TSG-RAN3 NR AdHoc Meeting, Qingdao, China, Jun. 27-29, 2017, Source: Samsung, Title: Identification of gNB, gNB-CU/DU, and NR cell.
R3-172484 3GPP TSG-RAN3 NR AdHoc Meeting, Qingdao, China, Jun. 27-29, 2017, Source: Vodafone, Title: Common Radio Resource Management Functional Split for Different Deployment Scenarios.
R3-172511 3GPP TSG-RAN3 NR AdHoc Meeting, Qingdao, China, Jun. 27-29, 2017, Source: Ericsson, Title: Resilience and scalability in a disaggregated gNB.
3GPP TS 36.300 V14.3.0 (Jun. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 38.300 V1.0.0 (Sep. 2017), Technical Specification, 3rd Generation Partnership Project; Technical Specification Group Radio Access Network; NR; NR and NG-RAN; Overall Description; Stage 2 (Release 15).

(56) References Cited

OTHER PUBLICATIONS

R2-1707705 3GPP TSG-RAN2 Meeting #99, Berlin, Germany, Aug. 21-25, 2017, Source: OPPO, Title: Control on UL packet duplication for split bearer.
R2-1707708 3GPP TSG-RAN2 Meeting #99, Berlin, Germany, Aug. 21-25, 2017, Source: OPPO, Title: PDCP operation for UL packet duplication.
R2-1707717 3GPP TSG-RAN2 Meeting #99, Berlin, Germany, Aug. 21-25, 2017, Source: Huawei, HiSilicon, Title: UE behaviors upon deactivation of DC duplication.
R2-1707718 3GPP TSG-RAN2 Meeting #99, Berlin, Germany, Aug. 21-25, 2017, Source: Huawei, ASUSTeK, HiSilicon, Title: RLC behaviors upon duplicate deactivation.
R2-1707719 3GPP TSG-RAN2 Meeting #99, Berlin, Germany, Aug. 21-25, 2017, Source: Huawei, ASUSTeK, HiSilicon, Title: PDCP operation for packet duplication.
R2-1707720 3GPP TSG-RAN2 Meeting #99, Berlin, Germany, Aug. 21-25, 2017, Source: Huawei, HiSilicon, Title: PDCP data volume calculation for packet duplication (Revision of R2-1706484).
R2-1707924 3GPP TSG-RAN2 Meeting #99, Berlin, Germany, Aug. 21-25, 2017, Source: CATT, Title: PDCP Status Report for Duplication.
R2-1707925 3GPP TSG-RAN2 Meeting #99, Berlin, Germany, Aug. 21-25, 2017, Source: CATT, Title: Duplication Bearer Type.
R2-1707982 3GPP TSG-RAN2 Meeting #99, Berlin, Germany, Aug. 21-25, 2017, Source: Nokia, Mediatek, Nokia Shanghai Bell, Title: Initial State of PDCP Duplication (Revision of R2-1706545).
R2-1707990 3GPP TSG-RAN2 Meeting #99, Berlin, Germany, Aug. 21-25, 2017, Source: Nokia, Nokia Shanghai Bell, Title: Duplication Impacts to PDCP.
R2-1708017 3GPP TSG-RAN2 Meeting #99, Berlin, Germany, Aug. 21-25, 2017, Source: Ericsson, Title: Aligned duplication support for DRBs and SRBs.
R2-1708097 3GPP TSG-RAN2 Meeting #99, Berlin, Germany, Aug. 21-25, 2017, Source: MediaTek Inc., Title Stage-2 aspects of data duplication (Revision of R2-1707260).
R2-1708098 3GPP TSG-RAN2 Meeting #99, Berlin, Germany, Aug. 21-25, 2017, Source: MediaTek Inc., Title: Data duplication in NR (Revision of R2-1707261).
R2-1708329 3GPP TSG-RAN2 Meeting #99, Berlin, Germany, Aug. 21-25, 2017, Source: Ericsson, Title: PDCP and RLC behaviour for PDCP data duplication.
R2-1708333 3GPP TSG-RAN2 Meeting #99, Berlin, Germany, Aug. 21-25, 2017, Source: Ericsson, Title: Packet duplication in CA (Revision of R2-1707172).
R2-1708335 3GPP TSG-RAN2 Meeting #99, Berlin, Germany, Aug. 21-25, 2017, Source: Ericsson, Title: PDCP dynamic link switching.
R2-1708336 3GPP TSG-RAN2 Meeting #99, Berlin, Germany, Aug. 21-25, 2017, Source: Ericsson, Title: PDCP data volume reporting in duplication (Revision of R2-1704370).
R2-1708337 3GPP TSG-RAN2 Meeting #99, Berlin, Germany, Aug. 21-25, 2017, Source: Ericsson, Title: PDCP duplication control related to SCell control.
R2-1708444 3GPP TSG-RAN2 Meeting #99, Berlin, Germany, Aug. 21-25, 2017, Source: Samsung, Title: Discussion on PDCP data volume calculation.
R2-1708489 3GPP TSG-RAN2 Meeting #99, Berlin, Germany, Aug. 21-25, 2017, Source: Vivo, Title: Duplication deactivation due to SCell or BWP deactivation.
R2-1708508 3GPP TSG-RAN2 Meeting #99, Berlin, Germany, Aug. 21-25, 2017, Source: Vivo, Title: Layer-2 behaviors of PDCP duplication activation deactivation.
R2-1708573 3GPP TSG-RAN2 Meeting #99, Berlin, Germany, Aug. 21-25, 2017, Source: Panasonic, Title: Packet duplication during the handover.
R2-1708624 3GPP TSG-RAN2 Meeting #99, Berlin, Germany, Aug. 21-25, 2017, Source: Lenovo, Motorola Mobility Title: PDCP packet duplication.
R2-1708691 3GPP TSG-RAN2 Meeting #99, Berlin, Germany, Aug. 21-25, 2017, Source: Huawei, HiSilicon, Title: Remaining stage 2 issues for CA duplication and for DC duplication.
R2-1708735 3GPP TSG-RAN2 Meeting #99, Berlin, Germany, Aug. 21-25, 2017, Source: InterDigital Inc., Title: Details of duplication and routing for SRB.
R2-1708821 3GPP TSG-RAN2 Meeting #99, Berlin, Germany, Aug. 21-25, 2017, Source: Intel Corporation, Title: Support of CA packet duplication for RLC AM.
R2-1708862 3GPP TSG-RAN2 Meeting #99, Berlin, Germany, Aug. 21-25, 2017, Source: Fujitsu, Title: Stage 2 TP tor RLC AM duplication.
R2-1708950 3GPP TSG-RAN2 Meeting #99, Berlin, Germany, Aug. 21-25, 2017, Source: Qualcomm Incorporated, Title: Further considerations for Packet duplication.
R2-1708951 3GPP TSG-RAN2 Meeting #99, Berlin, Germany, Aug. 21-25, 2017, Source: Qualcomm Incorporated, Title: PDCP duplication.
R2-1709032 3GPP TSG-RAN2 Meeting #99, Berlin, Germany, Aug. 21-25, 2017, Source: Samsung, Title: PDCP Duplication Operations (Revision of R2-177368).
R2-1709036 3GPP TSG-RAN2 Meeting #99, Berlin, Germany, Aug. 21-25, 2017, Source: Samsung, Title: Uplink DRB Duplication.
R2-1709061 3GPP TSG-RAN2 Meeting #99, Berlin, Germany, Aug. 21-25, 2017, Source: LG Electronics Inc., Title: Discussion on the duplicate detection in PDCP.
R2-1709077 3GPP TSG-RAN2 Meeting #99, Berlin, Germany, Aug. 21-25, 2017, Source: ITRI, Title: SCG Failure Case for Duplication SRB.
R2-1709095 3GPP TSG-RAN2 Meeting #99, Berlin, Germany, Aug. 21-25, 2017, Source: LG Electronics Inc., Title: Need for Duplicate RB.
R2-1709100 3GPP TSG-RAN2 Meeting #99, Berlin, Germany, Aug. 21-25, 2017, Source: LG Electronics Inc., Title: Packet duplication in PDCP (Revision of R2-1706870).
R2-1709870 3GPP TSG-RAN2 Meeting #99, Berlin, Germany, Aug. 21-25, 2017, Source: Ericsson, Title: TP on Radio Link Failure for 38.300.
R3-173128 3GPP TSG-RAN2 Meeting #99, Berlin, Germany, Aug. 21-25, 2017, Source: Huawei, Title: PDCP duplication for CU-DU.
R2-1800376 3GPP TSG-RAN WG2 NR Ad Hoc, Vancouver, Canada, Jan. 22-26, 2018, Source: Huawei, HiSilicon, Title: CR on the prioritization between dynamic scheduling and configured scheduling.
R2-1800158 3GPP TSG-RAN WG2 AH, Vancouver, Canada, Jan. 22-26, 2018, Source: OPPO, Title: CR on ConfiguredGrantTimer for C-RNTI based grant.
R2-1800647 3GPP TSG-RAN WG2 AH, Vancouver, Canada, Jan. 22-26, 2018, Source: OPPO, Title: Correction on ConfiguredGrantTimer.
R2-1800710 3GPP TSG-RAN WG2 AH, Vancouver, Canada, Jan. 22-26, 2018, Source: Ericsson, Title: Alignment of terminology for Configured Scheduling and SPS.
R2-1801053 3GPP TSG-RAN WG2 AH, Vancouver, Canada, Jan. 22-26, 2018, Source: LG Electronics Inc., Title: Correction on ConfiguredGrantTimer.
R2-162709 3GPP TSG-RAN WG2 Meeting #93bis, Dubrovnik, Croatia, Apr. 11-15, 2016, Source: Beam support in NR.
May 27, 2019—Extended European Search Report—19155025.0.
NTT Docomo, Inc.: "F1 interface: Radio resource configuration management", May 15-19, 2017.
CMCC: "System information generation and delivery in CU-DU split architecture", Aug. 21-25, 2017.
ZTE: "Discussion on the solution for UE Initial Access", Oct. 9-13, 2017.
Feb. 27, 2019—EP Search Report—19151430.6.
May 14, 2017—TP for UE Radio Bearer Management.
Nokia—May 1, 2010—"Enabling MRO in case of re-establishment request in unprepared eNB".
Apr. 8, 2019—Exended European Search Report—EP 19151473.6.
ZTE—Consideration on the activation or deactivation of duplication—Nov. 17, 2017.

(56) References Cited

OTHER PUBLICATIONS

CATT—Discussion on CA based PDCP Duplication—Sep. 30, 2017.
3GPP Standard—"3rd Generation Partnership Project: Technical Specificaiton Group Radio Access Network; NG-RAN; F1 application protocol (F1AP) (Release 15)"—Dec. 11, 2017.
3GPP Standard—"3rd Generation Partnership Project; Technical Specification Group Radio Access Network NR Radio Resource Control (RRC) protocol specification (Release 15)"—Jan. 4, 2018.
Aug. 6, 2019—European Extended Search Report—EP 19157448.2.
3GPP TSG-RAN WG2 #100: "Discussion on Inter-nodeRRC container", Dec. 1, 2017.
3GPP TSG-RAN Meeting #76: "Miscellaneous general corrections and clarifications resulting from ASN.1 review", Jun. 5, 2017.
R1-1704159 3GPP TSG-RAN WG2 Meeting #98, Hangzhou, China, May 15-19, 2017, Source: Samsung, Title: Random Access Response in NR.
R1-1704672 3GPP TSG-RAN WG2 Meeting #98, Hangzhou, China, May 15-19, 2017, Source: ZTE, Title: Consideration on the 4-step random access procedure.
R2-1704901 3GPP TSG-RAN WG2 Meeting #98, Hangzhou, China, May 15-19, 2017, Source: Qualcomm Incorporated, Title: Prioritized random access in NR.
R3-172102 3GPP TSG-RAN3 NR AdHoc Meeting, Qingdao, China, Jun. 27-29, 2017, Source: China Telecom, Title: On the preliminary transport comparison between F1-C and F1-U protocols.
R3-172176 3GPP TSG-RAN3 NR AdHoc Meeting, Qingdao, China, Jun. 27-29, 2017, Source: Huawei, Title: F1AP procedures for RRC Connection Setup.
R3-172178 3GPP TSG-RAN3 NR AdHoc Meeting, Qingdao, China, Jun. 27-29, 2017, Source: Huawei, Title: TP on Transmitting RRC Connection Setup message over F1 to 38.470.
R3-172198 3GPP TSG-RAN3 NR AdHoc Meeting, Qingdao, China, Jun. 27-29, 2017, Source: Huawei, Title: Discussions on F1 interface management.
R3-172199 3GPP TSG-RAN3 NR AdHoc Meeting, Qingdao, China, Jun. 27-29, 2017, Source: Huawei, Title: TP on F1 interface management to 38.470.
R3-172200 3GPP TSG-RAN3 NR AdHoc Meeting, Qingdao, China, Jun. 27-29, 2017, Source: Huawei, HiSilicon, Title: TP on F1 interface management procedures to 38.473.
R3-172209 3GPP TSG-RAN3 NR AdHoc Meeting, Qingdao, China, Jun. 27-29, 2017, Source: Chinatelecom, Title: gNB and gNB-CU ID discussion.
R3-172218 3GPP TSG-RAN3 NR AdHoc Meeting, Qingdao, China, Jun. 27-29, 2017, Source: CATT, Title: Discussion on the F1AP functions necessary for Option 3.
R3-172244 3GPP TSG-RAN3 NR AdHoc Meeting, Qingdao, China, Jun. 27-29, 2017, Source: Samsung, KT, SK Telecom, Title: Centralized retransmission of lost PDUs.
R3-172250 3GPP TSG-RAN3 NR AdHoc Meeting, Qingdao, China, Jun. 27-29, 2017, Source: Samsung, KT, SK Telecom, Title: On-demand SI support in high layer functional split.
R3-172251 3GPP TSG-RAN3 NR AdHoc Meeting, Qingdao, China, Jun. 27-29, 2017, Source: Samsung, KT, SK Telecom, Title: Stage 2 text proposal for TS38.401 on mechanism of centralized retransmission of lost PDUs.
R3-172256 3GPP TSG-RAN3 NR AdHoc Meeting, Qingdao, China, Jun. 27-29, 2017, Source: Samsung, KT, SK Telecom, Title: Stage 2 text proposal for TS38.401 on supporting on-demand SI.
R3-172266 3GPP TSG-RAN3 NR AdHoc Meeting, Qingdao, China, Jun. 27-29, 2017, Source: LG Electronics Inc., Title: Issue on C-RNTI allocation for RRC connection resume.
R3-172309 3GPP TSG-RAN3 NR AdHoc Meeting, Qingdao, China, Jun. 27-29, 2017, Source: Nokia, Alcatel-Lucent Shanghai Bell, Title: Inter-gNB-DU Mobility procedure.
R3-172310 3GPP TSG-RAN3 NR AdHoc Meeting, Qingdao, China, Jun. 27-29, 2017, Source: Nokia, Alcatel-Lucent Shanghai Bell, Title: TP of Inter-gNB-DU Mobility procedure (TS 38.401).
R3-172321 3GPP TSG-RAN3 NR AdHoc Meeting, Qingdao, China, Jun. 27-29, 2017, Source: Nokia, Alcatel-Lucent Shanghai Bell, Title: Retransmission procedure in radio link outage.
R3-172322 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.401).
R3-172323 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.475).
R3-172324 3GPP TSG-RAN3 NR AdHoc Meeting, Qingdao, China, Jun. 27-29, 2017, Source: Nokia, Title: [DRAFT] LS on retransmission procedure in radio link outage.
R3-172333 3GPP TSG-RAN3 NR AdHoc Meeting, Qingdao, China, Jun. 27-29, 2017, Source: Nokia, Alcatel-Lucent Shanghai Bell, Title: UE Initial Access Procedure.
R3-172334 3GPP TSG-RAN3 NR AdHoc Meeting, Qingdao, China, Jun. 27-29, 2017, Source: Nokia, Alcatel-Lucent Shanghai Bell, Title: TP of UE Initial Access procedure (TS 38.401).
R3-172342 3GPP TSG-RAN3 NR AdHoc Meeting, Qingdao, China, Jun. 27-29, 2017, Source: LG Electronics Inc., Title: Consideration on C-RNTI during initial UE access.
R3-172343 3GPP TSG-RAN3 NR AdHoc Meeting, Qingdao, China, Jun. 27-29, 2017, Source: LG Electronics Inc., Title: TP for consideration on C-RNTI during initial UE access.
R3-172344 3GPP TSG-RAN3 NR AdHoc Meeting, Qingdao, China, Jun. 27-29, 2017, Source: LG Electronics Inc., Title: TP for consideration on C-RNTI during initial UE access.
R3-172345 3GPP TSG-RAN3 NR AdHoc Meeting, Qingdao, China, Jun. 27-29, 2017, Source: ZTE, Title: RRC message transmission over F1 interface for TS 38.401.
R3-172346 3GPP TSG-RAN3 NR AdHoc Meeting, Qingdao, China, Jun. 27-29, 2017, Source: ZTE, Title: RRC message transmission over F1 interface for TS 38.470.
R3-172347 3GPP TSG-RAN3 NR AdHoc Meeting, Qingdao, China, Jun. 27-29, 2017, Source: ZTE, Title: RRC message transmission over F1 interface for TS 38.473.
R3-172356 3GPP TSG-RAN3 NR AdHoc Meeting, Qingdao, China, Jun. 27-29, 2017, Source: ZTE, China Telecom, Title: Discussion on flow control over F1-U.
R3-172357 3GPP TSG-RAN3 NR AdHoc Meeting, Qingdao, China, Jun. 27-29, 2017, Source: ZTE, Title: Update on Tow control over F1 interface for TS 38.401.
R3-172358 3GPP TSG-RAN3 NR AdHoc Meeting, Qingdao, China, Jun. 27-29, 2017, Source: ZTE, Title: Flow control aver F1 interface for TS 38.475.
R3-172399 3GPP TSG-RAN3 NR AdHoc Meeting, Qingdao, China, Jun. 27-29, 2017, Source: NEC, Title: How many gNB-DUs can be operated by one gNB-CU.
R3-182243 3GPP TSG RAN WG3 Meeting #99bis, Sanya, China, Apr. 16-20, 2018, Source: Ericsson, Title: Bearer Context Setup procedure.
R2-1713898 3GPP TSG-RAN WG2 Meeting #100, Reno, USA, Nov. 27-Dec. 1, 2017, Source: Samsung, Title: RLM RS type and L3 parameter differentiation.
Dec. 2, 2019—European Extended Search Report—EP 19173901.0.
R3-183279 3GPP TSG-RAN2 Meeting #100, Busan, Korea, May 21-25, 2019, Source: Huawei, Title: pCR to 38.460 on indication of PDCP duplication over E1 interface.
Sep. 15, 2020, European Examination Report, EP 19157448.2.
Oct. 7, 2021—European Office Action—EP 19157448.2.
R2-1800898 3GPP TSG-RAN WG2 AH, Vancouver, Canada, Jan. 22-26, 2018, Source: vivo, Title: Text proposal for repetition of the configured grant.
R2-1800902 3GPP TSG-RAN WG2 AH, Vancouver, Canada, Jan. 22-26, 2018, Source: vivo, Title: Collision between dynamic grant and configured grant.
R2-1800925 3GPP TSG-RAN WG2 AH, Vancouver, Canada, Jan. 22-26, 2018, Source: Intel Corporation, Title: URLLC exception for dynamic grant.

(56) References Cited

OTHER PUBLICATIONS

R2-1801032 3GPP TSG-RAN WG2 AH, Vancouver, Canada, Jan. 22-26, 2018, Source: Huawei, HiSilicon, Title: Leftovers of HARQ Transmission with Configured Grant Timer.
R2-1801033 3GPP TSG-RAN WG2 AH, Vancouver, Canada, Jan. 22-26, 2018, Source: Huawei, HiSilicon, Title Corrections on HARQ Transmission with ConfiguredGrantTimer in TS 38.321.
R2-1801034 3GPP TSG-RAN WG2 AH, Vancouver, Canada, Jan. 22-26, 2018, Source: Huawei, HiSilicon, Title: Corrections on Retransmission for Configured Grant.
R2-1801035 3GPP TSG-RAN WG2 AH, Vancouver, Canada, Jan. 22-26, 2018, Source: Huawei, HiSilicon, Title: Corrections on calculations of transmission occasions of configured grant.
R2-1801036 3GPP TSG-RAN WG2 AH, Vancouver, Canada, Jan. 22-26, 2018, Source: Huawei, HiSilicon, Title: Further discussion on configuration of ConfiguredGrantTimer.
R2-1801037 3GPP TSG-RAN WG2 AH, Vancouver, Canada, Jan. 22-26, 2018, Source: Huawei, HiSilicon, Title: Corrections on flexible occasion of initial transmission and repetition for configured grant.
R2-1801038 3GPP TSG-RAN WG2 AH, Vancouver, Canada, Jan. 22-26, 2018, Source: Huawei, HiSilicon, Title: Impact of SUL on configured grant.
R2-1801039 3GPP TSG-RAN WG2 AH, Vancouver, Canada, Jan. 22-26, 2018, Source: Huawei, HiSilicon, Title: Configured grant Type 1 operation with BWP switch.
R2-1801052 3GPP TSG-RAN WG2 AH, Vancouver, Canada, Jan. 22-26, 2018, Source: LG Electronics Inc., Title: Correction on ConfiguredGrantTimer.
R2-1801063 3GPP TSG-RAN WG2 AH, Vancouver, Canada, Jan. 22-26, 2018, Source: LG Electronics Inc., Title: Repetition transmission on configured uplink grant.
R2-1801081 3GPP TSG-RAN WG2 AH, Vancouver, Canada, Jan. 22-26, 2018, Source: ZTE, Title: Consideration on the configured grant for supporting SUL.
R2-1801125 3GPP TSG-RAN WG2 AH, Vancouver, Canada, Jan. 22-26, 2018, Source: InterDigital Inc., Title: Correction on override of configured assignment by dynamic assignment.
R2-1801126 3GPP TSG-RAN WG2 AH, Vancouver, Canada, Jan. 22-26, 2018, Source: InterDigital Inc., Title: Override of configured grant by dynamic grant in case of URLLC.
R2-1801239 3GPP TSG-RAN WG2 AH, Vancouver, Canada, Jan. 22-26, 2018, Source: LG Electronics Inc., Title: Prioritization between dynamic grant and configured grant for URLLC.
R2-1801277 3GPP TSG-RAN WG2 AH, Vancouver, Canada, Jan. 22-26, 2018, Source: LG Electronics Inc., Title: Restart condition of sCellDeactivationTimer with skipping operation.
R2-1801371 3GPP TSG-RAN WG2 AH, Vancouver, Canada, Jan. 22-26, 2018, Source: Samsung, Title: Remaining Issue on SPS/Grant-free: How to Handle Dynamic Grant Coinciding with Configured Grant.
R2-1801475 3GPP TSG-RAN WG2 AH, Vancouver, Canada, Jan. 22-26, 2018, Source: LG Electronics Inc., Title: Prevention of using CS grant.
R3-174356 3GPP TSG-RAN WG3 Meeting #98, Reno, USA, Nov. 27-Dec. 1, 2017, Source: Nokia, Nokia Shanghai Bell, Title: Transport layer protocol for F1-C.
R3-174357 3GPP TSG-RAN WG3 Meeting #98, Reno, USA, Nov. 27-Dec. 1, Z017, Source: Nokia, Nokia Shanghai Bell, Title: Transport layer protocol for F1-U.
R3-174359 3GPP TSG-RAN WG3 Meeting #98, Reno, USA, Nov. 27-Dec. 1, 2017, Source: Nokia, Nokia Shanghai Bell, Title: UE Initial Access procedure.
R3-174360 3GPP TSG-RAN WG3 Meeting #98, Reno, USA, Nov. 27-Dec. 1, 2017, Source: Nokia, Nokia Shanghai Bell, KT, Title: EFS resolution in intra-gNB-CU mobility.
R3-174361 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.470).
R3-174362 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.473).
R3-174364 3GPP TSG-RAN WG3 Meeting #98, Reno, USA, Nov. 27-Dec. 1, 2017, Source: Nokia, Nokia Shanghai Bell, Title: FFS resolution in Centralized Retransmission.
R3-174396 3GPP TSG-RAN WG3 Meeting #98, Reno, USA, Nov. 27-Dec. 1, 2017, Source: ZTE, China Telecom, Title: Solution for UE Initial Access.
R3-174397 3GPP TSG-RAN WG3 Meeting #98, Reno, USA, Nov. 27-Dec. 1, 2017, Source: ZTE, Title: Update on UE Context Management for TS38.470.
R3-174398 3GPP TSG-RAN WG3 Meeting #98, Reno, USA, Nov. 27-Dec. 1, 2017, Source: ZTE, Title: Update on UE Context Management for TS38.473.
R3-174405 3GPP TSG-RAN WG3 Meeting #98, Reno, USA, Nov. 27-Dec. 1, 2017, Source: ZTE, China Unicom, Title: Remaining Issues of Mobility Aspects.
R3-174408 3GPP TSG-RAN WG3 Meeting #98, Reno, USA, Nov. 27-Dec. 1, 2017, Source: ZTE, Title: Consideration on the activation or deactivation of duplication.
R3-174409 3GPP TSG-RAN WG3 Meeting #98, Reno, USA, Nov. 27-Dec. 1, 2017, Source: ZTE, China Telecom, Title: Remaining Issues of Centralized Retransmissions.
R3-174410 3GPP TSG-RAN WG3 Meeting #98, Reno, USA, Nov. 27-Dec. 1, 2017, Source: ZTE, Title: TP for Centralized Retransmissions kept in TS38.475.
R3-174411 3GPP TSG-RAN WG3 Meeting #98, Reno, USA, Nov. 27-Dec. 1, 2017, Source: ZTE, Title: TP for Centralized Retransmissions kept in TS38.425.
R3-174473 3GPP TSG-RAN WG3 Meeting #98, Reno, USA, Nov. 27-Dec. 1, 2017, Source: Huawei, Title: pCR on open issues for PDCP duplication over F1 to 38.473.
R3-174482 3GPP TSG-RAN WG3 Meeting #98, Reno, USA, Nov. 27-Dec. 1, 2017, Source: Huawei, Title: Further discussions on radio link outage indication.
R3-174533 3GPP TSG-RAN WG3 Meeting #98, Reno, USA, Nov. 27-Dec. 1, 2017, Source: CATT, Title: Discussion on CA based PDCP Duplication.
R3-174535 3GPP TSG-RAN WG3 Meeting #98, Reno, USA, Nov. 27-Dec. 1, 2017, Source: CATT, Title: Discussion on F1 SETUP procedure.
R3-174536 3GPP TSG-RAN WG3 Meeting #98, Reno, USA, Nov. 27-Dec. 1, 2017, Source: CATT, Title: Discussion on Initial UE Access.
R3-174537 3GPP TSG-RAN WG3 Meeting #98, Reno, USA, Nov. 27-Dec. 1, 2017, Source: CATT, Title: Introduction of UE Reconfiguration Complete procedure.
R3-174538 3GPP TSG-RAN WG3 Meeting #98, Reno, USA, Nov. 27-Dec. 1, 2017, Source: CATT, Title: TP for 38.473 on UE Reconfiguration Completion procedure.
R3-174542 3GPP TSG-RAN WG3 Meeting #98, Reno, USA, Nov. 27-Dec. 1, 2017, Source: CATT, Title: Discussion on inter-DU mobility without MN involved.
R3-174543 3GPP TSG-RAN WG3 Meeting #98, Reno, USA, Nov. 27-Dec. 1, 2017, Source: CATT, Title: Stage 3 TP on inter-DU mobility without MN involved.
R3-174545 3GPP TSG-RAN WG3 Meeting #98, Reno, USA, Nov. 27-Dec. 1, 2017, Source: CATT, Title: Discussion on the Intral-cell HO and SCG change procedure.
R3-174546 3GPP TSG-RAN WG3 Meeting #98, Reno, USA, Nov.27-Dec. 1, 2017, Source: CATT, Title: TP for 38.473 on Intra-cell HO and SCG change procedure.
R3-174606 3GPP TSG-RAN WG3 Meeting #98, Reno, USA, Nov. 27-Dec. 1, 2017, Source: Samsung, KT, Title: Initial access procedure considering CU-DU split.
R3-174607 3GPP TSG-RAN WG3 Meeting #98, Reno, USA, Nov. 27-Dec. 1, 2017, Source: Samsung, KT, Title: Stage 3 TP for TS38.473 to reflect initial access procedure.
R3-174608 3GPP TSG-RAN WG3 Meeting #98, Reno, USA, Nov. 27-Dec. 1, 2017, Source: Samsung, KT, Title: RRC connection resume procedure considering CU-DU split.

(56) References Cited

OTHER PUBLICATIONS

R3-174609 3GPP TSG-RAN WG3 Meeting #98, Reno, USA, Nov. 27-Dec. 1, 2017, Source: Samsung, KT, Title: RRC connection reestablishment procedure considering CU-DU split.

* cited by examiner

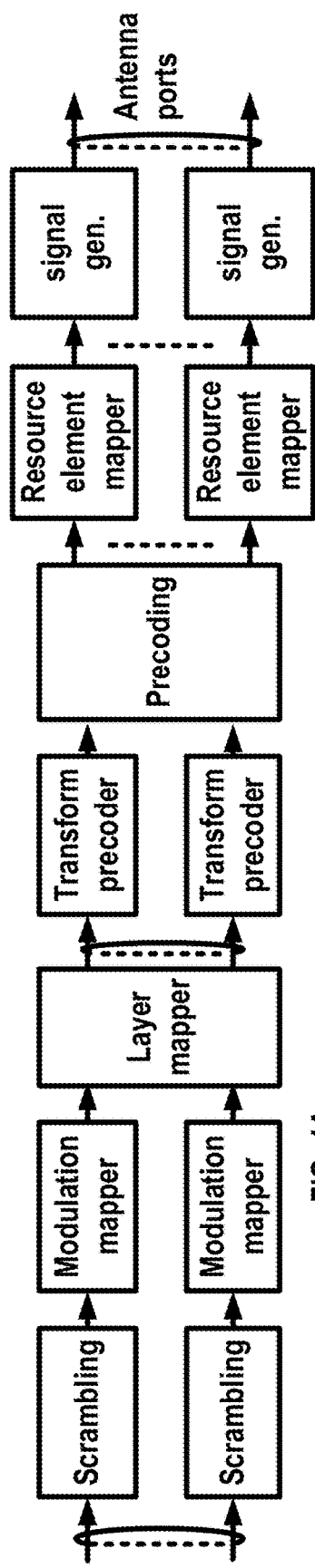
FIG. 4A
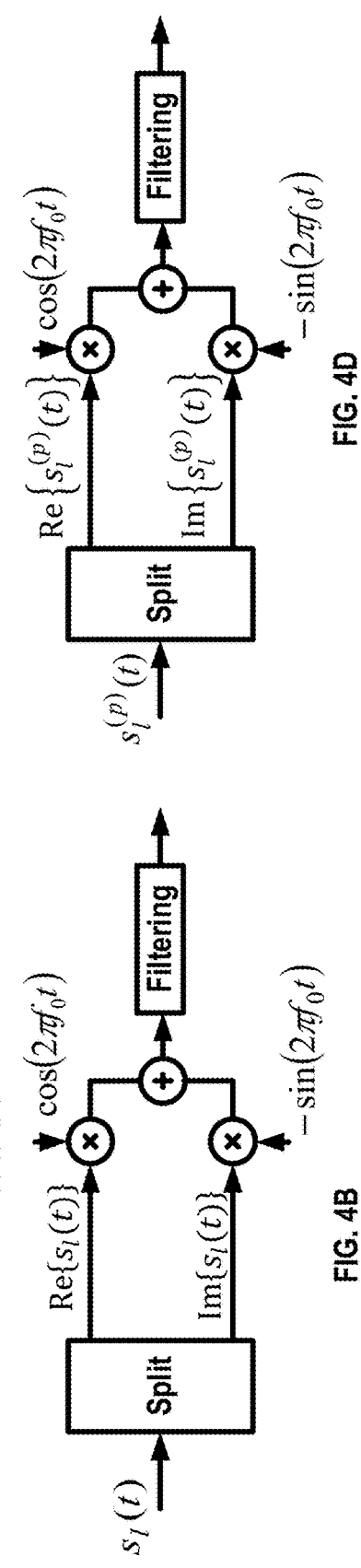
FIG. 4B
FIG. 4D
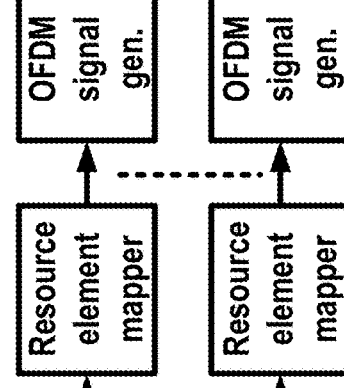
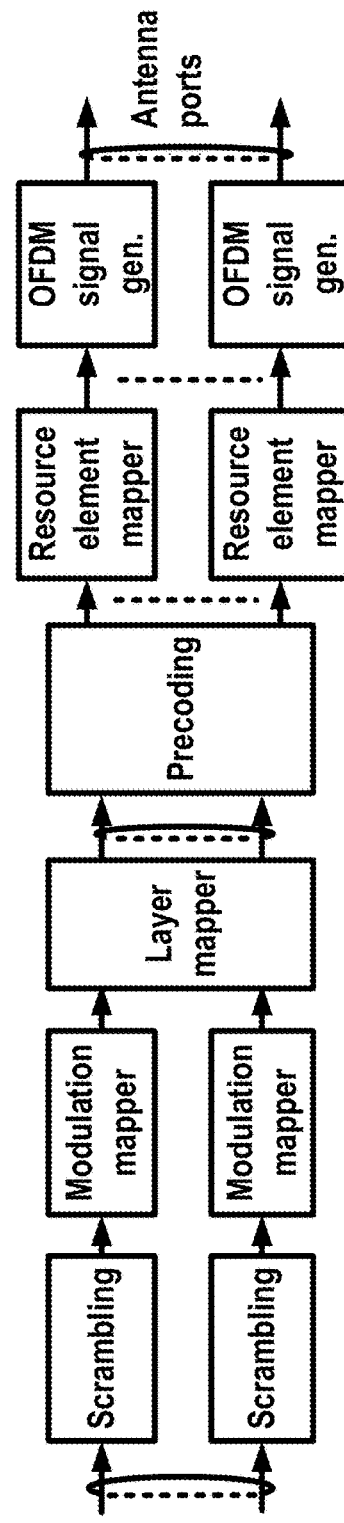
FIG. 4C

WIRELESS COMMUNICATIONS AND POWER CONFIGURATIONS

CROSS-REFERENCE TO RELATED APPLICATIONS

This application claims priority to U.S. application Ser. No. 16/277,110, titled "Wireless Communications and Power Configurations" and filed Feb. 15, 2019, which claims the benefit of U.S. Provisional Application No. 62/631,401, titled "UE Information for Distributed Unit" and filed on Feb. 15, 2018. The above-referenced applications are hereby incorporated by reference in their entireties for all purposes.

BACKGROUND

A wireless device may receive at least one configuration parameter, for example, from a base station, that may result in a variety of issues, for example, inefficient radio resource configuration, increased call dropping, and/or increased radio link failures. It is desired to improve wireless communications without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for wireless communications using wireless device information. A wireless device may send the wireless device information to a base station, which may comprise a base station distributed unit and a base station central unit. The base station central unit may receive the wireless device information and provide it to the base station distributed unit so that the base station distributed unit may determine one or more configuration parameters for the wireless device and/or other wireless devices in a cell that are based on the wireless device information. By using these one or more configuration parameters, the wireless device and/or other wireless devices in the cell may be able to improve wireless communications and/or increase power efficiency.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C and FIG. 4D show examples of uplink and downlink signal transmission.

DETAILED DESCRIPTION

Figure 1:
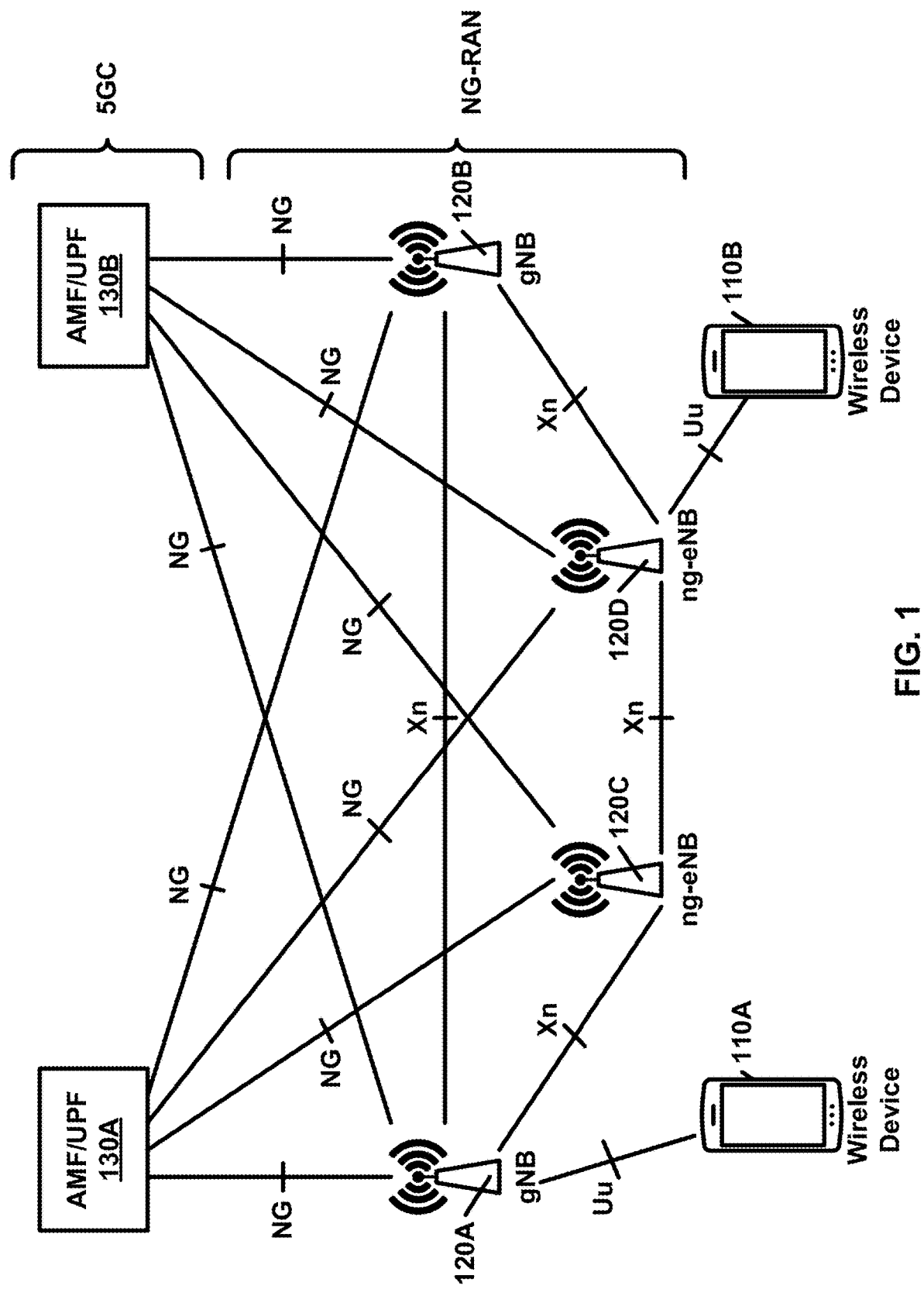
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to wireless communication systems in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., an gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
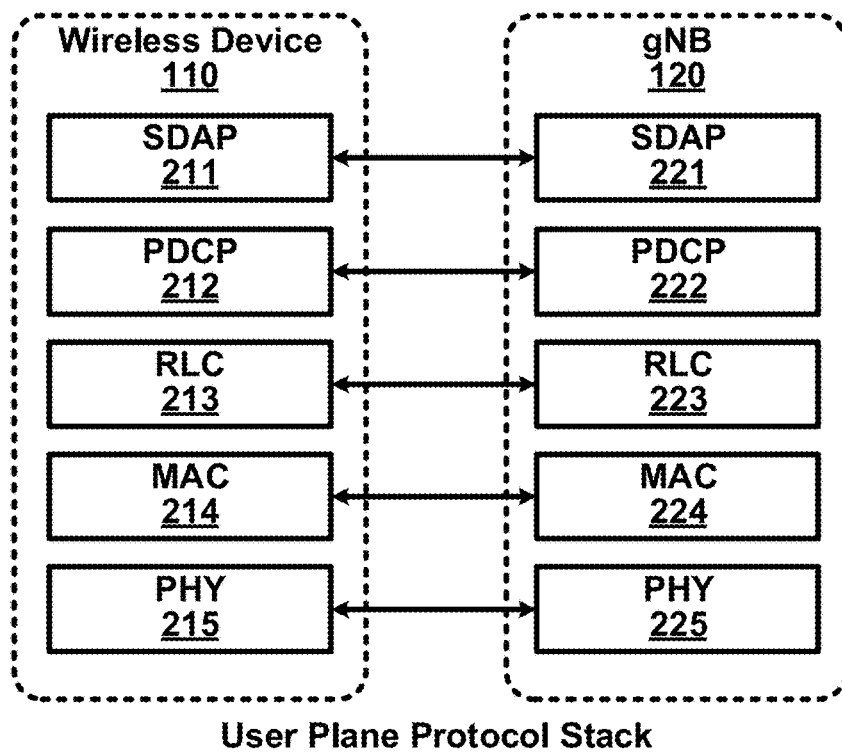
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
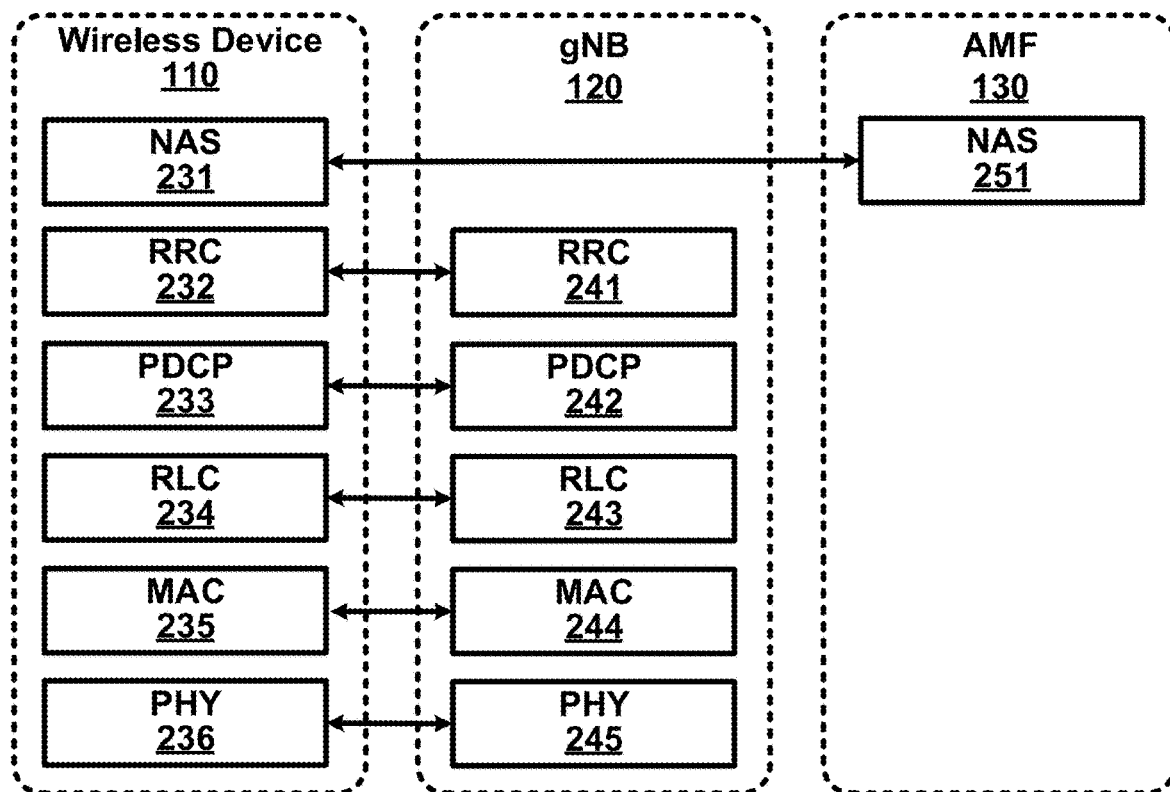
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
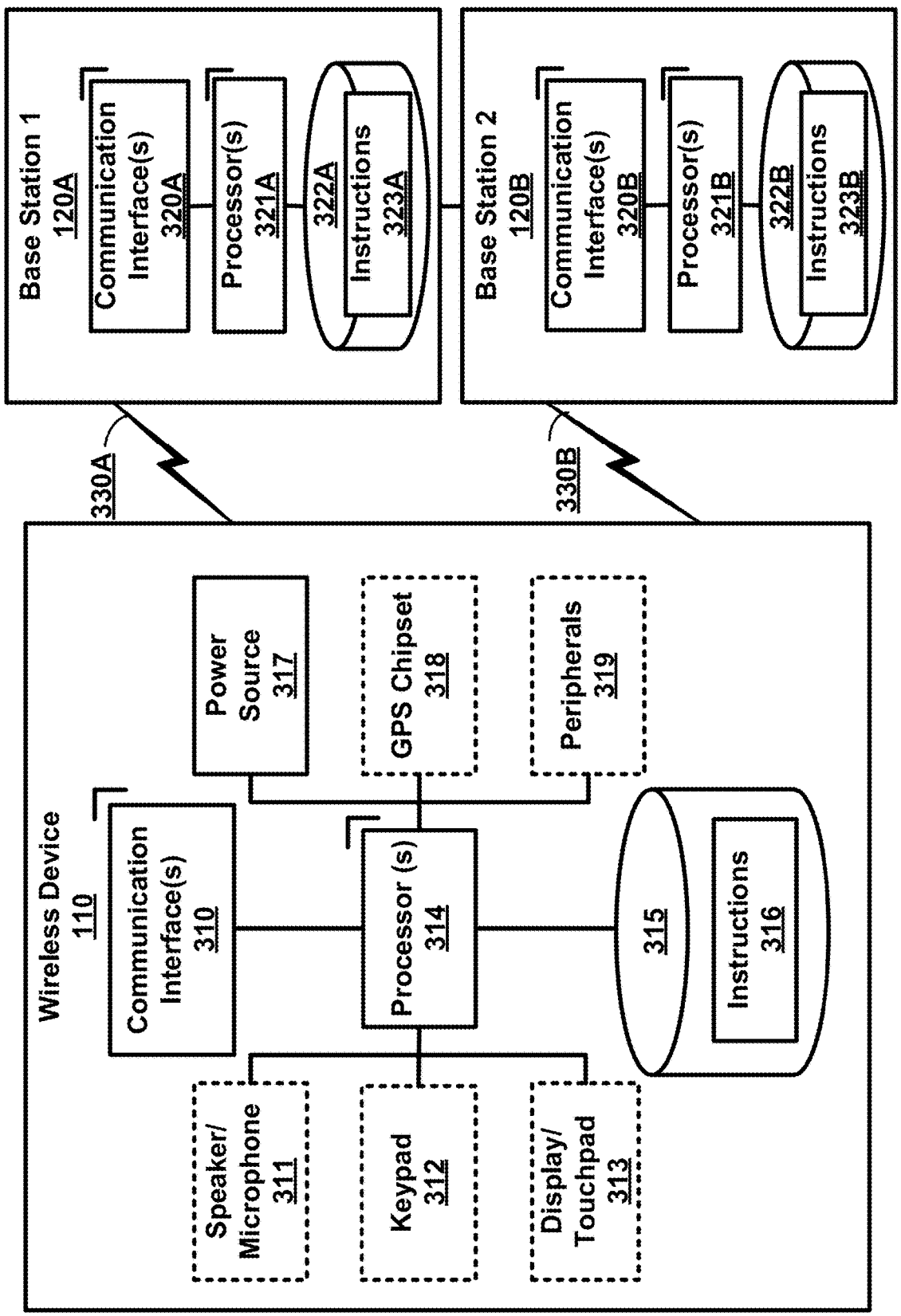
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random-access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., only static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. An CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
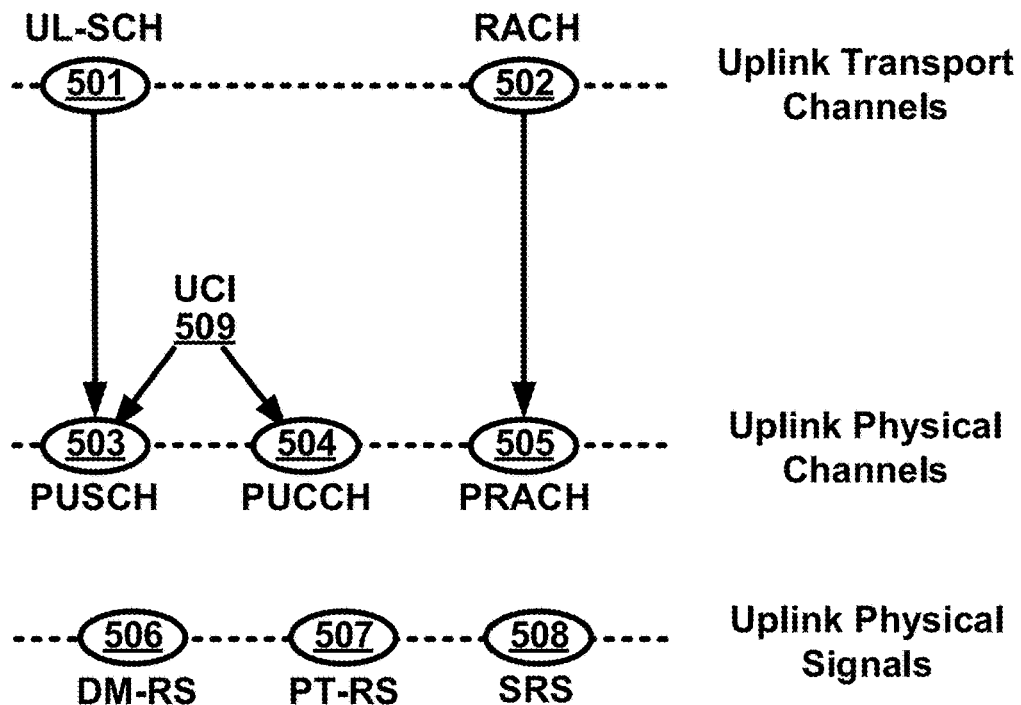
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least an MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be fewer than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
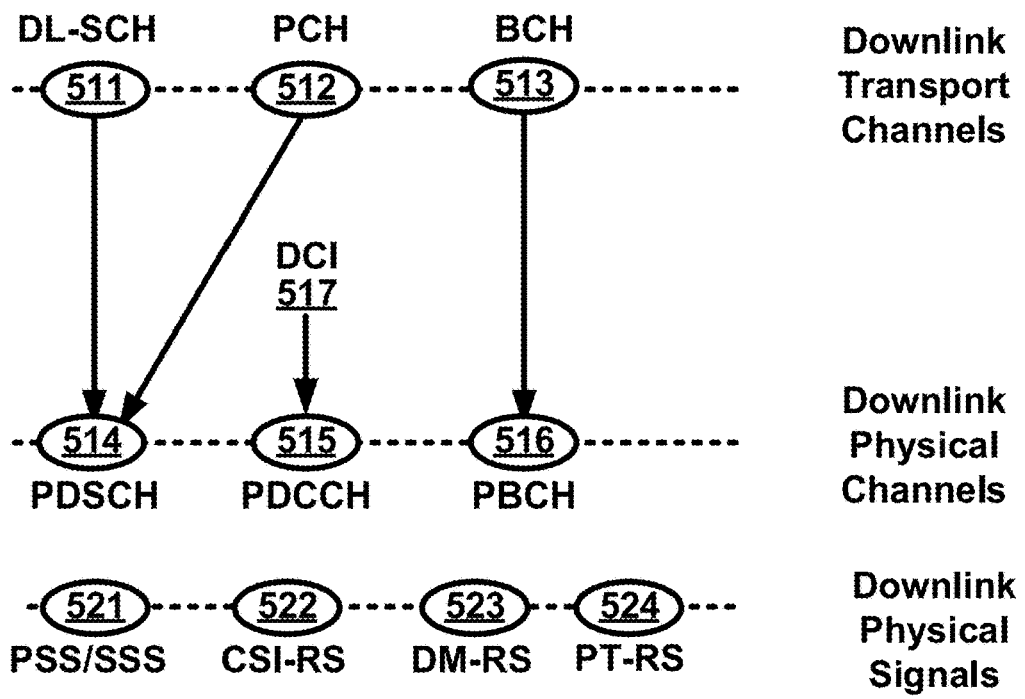
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
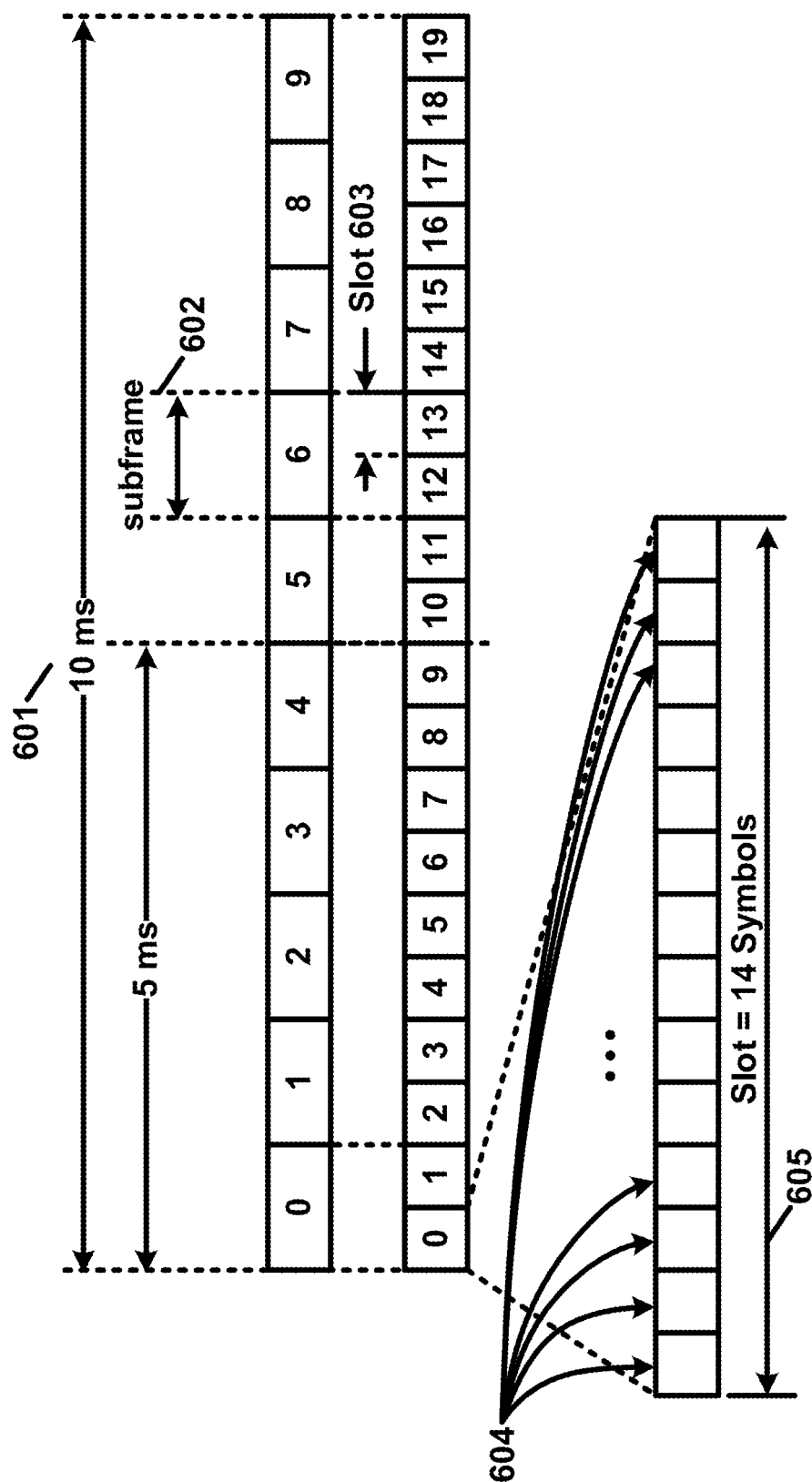
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
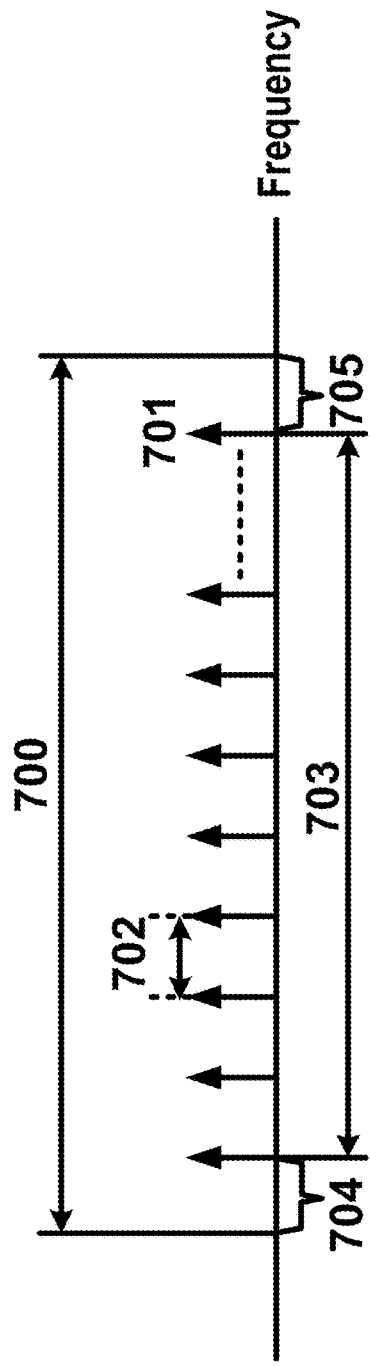
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
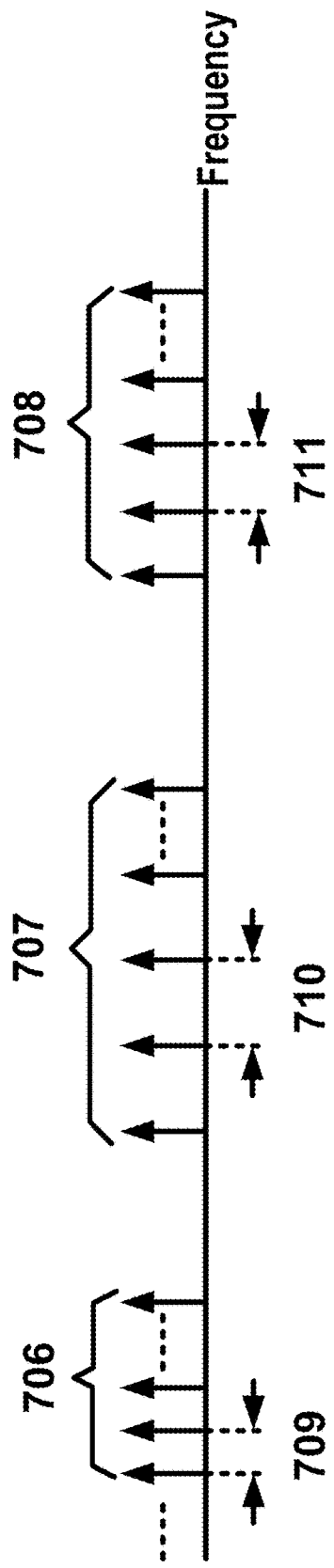

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
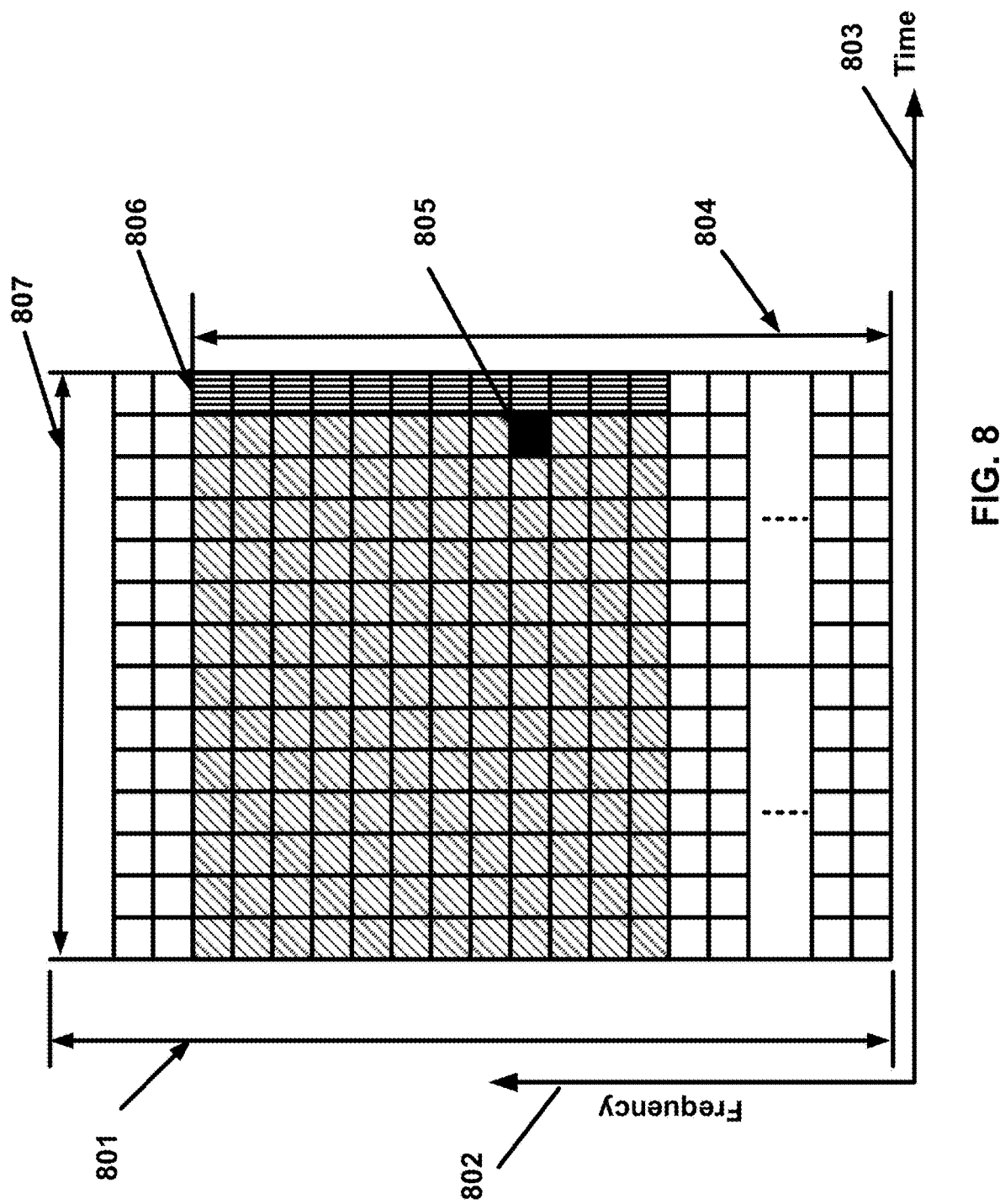
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of an RBG may depend on at least one of: an RRC message indicating an RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

a base station may allocate Configured Scheduling (CS) resources for down link transmission to a wireless device. The base station may send (e.g., transmit) one or more RRC messages indicating a periodicity of the CS grant. The base station may send (e.g., transmit) a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) a DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) a DCI comprising a slot format indicator (SFI) indicating a slot format. The base station may send (e.g., transmit) a DCI comprising a preemption indication indicating the PRB(s) and/or OFDM symbol(s) in which a wireless device may assume no transmission is intended for the wireless device. The base station may send (e.g., transmit) a DCI for group power control of the PUCCH, the PUSCH, and/or an SRS. A DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
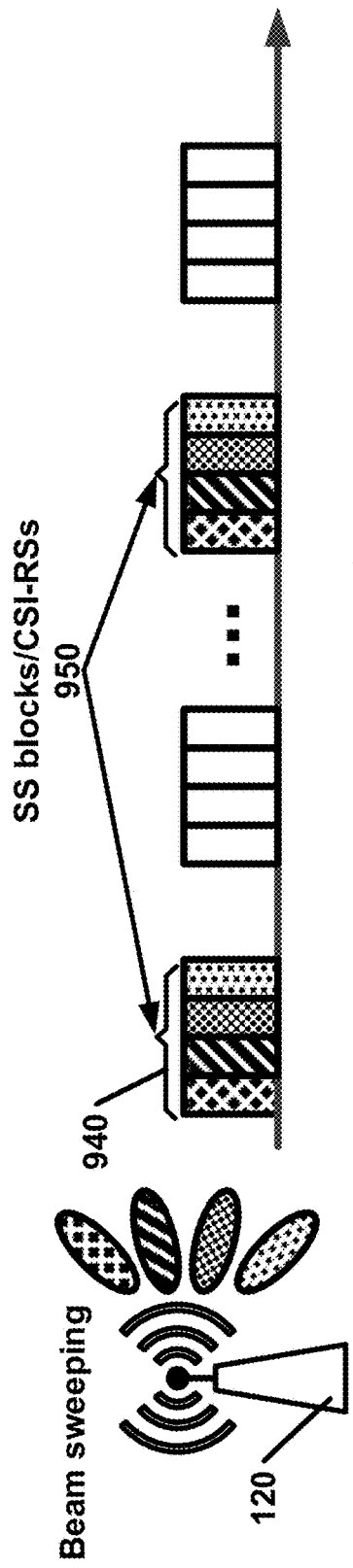
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
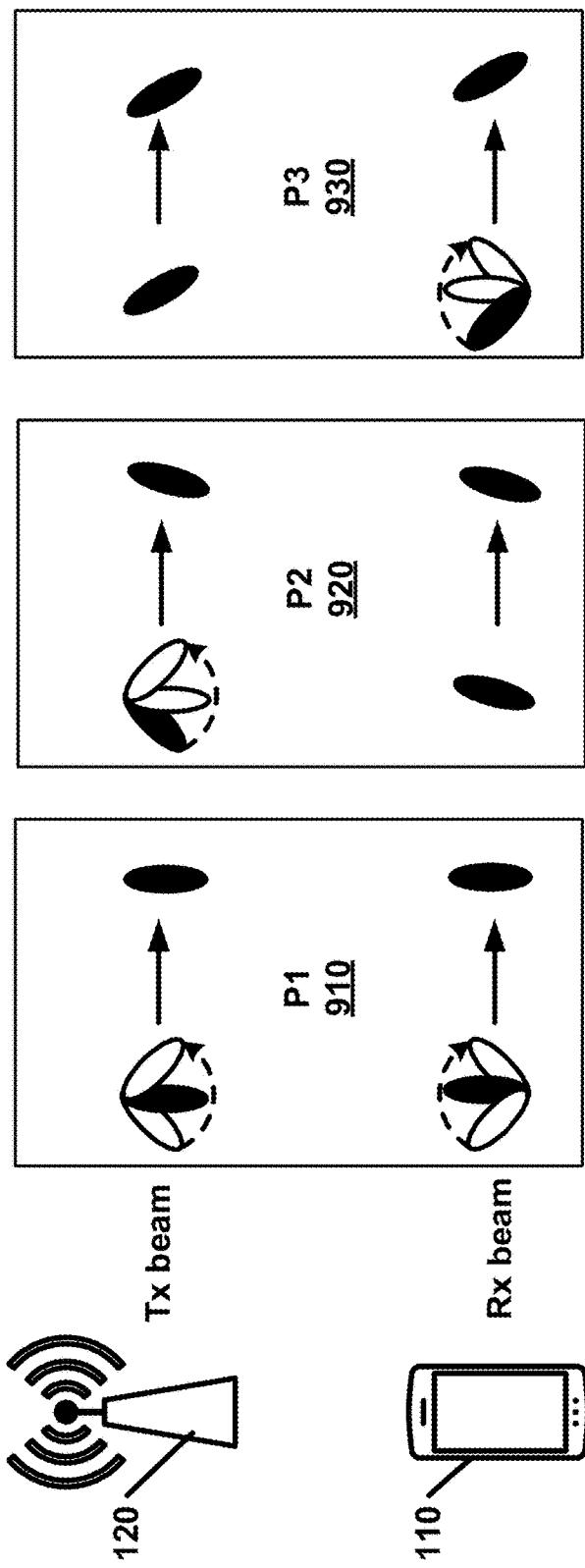
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
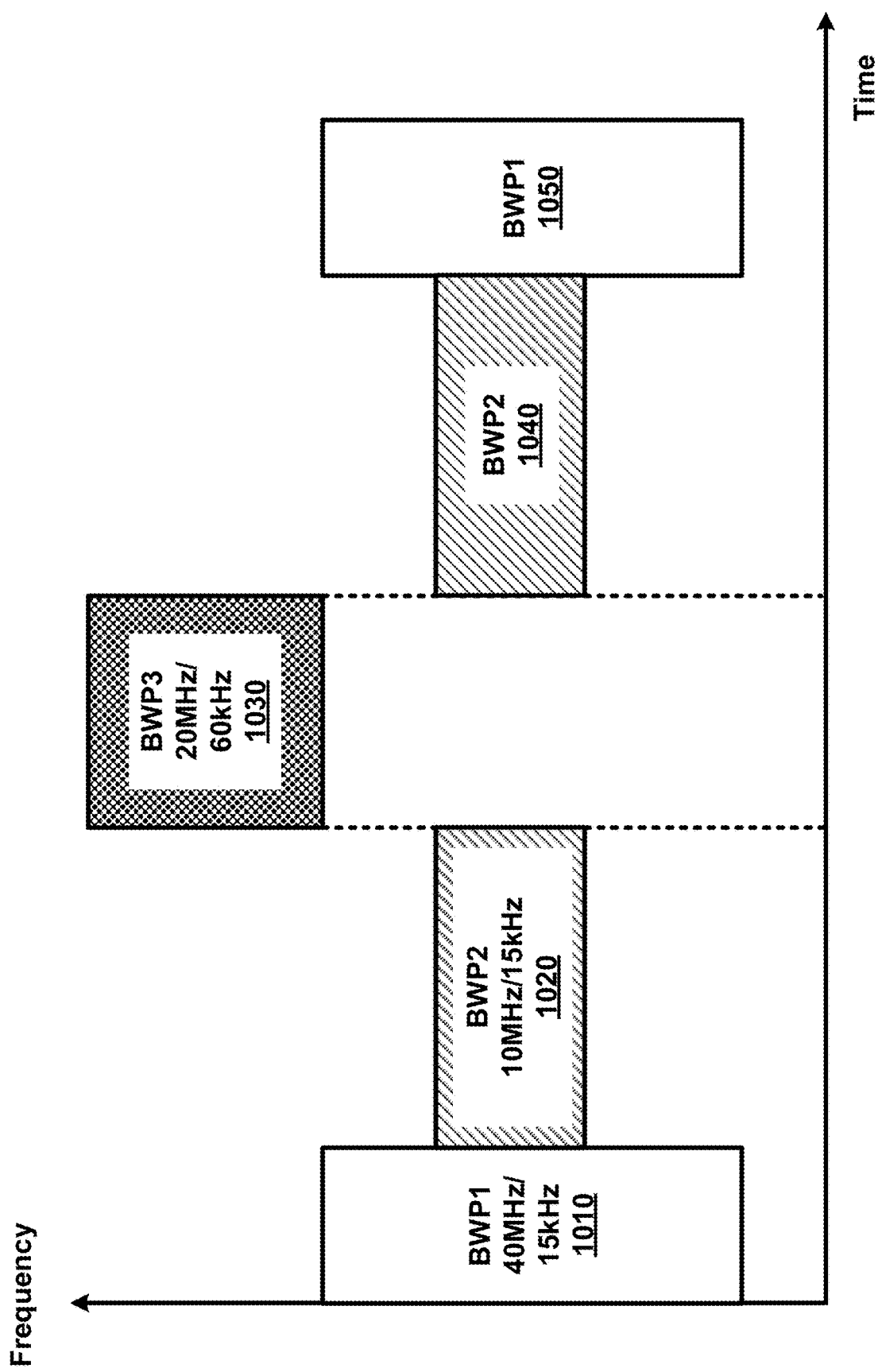
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base statin may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

A DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects a DCI indicating an active DL BWP, other than a default DL BWP, for a paired spectrum operation, and/or if a wireless device detects a DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect a DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving a DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving a DCI indicating BWP3 1030 as an active BWP. Switching an active BWP from BWP3 1030 to BWP2 1040 and/or from BWP2 1040 to BWP1 1050 may be after or in response to receiving a DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
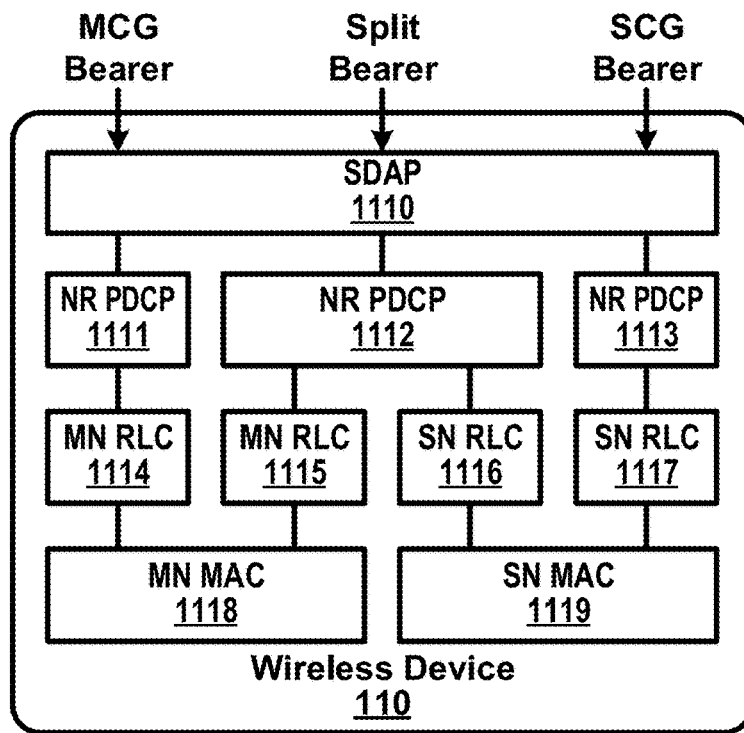
FIG. 11A and FIG. 11B show examples of multi connectivity.
Figure 11B:
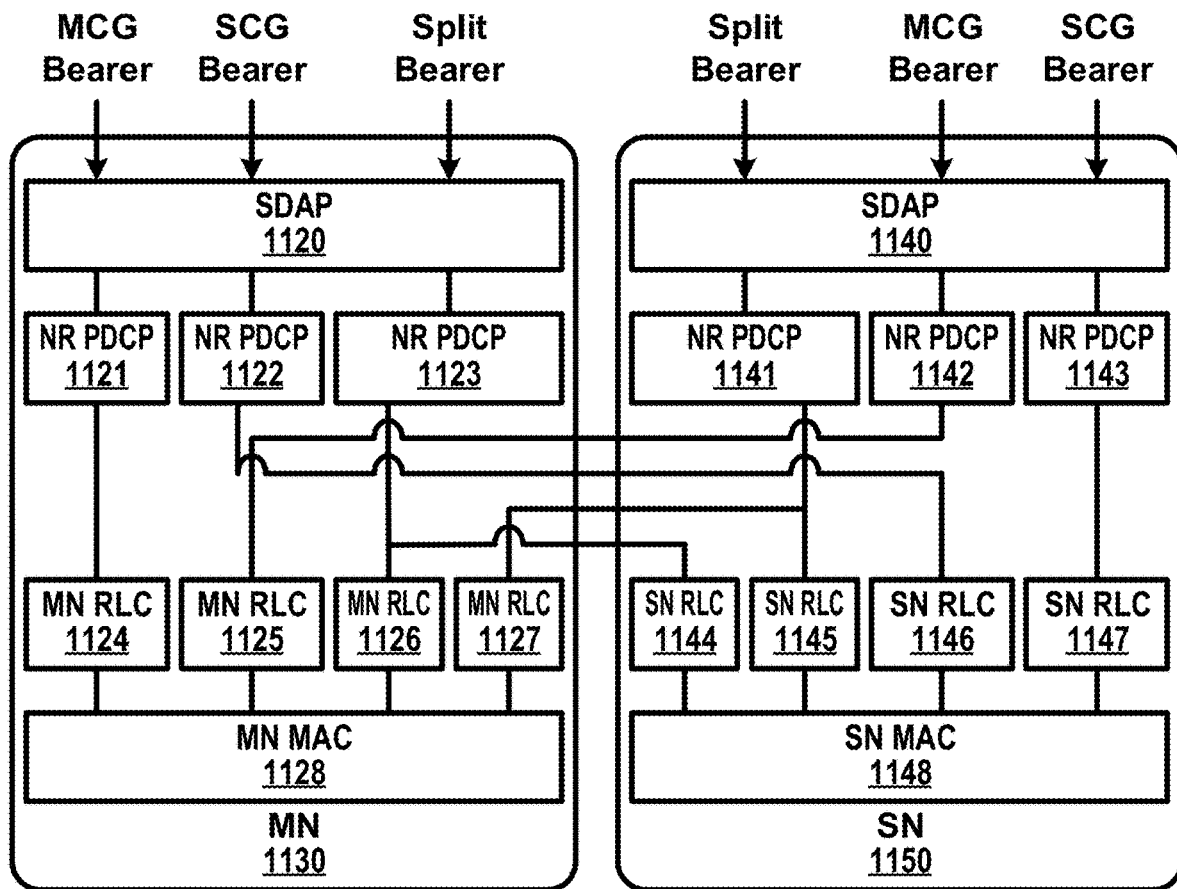

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be deactivated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and secondary base station(s) for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages.

A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
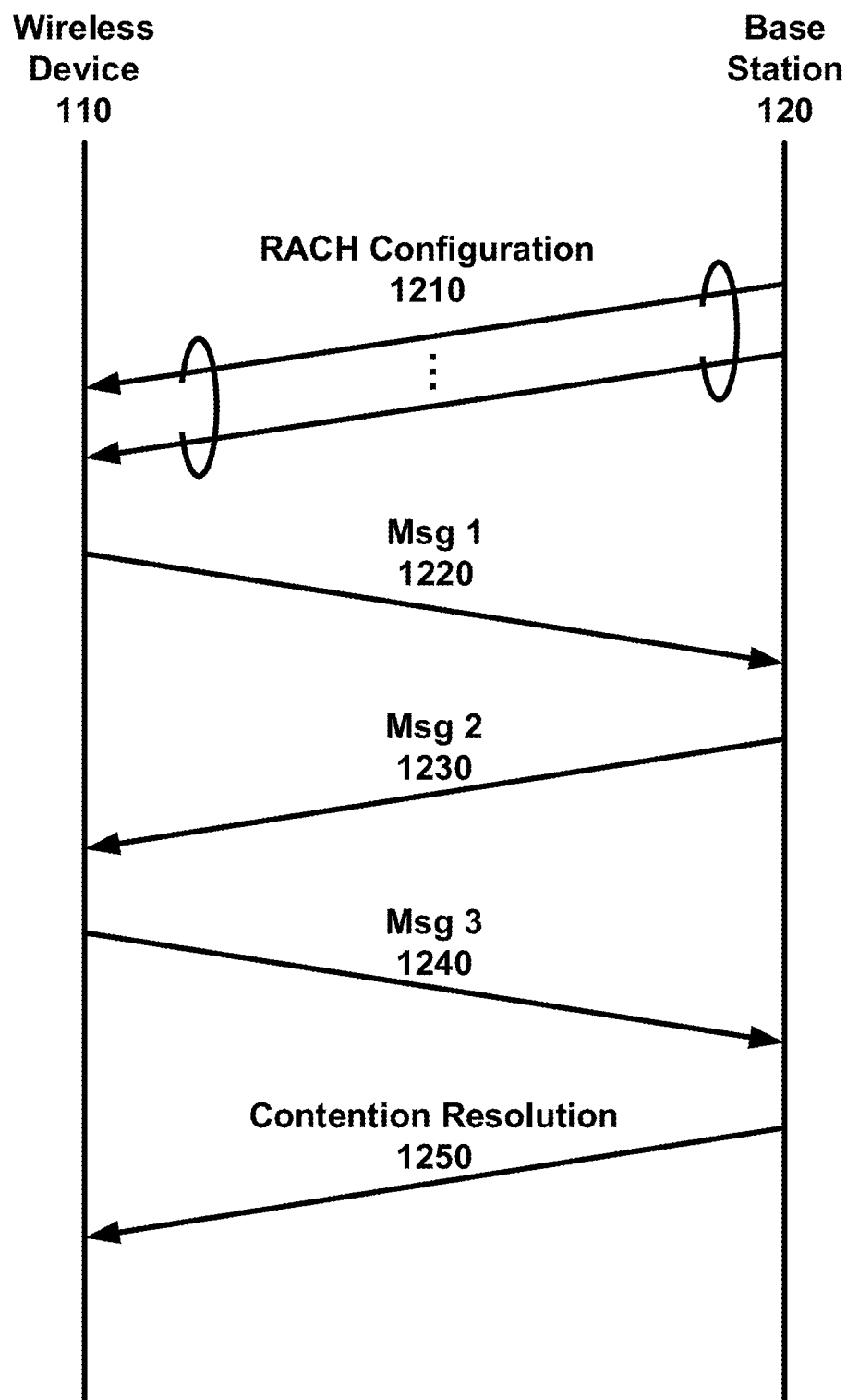
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating equivalent and/or similar content(s) of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for beam failure recovery request and corresponding PRACH resource(s) (e.g., if any), a time window to monitor RA response(s), a time window to monitor response(s) on beam failure recovery request, and/ or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for beam failure recovery request associated with at least one of SS blocks and/or CSI-RSs. A wireless device may select a random access preamble index corresponding to a selected SS block or a CSI-RS from a set of one or more random access preambles for beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine an PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For beam failure recovery request, the base station may configure the wireless device with a different time window (e.g., bfr-Response-Window) to monitor response on beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises only a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
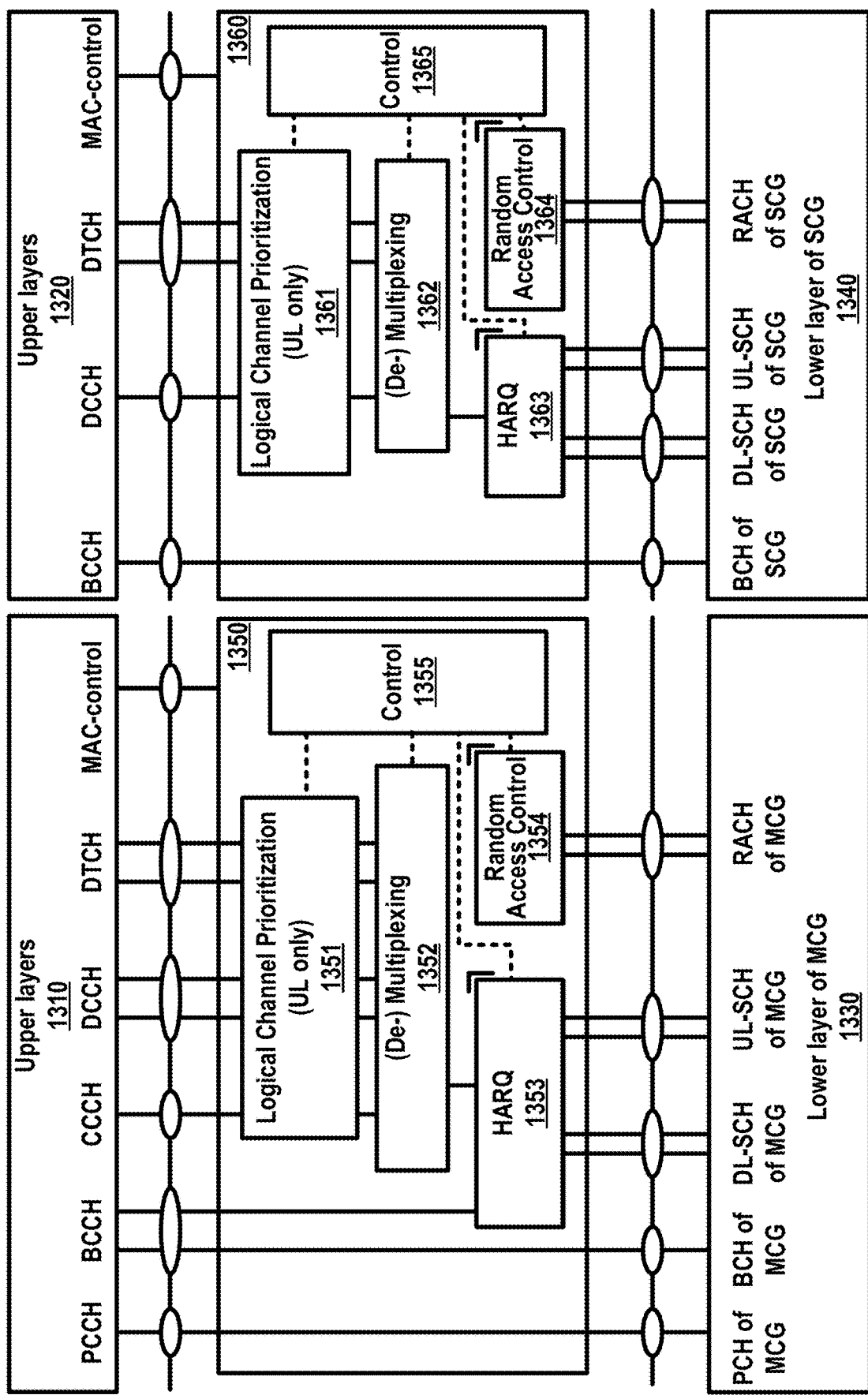
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which an MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for an MCG and one for a SCG. A MAC entity of a wireless device may handle a plurality of transport channels. A first MAC entity may handle first transport channels comprising a PCCH of an MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
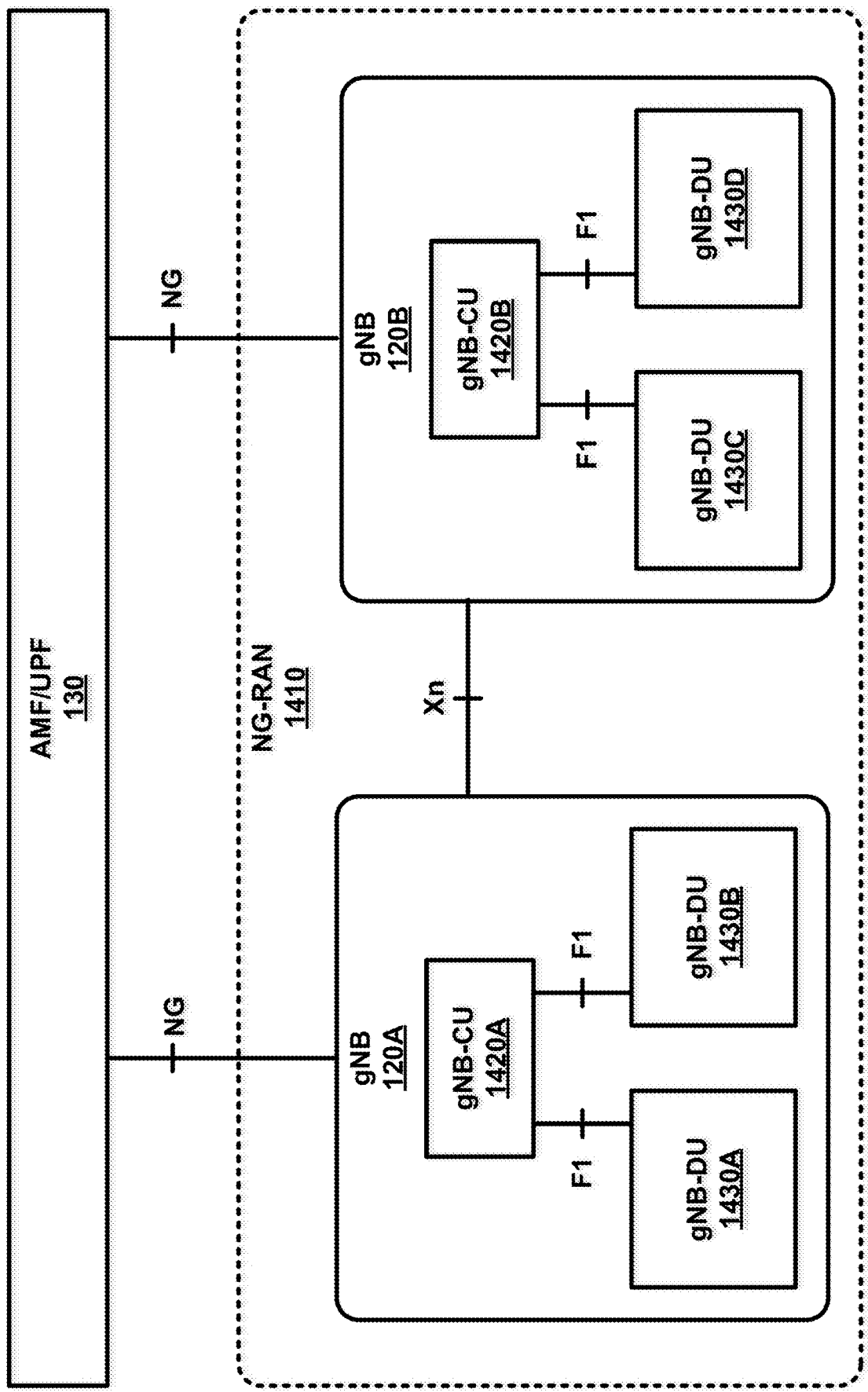
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
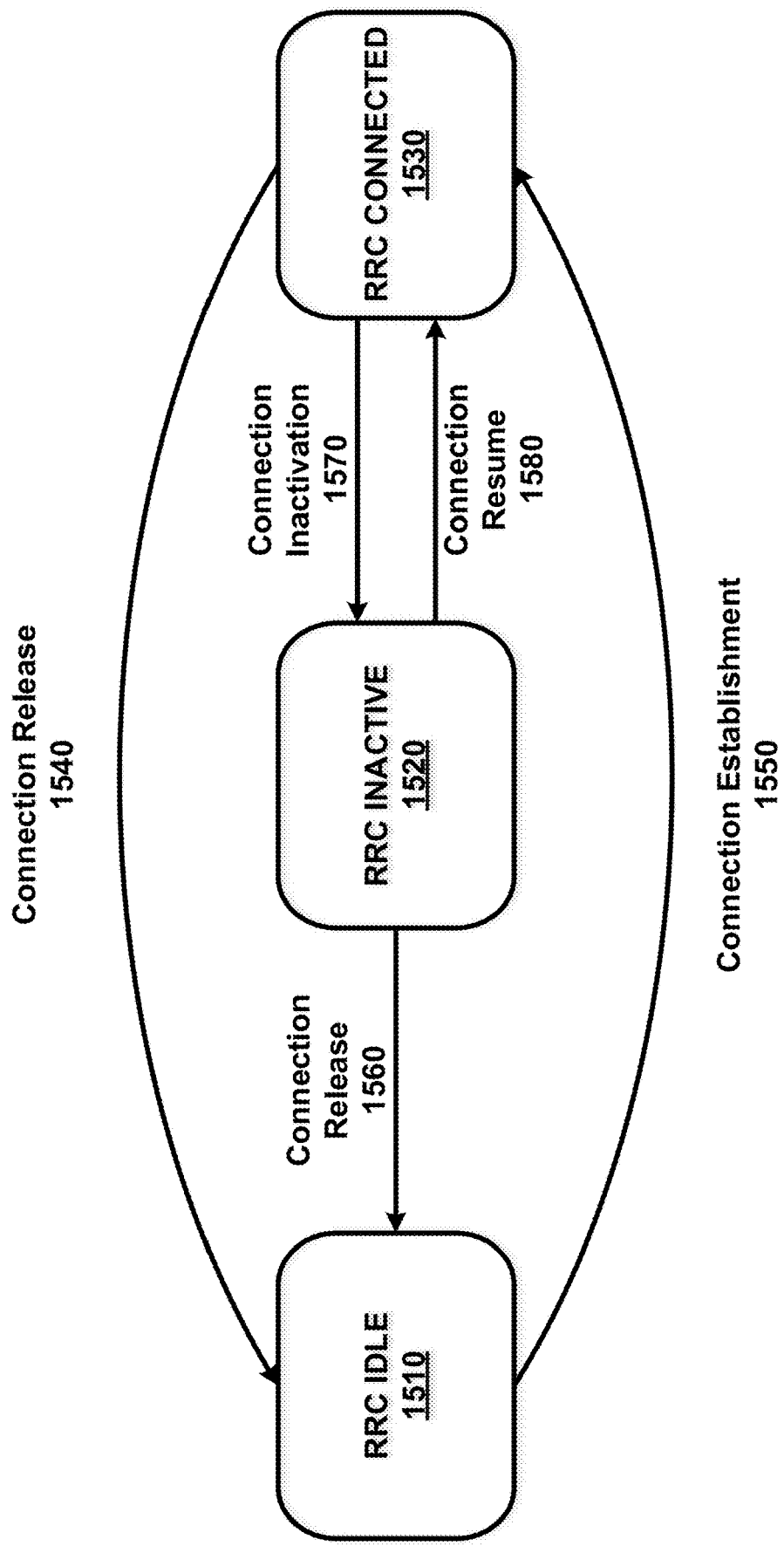
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station.

A base station CU (e.g., gNB-CU) may send (e.g., transmit) wireless device information to a base station DU (e.g., gNB-DU). The base station CU may provide a bearer configuration information, security configuration information, or wireless device capability information to a base station DU. Inefficient radio resource configuration, increased call dropping, and/or increased link failures may occur, for example, if a base station DU configures radio resources of a cell without sufficient information, for example, from one or more wireless devices. Without sufficient information, the base station DU may configure non-preferred radio resource parameters and/or previously failed resource configuration parameters without wireless device information (e.g., resource preferences information and/or failure information of a wireless device). Increased data transmission failures, frequent all dropping, increased link failure, and/or inefficient radio resource employment may occur. Radio resource configuration by a base station DU may benefit from a further enhancement in a communication mechanism between a base station CU and a base station DU.

Radio resource configuration efficiency may be improved, for example, if a base station DU configures radio resource configuration parameters based on, for example, information from one or more wireless devices. Radio resource configuration may be enhanced, for example, if a base station DU configures radio resource configuration parameters for one or more cells and/or one or more wireless devices. Information exchanges between a base station CU and a base station DU may be enhanced, for example, if a base station DU configures radio resources. Information exchange among a base station CU and a base station DU may be enhanced, for example, to improve radio parameter configuration mechanism if a base station DU configures radio resources. By communicating information, for example, an indication of a preference of the wireless device for one or more power saving configurations (and/or other wireless device information), from a wireless device to a base station (e.g., a base station DU via a base station CU), advantages may be achieved for the wireless device (and/or for additional wireless devices that may communicate with the base station). Such advantages may comprise, for example, for one or more wireless devices and/or for one or more cells: more efficient radio resource configurations, reduced power usage, decreased call dropping, and/or decreased link failures.

A wireless device may configure power parameters for transmissions of one or more transport blocks. A base station (e.g., a base station distributed unit (DU) and/or a base station central unit (CU)) may determine one or more power configuration parameters for the wireless device. The wireless device may send (e.g., transmit), to the base station, wireless device information. The wireless device information may comprise an indication of a preference of the wireless device for one or more power saving configurations. The base station may determine the one or more power configuration parameters for the wireless device based on the wireless device information. A base station CU may determine the one or more power configuration parameters. The base station CU may have wireless device information for the wireless device and/or a plurality of other wireless devices. The base station CU may be able to determine the one or more power configuration parameters for the wireless device based on wireless device information for the wireless device and/or wireless device information for a plurality of other wireless devices. A base station DU may receive, from the base station CU, the one or more power configuration parameters. The base station DU may update the one or more power configuration parameters. Additionally or alternatively, the base station DU may determine the one or more power configuration parameters. The base station DU may receive, from the base station CU, the wireless device information (e.g., preference of the wireless device for one or more power saving configurations). The base station DU may have more recently updated information for the wireless device, such as based on one or more channel state information (CSI) reports, than the base station CU may have. The base station DU may be able to dynamically adjust power configuration parameters for the wireless device based on the wireless device information and/or CSI reports, measurement reports, and/or the like. Some wireless device information (e.g., random access report, connection establishment, mobility history, multicast-broadcast single frequency network (MBSFN) measurement, and/or load measurement) for the wireless device may be used to determine one or more power configuration parameters of one or more other wireless devices. Some wireless device information (e.g., bandwidth preference, radio link monitoring, and/or delay budget) for the wireless device may not be used to determine one or more power configuration parameters of one or more other wireless devices. The base station CU may send a first subset of power configuration parameters to the wireless device (e.g., via the base station DU). The base station CU may send a second subset of power configuration parameters to one or more other wireless devices (e.g., via the base station DU and/or via one or more other base station DUs).

A base station CU may send (e.g., transmit), to a base station DU, wireless device (e.g., UE) information of a wireless device received via one or more radio resource control (RRC) messages from the wireless device. Wireless device information may comprise one or more of: random access information, connection establishment failure information, power preference information, bandwidth preference information, radio link monitoring (RLM) information, delay budget information, logged measurement results, mobility history information, and/or the like. The base station DU may configure radio resource parameters for one or more wireless devices based on the wireless device information.

A base station (e.g., a gNB, an eNB, and/or the like) may comprise a base station central unit (CU) (e.g., gNB-CU) and one or more base station distributed units (DUs) (e.g., gNB-DU). The base station CU may provide functionalities of an RRC layer, a PDCP layer, and/or an SDAP layer for wireless devices. A base station DU of the one or more base station DUs may provide functionalities of an RLC layer, a MAC layer, and/or a PHY layer for wireless devices. The base station CU may provide one or more upper layers among a PDCP layer, an SDAP layer, an RLC layer, a MAC layer, and/or PHY layer. The base station DU may provide one or more lower layers among a PDCP layer, an SDAP layer, an RLC layer, a MAC layer, and/or PHY layer. The base station CU may be connected to and/or in communication with the one or more base station DUs, for example, via one or more F1 interfaces. The base station CU may communicate with a base station DU via an F1 interface. The base station CU and/or the base station DU may serve a wireless device.

Figure 16:
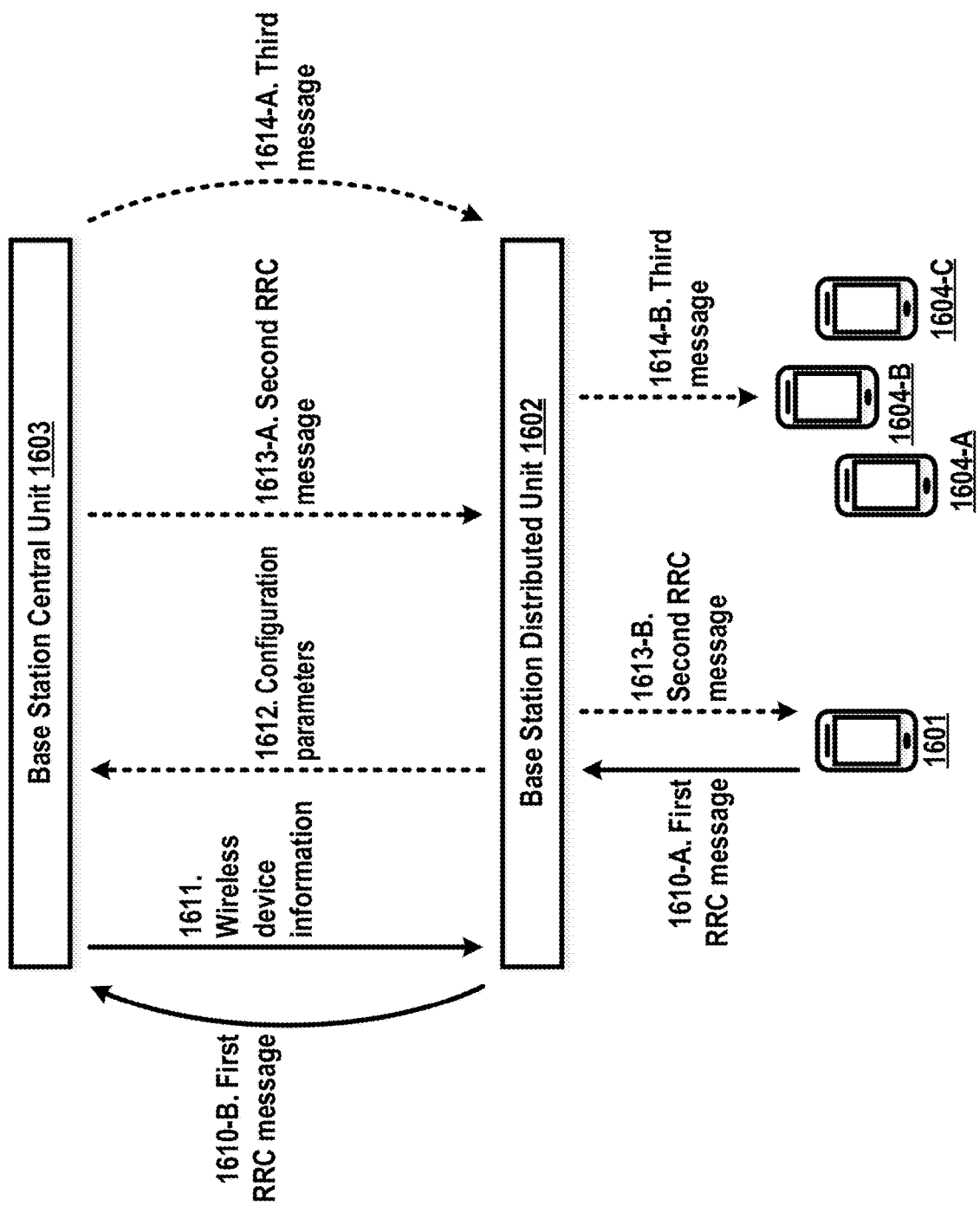
FIG. 16 shows an example of messaging associated with wireless device information.

FIG. 16 shows an example of messaging associated with wireless device information. A wireless device 1601 may send (e.g., transmit) a first radio resource control (RRC) message 1610-A to the base station CU 1603 via the base station DU 1602. The first RRC message 1610-A may comprise wireless device information. The wireless device information may be associated with wireless communications of the wireless device 1601. The wireless device information may comprise, for example, random access information, connection establishment failure information, power preference information, bandwidth preference information, radio link monitoring (RLM) information, delay budget information, logged measurement results, mobility history information, and/or the like. After or in response to receiving the first RRC message 1610-A, the base station DU 1602 may send (e.g., transmit, forward, etc.) a first RRC message 1610-B to the base station CU 1603. The first message 1610-B may be the same message as the first RRC message 1610-A. The wireless device 1601 may send (e.g., transmit) the first RRC message (e.g., 1610-A, 1610-B) via a signaling radio bearer 1 (e.g., SRB1). The base station DU 1602 may not interpret (and/or may not decode) the first RRC message 1610-A. The first RRC message (e.g., 1610-A, 1610-B) may comprise a wireless device assistance information message (e.g., UEAssistanceInformation message) and/or a wireless device information response message (e.g., UEInformationResponse message). The base station DU 1602 may send (e.g., transmit, forward, etc.) the first RRC message 1610-B via an F1 interface configured between the base station DU 1602 and the base station CU 1603. The base station DU 1602 may send (e.g., transmit, forward, etc.) the first RRC message 1610-B via a first F1-C message (e.g., in a F1 control plane message). The first RRC message (e.g., 1610-A, 1610-B) may comprise one or more of: an UL RRC message transfer message, a wireless device (e.g., UE) context modification response message, a wireless device (e.g., UE) context modification required message, a wireless device (e.g., UE) context modification failure message, a wireless device (e.g., UE) context setup response message, a wireless device (e.g., UE) context setup failure message, and/or the like. A first F1-C message may comprise an RRC-Container IE (and/or DU To CU RRC Information IE) comprising the first RRC message (e.g., 1610-A, 1610-B). The first RRC message (e.g., 1610-A, 1610-B) may comprise a wireless device identifier of the wireless device (e.g., gNB-CU UE FLAP ID, gNB-DU UE FLAP ID, and/or the like), a signaling radio bearer identifier associated with the first RRC message (e.g., SRB ID, which may comprise an integer value from 0 to 3, e.g., SRB1), and/or the like.

The first RRC message (e.g., 1610-A, 1610-B) may comprise wireless device information of the wireless device 1601. One or more elements of the wireless device information may comprise preferences of the wireless device 1601 for radio resource configurations and/or radio resource state information collected by the wireless device 1601. The wireless device information may comprise at least one of: a random access report information element (IE) (e.g., rach-Report IE); a connection establishment failure report IE (e.g., ConnEstFailReport IE); a power preference indication IE (e.g., powerPrefIndication IE) indicating that the wireless device prefers a configuration for power saving; a bandwidth preference IE (e.g., bw-Preference IE); a radio link monitoring (RLM) report IE (e.g., rlm-Report IE); a delay budget report IE (e.g., delayBudgetReport IE) indicating a preferred adjustment to connected mode discontinuous reception (DRX) or coverage enhancement configuration; and/or the like. The wireless device information may comprise at least one of: a logged measurement report IE (e.g., logMeasReport IE); a mobility history report IE (e.g., mobilityHistoryReport IE) indicating at least one time value of stay in recently visited cells; a MBSFN measurement result (e.g., MeasResultMBSFN IE) and/or the like.

The wireless device 1601 may initiate a random access procedure, for example, by sending (e.g., transmitting) one or more random access preambles to a base station (e.g., the base station DU 1602 and/or the base station CU 1603) via one or more cells. The wireless device 1601 may send (e.g., transmit) the one or more random access preambles, for example, before sending (e.g., transmitting) a first RRC message 1610-A. The random access procedure with the base station (e.g., the base station DU 1602 and/or the base station CU 1603) may be successful. A random access report IE may indicate at least one of: a number of preambles sent (e.g., numberOfPreamblesSent IE) and/or a contention detection indication (e.g., contentionDetected IE). The number of preambles sent (e.g., transmitted) may indicate a number of preambles sent (e.g., transmitted) by the wireless device (e.g., a MAC entity of the wireless device 1601) for the random access procedure with the base station (e.g., a last successfully completed random access procedure). The contention detection indication may indicate whether contention resolution was not successful for at least one of the one or more random access preambles of the random access procedure with the base station (e.g., whether contention resolution was not successful for at least one of transmitted preambles for a last successfully completed random access procedure). A contention detection indication may indicate a first value (e.g., "true" or 1), for example, if contention resolution was not successful for at least one of transmitted preambles for a last successfully completed random access procedure, The contention detection indication may indicate a second value (e.g., "false" or 0), for example, if contention resolution was successful for all (or at least one) of transmitted preambles for a last successfully completed random access procedure.

The wireless device 1601 may attempt a connection establishment to one or more cells and/or to a base station (e.g., the base station 1602 CU and/or the base station DU 1603). A connection establishment failure report IE may comprise information of a failed connection establishment attempt. The connection establishment failure report IE may comprise one or more of: a failed cell identifier of a failed cell (e.g., failedCellId IE) in which the wireless device 1601 attempted the connection establishment and failed, location information (e.g., locationInfo IE, ellipsoid based location information, GNSS based location information, velocity information) in which the wireless device failed a connection establishment; measurement results (e.g., RSRP and/or RSRQ) of a failed cell (e.g. measResultFailedCell IE) from which the wireless device 1601 attempted the connection establishment and failed, measurement result (e.g., RSRP and/or RSRQ) of neighbor cells (e.g., measResultNeighCells IE) of the failed cell, a number of preamble(s) sent (e.g., numberOfPreamblesSent IE) during the attempt of the connection establishment, a number of preamble(s) sent (e.g., numberOfPreamblesSent IE) indicating a number of preambles sent by the wireless device (e.g., a MAC entity of the wireless device) for the attempt of the connection establishment, a contention detection indication (e.g., contentionDetected IE, such as a "true" or "false" indication) indicating whether contention resolution was not successful for at least one of one or more random access preambles of the attempt of the connection establishment, a maximum transmission power reached during the attempt of the connection establishment for random access preamble transmission (e.g., maxTxPowerReached IE indicating whether or not the maximum power level was used for the last transmitted preamble), a time duration after the failed connection establishment attempt (e.g., timeSinceFailure IE indicating a time elapsed after a last HO initialization until failure, wherein an actual value may be field value multiplied by 100 ms, e.g., value 1023 may indicate 102.3 seconds or longer), and/or the like. A timeSinceFailure IE may indicate a time that elapsed after a last connection establishment failure.

A power preference indication (e.g., a power preference indication IE) may indicate that the wireless device 1601 prefers a configuration for power saving. The power preference indication may comprise an enumerated value indicating, for example, normal and/or low power consumption. A bandwidth preference (e.g., a bandwidth preference IE) may indicate preference of the wireless device for a bandwidth configuration and/or for a maximum PDSCH and/or PUSCH bandwidth for uplink and/or downlink. The bandwidth preference IE may comprise enumerated values indicating, for example, mhz1dot4, mhz5, and/or mhz20.

A radio link monitoring (RLM) report (e.g., RLM IE) may indicate at least one of RLM event information (e.g., rlm-Event IE) and/or an excess number of repetitions on an MPDCCH (e.g., excessRep-MPDCCH IE). The RLM event information may indicate an RLM event. The RLM event may comprise an enumerated value indicating early-out-of-sync (e.g., if T314 expires) or early-in-sync (e.g., if T315 expires). The excess number of repetitions on MPDCCH may comprise an enumerated value, for example, indicating excessRep1 and/or excessRep2 that may be received from a lower layer (e.g., if T315 expires).

A delay budget report (e.g., a delay budget report IE) may indicate a preferred adjustment to a connected mode discontinuous reception (DRX) and/or a coverage enhancement configuration. The delay budget report may comprise, for example, a type 1 value and/or a type 2 value indicating timing delay budget information of the wireless device (e.g., −1280 ms, −160 ms, 0 ms, 80 ms, 1280 ms, −192 ms, −48 ms, 0 ms, 96 ms, 192 ms), and/or the like.

A logged measurement report (e.g., a logged measurement report IE) may comprise at least one of time stamp information (e.g., absoluteTimeStamp IE) for trace information such as logged measurement results (e.g., which may indicate an absolute time for which logged measurement configuration logging is provided), trace reference information (e.g., traceReference IE), trace recording session reference information (e.g., traceRecordingSessionRef IE), trace identifier (e.g., tce-Id IE, trace collection entity identifier), logged measurement information (e.g., logMeasInfo IE), logged measurement information availability indication (e.g., logMeasAvailable IE) indicating whether or not logged measurement result is available.

The logged measurement information may indicate at least one of location information (e.g., locationInfo IE, ellipsoid based location information, GNSS based location information, velocity information) for which the wireless device 1601 logged measurement information, time information of logged data (e.g., relativeTimeStamp IE), serving cell identifier (e.g., servCellIdentity IE) of a serving cell where the wireless device 1601 logged measurement information, measurement result of the serving cell (e.g., measResultServCell IE indicating RSRP and/or RSRQ), measurement result of neighbor cells of the serving cell (e.g., measResultNeighCells IE indicating RSRP and/or RSRQ), indication parameter (e.g., inDeviceCoexDetected IE) indicating that measurement logging is suspended due to IDC problem detection and/or whether or not in-device-coexistence was detected.

A mobility history report (e.g., mobility history report IE) may indicate a visited cell list of the wireless device 1601. The mobility history report may comprise one or more cell identifier(s) of one or more cells that the wireless device 1601 visited. The mobility history report may indicate a time duration of stay in one or more cells (e.g., 16 most recently visited NR cells, E-UTRA cells, UTRA cells, and/or out-of-NR cells).

An MBSFN measurement result for one or more MBMS services that the wireless device 1601 receives may indicate at least one of MBSFN area information (e.g., mbsfn-Area IE comprising MBSFN area identifier (e.g., mbsfn-AreaId IE) and/or carrier information of MBSFN (e.g., carrierFreq IE)), measurement information of the MBSFN comprising an RSRP result (e.g., rsrpResultMBSFN IE) and/or RSRQ result (e.g., rsrqResultMBSFN IE), block error rate information of the MBSFN (e.g., signallingBLER-Result IE indicating error rate of transport blocks associated with the MBSFN and/or MBMS service), data block error rate of a multicast channel (e.g., DataBLER-MCH-Result IE comprising mch-Index and/or dataBLER-Result) indicating an error rate of a transport block associated with one or more multicast channels, and/or the like.

The base station CU 1603 may send (e.g., transmit, forward, etc.), to the base station DU 1602, a first message 1611. The first message 1611 may comprise wireless device information associated with the wireless device 1601. The base station CU 1603 may send the first message 1611, for example, after or in response to receiving the first RRC message 1610-A and/or 1610-B (and/or the first F1-C message) from the wireless device 1601 (and/or from the base station DU 1602). The base station CU 1603 may send (e.g., transmit, forward, etc.) the first message 1611 to the base station DU 1602 via the F1 interface (e.g., the first message 1611 may comprise a second F1-C message). The first message 1611 may comprise, for example, a wireless device (e.g., UE) context setup request message, a wireless device (e.g., UE) context modification request message, a wireless device (e.g., UE) context modification confirm message, a DL RRC message transfer message, and/or the like. The first message 1611 may comprise a wireless device (e.g., UE) identifier of the wireless device 1601 (e.g., gNB-CU UE F1AP ID, gNB-DU UE F1AP ID, and/or the like). The first message 1611 may comprise the wireless device (e.g., UE) information associated with the wireless device 1601. The first message 1611 may comprise a CU to DU RRC information IE comprising one or more elements of the wireless device (e.g., UE) information.

The first message 1611 may comprise the wireless device (e.g., UE) information. The base station DU 1602 may determine at least one cell configuration parameter (e.g., one or more radio resource configuration parameters) of one or more cells of the base station DU 1602 for one or more wireless devices (e.g., the wireless device 1601 and/or one or more of wireless device 1604-A, 1604-B, and/or 1604-C, or any other wireless device). The base station DU 1602 may determine the at least one cell configuration parameter, for example, after or in response to receiving the first message 1611. The base station DU 1602 may determine the at least one cell configuration parameter, for example, based on the wireless device information (e.g., that may be included in the first message 1611). The one or more radio resource configuration parameters may be for uplink (e.g., wireless device 1601 to base station DU 1602 and/or to base station CU 1603), sidelink (e.g., wireless device 1601-to-wireless device 1604-A, 1604-B, and/or 1604-C), and/or downlink (e.g., base station DU 1602 and/or base station CU 1603 to wireless device 1601). The one or more cells may comprise a failed cell (e.g., indicated by a connection establishment failure report) of the wireless device 1601. The one or more radio resource configuration parameters may comprise one or more of: a beam configuration parameter; a bandwidth part (BWP) configuration parameter; a transmission power configuration parameter; a frequency configuration parameter; a beamforming configuration parameter; a physical control channel scheduling parameter; an antenna configuration parameter; a cell selection and/or reselection configuration parameter for one or more wireless devices (e.g., the wireless device 1601 and/or one or more of wireless device 1604-A, 1604-B, and/or 1604-C, or any other wireless device); system information; an interference control parameter; an MBSFN configuration parameter, and/or the like.

The base station DU 1602 may determine one or more of the at least one cell configuration parameter for the wireless device 1601, for example, based on preference information of the wireless device 1601. Preference information of the wireless device 1601 may be based on, for example, one or more of: a power preference indication (e.g., power preference indication IE), bandwidth preference (e.g., bandwidth preference IE), and/or a delay budget report (e.g., delay budget report IE). The base station DU 1602 may configure one or more parameters to satisfy one or more conditions of the preference information of the wireless device 1601.

The base station DU 1602 may configure one or more MBSFN configuration parameters, for example, based on the MBSFN measurement result. The base station DU 1602 may increase transmission power for the one or more MBSFNs, for example, if RSRP and/or RSRQ of the wireless device 1601 for one or more MBSFNs is low (e.g., below a threshold value). The base station DU 1602 may increase transmission power for the one or more MBSFNs, for example, if BLER of one or more MBSFNs (e.g., one or more MBMS services) is high (e.g., above a threshold value).

The at least one beam configuration parameters may be for one or more wireless devices (e.g., the wireless device 1601 and/or one or more of wireless device 1604-A, 1604-B, and/or 1604-C, or any other wireless device). The at least one beam configuration parameters may comprise one or more parameters indicating at least one of: a plurality of beam indexes of a plurality of beams; a plurality of SSB beam configurations; a plurality of CSI-RS beam configurations; a plurality of beam directions of a plurality of beams; a subcarrier spacing for a plurality of beams; a cyclic prefix; a number of contiguous PRBs; an index in the set of one or more DL beams and/or one or more UL beams; a link between a DL beam and/or an UL beam from a set of configured DL beams and/or UL beams; a DCI detection to a PDSCH reception timing value; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth; and/or the like.

The at least one beam configuration parameters may comprise one or more parameters indicating at least one of CSI-RS beam indexes, SS beam indexes, BRACH resource configurations, BRACH preamble configuration parameters, beam based SRS transmission configuration information, beam based CSI-RS configuration parameters, beam based SS configuration parameters, beam failure recovery timer, number of random access preamble transmission repetitions, beam measurement configuration parameters, beam failure detection RS resource configuration information (e.g., Beam-Failure-Detection-RS-ResourceConfig), candidate beam RS list (e.g., Candidate-Beam-RS-List) for radio link quality measurements on the serving cell, beam failure candidate beam received power threshold (e.g., Beam-failure-candidate-beam-threshold), control resource set (CORESET) information for beam failure recovery response (e.g., Beam-failure-Recovery-Response-CORESET), RACH resource for beam failure recovery procedure (e.g., Beam-failure-recovery-request-RACH-Resource), time window information for beam failure recovery request (e.g., Beam-failure-recovery-request-window), TCI-StatesPDCCH, and/or the like.

The base station DU 1602 may reconfigure uplink and/or downlink transmission power for the first beam for one or more wireless devices (the wireless device 1601 and/or one or more of wireless device 1604-A, 1604-B, and/or 1604-C, or any other wireless device), for example, if a wireless device experiences a failure during a time that a first beam of a plurality of beams of a cell is used.

The base station DU 1602 may determine and/or indicate that one or more wireless devices are to use a second beam if measurement results of the one or more wireless device are similar to measurement results of the wireless device at a failure, for example, if a channel quality (e.g., RSRP and/or RSRQ) of the second beam of a plurality of beams of a cell is good at a time that a wireless device experiences a failure and a time that a first beam is used.

At least one BWP configuration parameter may be for one or more wireless devices (e.g., the wireless device 1601 and/or one or more of wireless device 1604-A, 1604-B, and/or 1604-C, or any other wireless device). The at least one BWP configuration parameter may comprise one or more parameters indicating at least one of: a plurality of BWP indexes of a plurality of BWPs; a plurality of BWP bandwidths of a plurality of BWPs; a default BWP index of a default BWP of the plurality of BWPs; a BWP inactivity timer; an initial BWP index of an initial BWP (e.g., initial active BWP) of a plurality of BWPs; a subcarrier spacing for a plurality of BWPs; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing value; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth; and/or the like.

The base station DU 1602 may not configure the first BWP as a default BWP (and/or as an initial BWP) for one or more wireless devices (e.g., the wireless device 1601 and/or one or more of wireless device 1604-A, 1604-B, and/or 1604-C, or any other wireless device), for example, if a wireless device experiences a failure at a time that a first BWP of a plurality of BWPs of a cell is an active BWP. The base station DU 1602 may configure the second BWP as a default BWP (and/or as an initial BWP) for one or more wireless devices (g., the wireless device 1601 and/or one or more of wireless device 1604-A, 1604-B, and/or 1604-C, or any other wireless device), for example, if a channel quality (e.g., RSRP and/or RSRQ) of a second BWP of a plurality of BWPs of a cell is good (e.g., better than a channel quality of an active BWP) at a time that a wireless device experiences a failure and a time that a first BWP of the plurality of BWPs is an active BWP.

At least one transmission power configuration parameter may comprise one or more of: a maximum downlink/uplink cell transmission power, a physical downlink control channel (PDCCH) transmission power, a power control parameter for uplink and/or downlink, a TPC configuration parameter, an SRS configuration parameter, and/or the like for one or more wireless devices (e.g., the wireless device 1601 and/or one or more of wireless device 1604-A, 1604-B, and/or 1604-C, or any other wireless device) and/or for the base station DU 1602. The base station DU 1602 may increase a transmission power of the PDCCH, for example, if the base station DU 1602 determines that a failure occurred because of a low transmission power of a PDCCH (e.g., based on measurement results of the wireless device information). The base station DU 1602 may reschedule the PDCCH to be located at other subframes, for example, if a failure occurred because of large interferences on a PDCCH.

The base station DU 1602 may increase an uplink and/or downlink power level (e.g., 0.1 dB increase) for one or more wireless devices (e.g., wireless device(s) served in the first cell) at a time that the one or more wireless devices use the first beam, for example, if a wireless device experiences a failure during a time that a first beam is used. The base station DU 1602 may not configure the first beam for a random access preamble transmission of one or more wireless devices, for example, if a cause of a failure of a wireless device is a random access problem and the wireless device experiences the failure at a time that a first beam is used. The base station DU 1602 may increase an uplink power level for one or more wireless devices at a time that one or more wireless devices use a first beam, for example, if a cause of the failure of a wireless device is an RLC maximum number of retransmissions (e.g., uplink transmission problem and/or a number of RLC retransmissions is above a threshold value) and the wireless device experiences a failure at a time that a first beam is used.

At least one frequency configuration parameter may comprise one or more of: a carrier frequency, a bandwidth, a bandwidth part configuration parameter, and/or the like. The base station DU 1602 may change an operation frequency to other frequency, for example, if a cell of the base station DU 1602 experiences large interferences (e.g., interference above a threshold value) such as from neighboring cells or other technologies. The base station DU 1602 determine and/or indicate that one or more wireless devices is to use a beam other than a certain beam if measurement results of the one or more wireless devices are similar to measurement results of the wireless device at a failure, for example, if the certain beam of a served cell of the base station DU 1602 experiences large interferences (e.g., interference above a threshold value) such as from neighboring cells or other technologies.

At least one beamforming configuration parameter may comprise one or more of: a beamforming direction configuration parameter, a beam sweeping configuration parameter, a synchronization signal (SS) and/or a reference signal (e.g., CSI-RS) configuration parameter, a beam recovery related parameter, a BRACH parameter, a preamble configuration parameter for beam recovery, a random access configuration parameter of one or more beams, and/or the like. The base station DU 1602 may reschedule random access resources and/or BRACH resources, and/or may reconfigure preambles to reduce random access contentions, for example, if the failure occurred because of a random access failure and/or because of a failure of a beam recovery procedure (e.g., out-of-sync).

At least one physical control channel scheduling parameter may comprise one or more of: a subframe pattern configuration parameter, a measurement subframe pattern configuration parameter, a transmission type parameter indicating a localized transmission and/or distributed transmission, a resource block assignment configuration parameter, a CSI-RS configuration parameter, and/or the like. At least one antenna configuration parameter may comprise one or more of: a default antenna configuration parameter, an antenna port configuration parameter, a number of CRS antenna port parameter, and/or the like. At least one cell selection and/or reselection configuration parameter for one or more wireless devices may comprise one or more of: a power and/or time threshold parameter for cell selection and/or reselection of at least one wireless device (e.g., in communication with the base station), a cell priority configuration parameter for cell selection and/or reselection, and/or the like. The base station DU 1602 may increase a value of one or more power and/or time threshold parameters, for example, if a failure occurred because of a random access failure of a wireless device. Increasing values of one or more power and/or time threshold parameters may assist a wireless device in avoiding a failed cell (e.g., if the wireless device does not satisfy increased one or more thresholds).

The base station DU 1602 may reconfigure one or more IEs of system information. The system information may comprise one or more of system information block type 1 to 21, for example, based on the wireless device information. At least one interference control parameter may comprise one or more almost blank subframe configuration parameters, one or more CoMP interference management related parameters, and/or the like. The base station DU 1602 may schedule resource blocks for a neighboring cell and/or a failed cell not to use the resource blocks simultaneously, for example, if a failure occurred because of interference from the neighboring cell of the failed cell.

The base station DU 1602 and/or the base station CU 1603 may send (e.g., transmit, forward, etc.) at least one system information block comprising one or more radio resource configuration parameters. The at least one system information blocks may comprise at least one of the system information block type 1 to 21. The base station DU 1602 and/or the base station CU 1603 may send (e.g., transmit, forward, etc.) at least one cell configuration parameter for one or more wireless devices (e.g., via MAC CE, DCI, and/or an RRC message). The one or more wireless devices may comprise the wireless device 1601. The base station DU 1602 may send (e.g., transmit, forward, etc.) a second message 1612 (e.g., at least one system information blocks comprising one or more radio resource configuration parameters) to the base station CU 1603. The second message 1612 may comprise configuration parameters (e.g., one or more radio resource configuration parameters). The base station CU 1603 may send (e.g., transmit, forward, etc.), to the base station DU 1602, a second RRC message 1613-A. The second RRC message 1613-A may comprise the configuration parameters. The configuration parameters may be for the wireless device 1601. The base station DU 1602 may send (e.g., transmit, forward, etc.), to the wireless device 1601, a second RRC message 1613-B. The second RRC message 1613-B may comprise at least some of the same information as the second RRC message 1613-A. The second RRC message 1613-B may comprise the configuration parameters (e.g., configuration parameters for the wireless device 1601).

The base station CU 1603 may send (e.g., transmit, forward, etc.), to the base station DU 1602, a third message 1614-A. Additionally or alternatively, the base station CU 1603 may send (e.g., transmit, forward, etc.), to at least one of wireless devices 1601, 1604-A, 1604-B, 1604-C and/or any other wireless device, the third message 1614-A. The third message 1614-A may comprise configuration parameters for at least one of wireless devices 1604-A, 1604-B, and/or 1604-C (e.g., or any other wireless device such as the wireless device 1601). The configuration parameters may comprise one or more radio resource configuration parameters. The base station DU 1602 may determine, based on the configuration parameters in the third message, to which of a plurality of wireless devices (e.g., wireless devices 1601, 1604-A, 1604-B, and/or 1604-C, or any other wireless device) the base station DU 1602 should send the third message. The base station DU 1602 may send (e.g., transmit, forward, etc.), to the at least one of wireless devices 1604-A, 1604-B, and/or 1604-C (e.g., or any other wireless device such as the wireless device 1601), a third message 1614-B. The base station DU 1602 may send (e.g., transmit, forward, etc.) the third message 1614-B based on the determining to which of the plurality of wireless devices to send the third message 1614-B. The third message 1614-B may comprise at least some of the same information as the third message 1614-A. The third message 1614-B may comprise the configuration parameters for at least one of wireless devices 1604-A, 1604-B, and/or 1604-C (e.g., or any other wireless device such as the wireless device 1601).

The first message (e.g., 1610-A and/or 1610-B) may comprise the wireless device (e.g., UE) information and/or one or more second radio resource configuration parameters, for example, that may be determined by the base station CU 1603 for the wireless device 1601 and/or one or more wireless devices 1604-A, 1604-B, and/or 1604-C. The base station CU 1603 may determine the one or more second radio resource configuration parameters based on the wireless device (e.g., UE) information received from the wireless device 1601 (and/or from the base station DU 1602). The one or more second radio resource configuration parameters may be for an uplink and/or downlink transmission and/or for a sidelink (e.g., wireless device-to-wireless device) transmission.

The one or more second radio resource configuration parameters may comprise one or more of: a beam configuration parameter; a bandwidth part (BWP) configuration parameter; a transmission power configuration parameter; a frequency configuration parameter; a beamforming configuration parameter; a physical control channel scheduling parameter; an antenna configuration parameter; a cell selection and/or reselection configuration parameter for one or more wireless devices (e.g., 1601, 1604-A, 1604-B, and/or 1604-C); system information; an interference control parameter; an MBSFN configuration parameter, and/or the like.

The base station DU 1602 may determine one or more radio resource configuration parameters. The one or more radio resource configuration parameters may comprise, for example, one or more of: a beam configuration parameter, a bandwidth part (BWP) configuration parameter, a transmission power configuration parameter, a frequency configuration parameter, a beamforming configuration parameter, a physical control channel scheduling parameter, an antenna configuration parameter, a cell selection and/or reselection configuration parameter for one or more wireless devices, system information, an interference control parameter, an MBSFN configuration parameter, and/or the like. The base station DU 1602 may determine the one or more radio resource configuration parameters, for example, based on the one or more second radio resource configuration parameters and/or the wireless device information. The base station DU 1602 may configure one or more radio resource configuration parameters as may be indicated in the one or more second radio resource configuration parameters. The base station DU 1602 may configure one or more radio resource configuration parameters modified from the one or more second radio resource configuration parameters (e.g., based on the wireless device information). The base station DU 1602 may send (e.g., transmit, forward, etc.), to the base station CU 1603, one or more radio resource configuration parameters modified from the one or more second radio resource configuration parameters, for example, if the base station DU 1602 updates (e.g., modifies) the one or more second radio resource configuration parameters.

After or in response to determining the one or more radio resource configuration parameters based on the wireless device information, and/or after or in response to determining (e.g., configuring) the one or more radio resource configuration parameters based on the one or more second radio resource configuration parameters and/or the wireless device information, the base station DU 1602 may send the second message 1612. The second message 1612 may comprise the one or more radio resource configuration parameters for the wireless device 1601 and/or one or more wireless devices (e.g., 1601, 1604-A, 1604-B, and/or 1604-C). The second message 1612 may be a response message (e.g., in response to the first message 1611) indicating that the base station DU 1602 configures cell and/or radio parameters based on the one or more second radio resource configuration parameters provided by the base station CU 1603.

The base station CU 1603 may send (e.g., transmit, forward, etc.) the second RRC message 1613-A to the wireless device 1601 and/or one or more wireless devices (e.g., 1604-A, 1604-B, and/or 1604-C) via the base station DU 1602. After or in response to receiving the second RRC message 1613-A, the base station DU 1602 may send (e.g., transmit, forward, etc.) the second RRC message 1613-B to the wireless device 1601 and/or the one or more wireless devices (e.g., 1604-A, 1604-B, and/or 1604-C). The base station CU 1603 may send the second RRC message 1613-A via a second F1-C message (e.g., F1 control plane message). The second RRC message 1613-A and/or 1613-B may comprise one or more of: a DL RRC message transfer message, a wireless device (e.g., UE) context modification request message, a wireless device (e.g., UE) context modification confirm message, a wireless device (e.g., UE) context setup request message, and/or the like. The second F1-C message may comprise an RRC-Container IE comprising the second RRC message 1613-A and/or 16-13-B. In an example, the second RRC message 1613-A and/or 16-13-B may comprise a wireless device (e.g., UE) identifier of the wireless device (e.g., gNB-CU UE F1 AP ID, gNB-DU UE F1 AP ID, old gNB-DU UE F1 AP ID, and/or the like), a signaling radio bearer identifier associated with the second RRC message (e.g., SRB ID, which may comprise an integer value from 0 to 3, e.g., SRB1), and/or the like.

The base station DU 1602 may send (e.g., transmit, forward, etc.) the second RRC message 1613-B via a signaling radio bearer 1 (e.g., SRB1). The base station DU 1602 may not interpret (and/or may not decode) the second RRC message 1613-A. The second RRC message 1613-A and/or 16-13-B may comprise an RRC connection reconfiguration message (e.g., RRCConnectionReconfiguration message); an RRC connection setup, resume, and/or reestablishment message; and/or the like. The base station CU 1603 may send (e.g., transmit, forward, etc.) the second RRC message 1613-A via the F1 interface configured between the base station DU 1602 and the base station CU 1603.

The base station CU 1603 may send (e.g., transmit, forward, etc.) at least one system information block. The at least one system information block may comprise the one or more radio resource configuration parameters. The base station CU 1603 may send (e.g., transmit, forward, etc.), to the wireless device 1601, the at least one system information block via the base station DU 1602. The at least one system information block may comprise at least one of the system information block type 1 to 21. The base station DU 1602 and/or the base station CU 1603 may send (e.g., transmit, forward, etc.) at least one cell configuration parameter to one or more wireless devices (e.g., 1601, 1604-A, 1604-B, and/or 1604-C), for example, via MAC CE, DCI, and/or an RRC message. The one or more wireless devices may comprise the wireless device 1601. The wireless device 1601 may use one or more radio resource configuration parameters indicated via the second RRC message 1613-B to send (e.g., transmit, forward, etc.) transport blocks via an uplink and/or a sidelink. The wireless device 1601 may use one or more resource configuration parameters indicated via the second RRC message 1613-B to receive transport blocks via a downlink. The base station DU 1602 may send (e.g., transmit, forward, etc.), to the wireless device 1601 via a PDCCH (e.g., DCI) and/or via a MAC CE, an activation (and/or deactivation) indication to activate (and/or deactivate) one or more radio resources indicated via the second RRC message.

The base station CU 1693 may send (e.g., transmit, forward, etc.), to the wireless device 1601 via an RRC message (e.g., the second RRC message and/or an additional RRC message), an activation and/or deactivation indication to activate and/or deactivate the one or more radio resources and/or the one or more radio configurations indicated via the second RRC message. The second RRC message may comprise an activation indication for the one or more radio resources and/or the one or more radio configurations. The wireless device 1601 may start an uplink transmission via the one or more radio resources, and/or use the one or more radio configurations at any moment and/or in a certain timing (e.g., which may be configured by an RRC signaling or pre-defined) after the configuration is completed, for example, if the L1 activation (e.g., DCI) is not configured (e.g., the second RRC message 1613-A and/or 1613-B comprises the activation indication).

Figure 17:
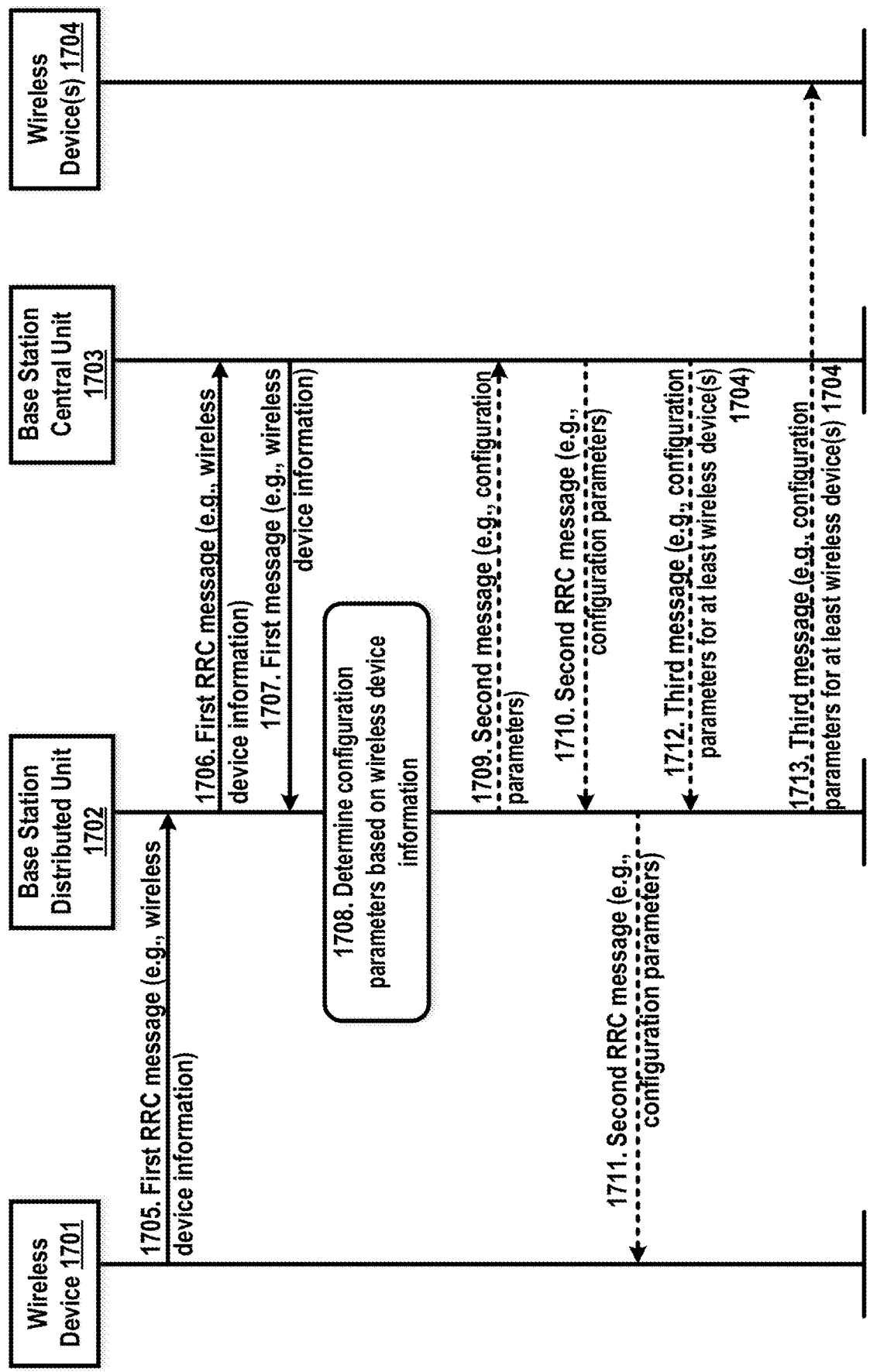
FIG. 17 shows an example data flow for messaging associated with wireless device information.

FIG. 17 shows an example data flow for messaging associated with wireless device information. At step 1705, a wireless device 1701 may send, to a base station DU 1702, a first RRC message. The wireless device 1701 may send the first RRC message to the base station CU 1703 via the base station DU 1702. The base station DU 1702 may receive, from the wireless device 1701, the RRC message. The first RRC message may comprise wireless device (e.g., user equipment (UE)) information of the wireless device. The wireless device information may comprise one or more of: random access report information (e.g., random access report information element (IE)); a connection establishment failure indication (e.g., connection establishment failure report IE); a power preference indication (e.g., power preference indication IE) indicating the wireless device prefers a configuration for power saving; a bandwidth preference (e.g., bandwidth preference IE); a radio link monitoring (RLM) indication (e.g., RLM report IE); a delay budget indication (e.g., delay budget report IE) indicating a preferred adjustment to connected mode discontinuous reception (DRX) or coverage enhancement configuration; a logged measurement indication (e.g., a logged measurement report IE); a mobility history indication (e.g., a mobility history report IE) indicating at least one time value of stay in recently visited cells; and/or a MeasResultMBSFN IE. At step 1706, the base station DU 1702 may send (e.g., transmit, forward, etc.), to the base station CU 1703 which may receive, the first RRC message (e.g., comprising the wireless device information). The base station DU 1702 may send (e.g., transmit, forward, etc.), to the base station CU 1703 via an F1 interface, the first RRC message (e.g., without interpretation by the base station DU 1702). At step 1707, the base station CU 1703 may send (e.g., transmit, forward, etc.), to the base station DU 1702 which may receive, a first message comprising the wireless device information. At step 1702, the base station DU 1702 may determine one or more radio resource configuration parameters based on the wireless device information. At step 1709, the base station DU 1702 may send (e.g., transmit, forward, etc.), to the base station CU 1703, a second message comprising configuration parameters (e.g., the one or more radio resource configuration parameters).

At step 1710, the base station CU 1703 may send (e.g., transmit, forward, etc.), to the base station DU 1702 which may receive, a second RRC message comprising the configuration parameters (e.g., the one or more radio resource configuration parameters). At step 1711, the base station DU may send (e.g., transmit, forward, etc.), to the wireless device 1701, the second RRC message (e.g., without interpretation by the base station DU 1702). At step 1712, the base station CU 1703 may send (e.g., transmit, forward, etc.), to the base station DU 1702, a third message. The third message may comprise configuration parameters (e.g., one or more second radio resource configuration parameters) for one or more wireless devices 1704. At step 1713, the base station DU 1702 may send (e.g., transmit, forward, etc.), to the one or more wireless devices 1704, the third message (e.g., comprising the configuration parameters such as one or more second radio resource configuration parameters).

A random access report may comprise one or more of: a first number of preambles sent IE indicating a first number of preambles sent during a random access process, and/or a first contention detected IE indicating contention was detected for at least one of transmitted preambles during the random access process. A logged measurement report IE may comprise one or more of: an absolute time stamp IE indicating an absolute time at which a logged measurement configuration logging is provided from a base station; a trance reference IE; and/or the like. A connection establishment failure report IE may comprise at least one of a failed cell identifier of a failed cell, a location information IE, a failed cell measurement result IE, a neighbor cell measurement result IE, a second number of preambles sent IE indicating a second number of preambles, a second contention detected IE, a maximum transmission power reached IE, and/or a time since failure IE.

A mobility history report may comprise a visited cell information list comprising at least one of at least one visited cell identifier of at least one visited cell, at least one carrier frequency value of the at least one visited cell, and/or at least one time spent IE indicating at least one time spent in the at least one visited cell. The visited cell information list may comprise, for example, for at least one visited cell: an identifier (e.g., an ID of the at least one visited cell), an indication of a frequency (e.g., a carrier frequency value of the at least one visited cell), and/or a time (e.g., a time spent in the at least one visited cell). The visited cell information list may comprise, for example, for each of a plurality of visited cells: an identifier (e.g., an ID of a visited cell), an indication of a frequency (e.g., a carrier frequency value of a visited cell), and/or a time (e.g., a time spent in a visited cell). The visited cell information list may comprise, for example, at least a first list associated with a first visited cell and/or a second list associated with a second visited cell. The first list associated with the first visited cell may comprise, for example, a first identifier (e.g., an ID of a first visited cell), a first indication of a frequency (e.g., a carrier frequency value of the first visited cell), and/or a first time (e.g., a time spent in the first visited cell). The second list associated with the second visited cell may comprise, for example, a second identifier (e.g., an ID of a second visited cell), a second indication of a frequency (e.g., a carrier frequency value of the second visited cell), and/or a second time (e.g., a time spent in the second visited cell). The first visited cell may be a most recently visited cell. The second visited cell may be a cell visited prior to the first visited cell. The visited cell information list may comprise any number of the above lists, each of which may be associated with, for example, a visited cell.

A bandwidth preference (e.g., bandwidth preference IE) may comprise at least one of a downlink preference IE indicating a preference for a configuration of a maximum physical downlink shared channel (PDSCH) bandwidth, an uplink preference IE indicating a preference for a configuration of a maximum physical uplink shared channel (PUSCH) bandwidth, and/or a sidelink preference IE indicating a preference for a configuration of a maximum physical sidelink channel bandwidth. An RLM report (e.g., RLM report IE) may comprise at least one of an RLM event IE indicating one of early-out-of-sync or early-in-sync, and/or an excess repetition machine type communication physical downlink control channel (MPDCCH) IE indicating an excess number of repetitions on MPDCCH. A delay budget report (e.g., delay budget report IE) may comprise at least one of a type 1 IE and/or a type 2 IE.

Any one or more methods described herein with respect to a base station CU (e.g., by the base station CU 1703 and or by the base station CU 1603) may be performed by any combination of one or more of: a base station DU (e.g., a second base station DU), a base station CU, and/or a neighboring base station. Any one or more methods described herein with respect to a base station DU (e.g., by the base station DU 1702 and or by the base station DU 1602) may be performed by any combination of one or more of: a base station DU (e.g., a second base station DU), a base station CU, and/or a neighboring base station. Multiple base stations (e.g., multiple base station DUs) may be used to perform one or more methods described herein, for example, for dual-connectivity and/or for carrier aggregation.

Figure 18:
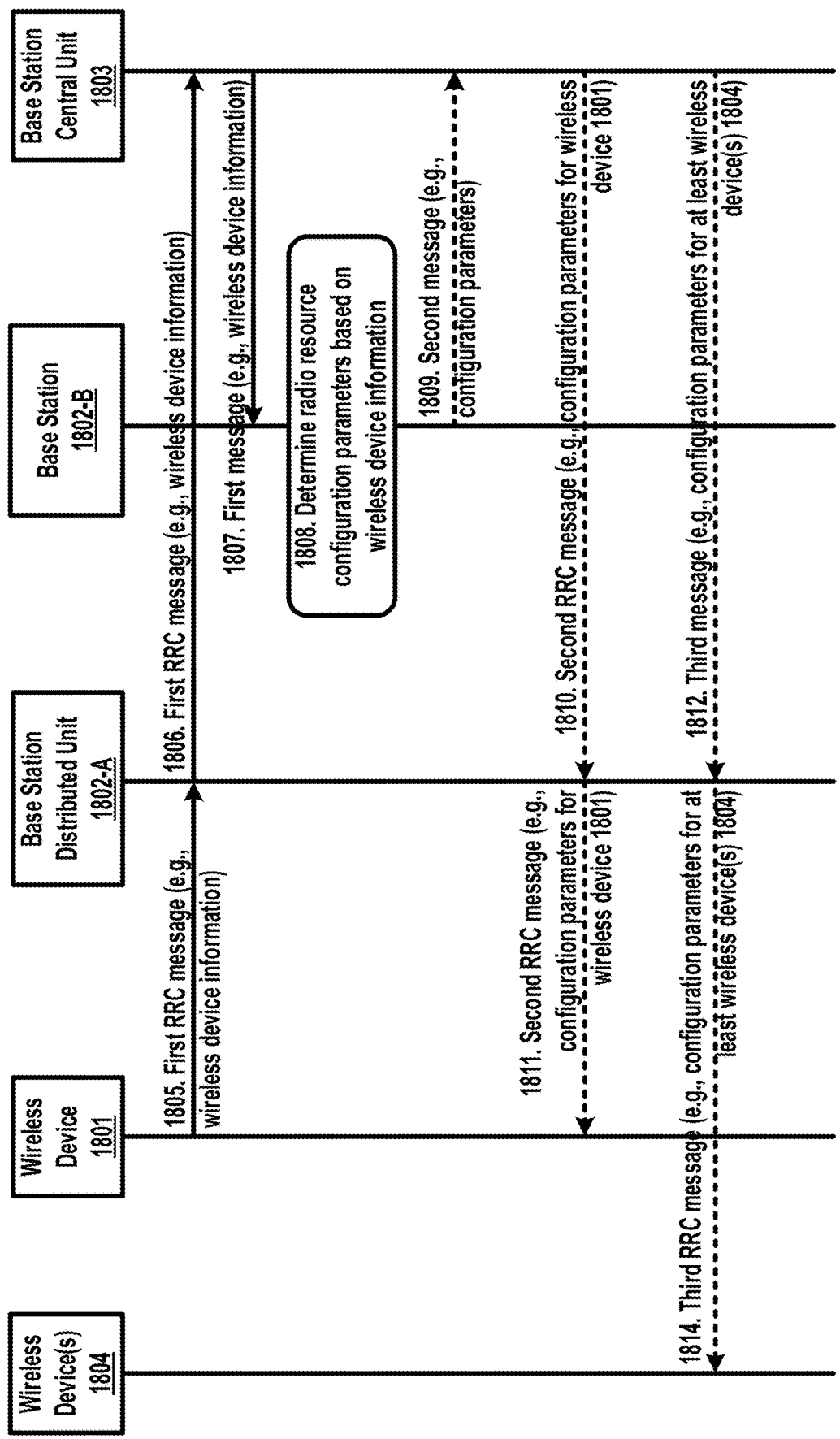
FIG. 18 shows an example data flow of messaging associated with wireless device information.

FIG. 18 shows an example data flow for messaging associated with wireless device information. A wireless device 1801 may communicate with a base station central unit (CU) 1803 via one or more base station DUs (e.g., 1802-A and/or 1802-B) and/or via a second base station (e.g., 1802-B). The base station 1802-B may comprise a base station DU and/or a second base station. A first base station may comprise the base station CU 1803 and one or more base station DUs (e.g., 1802-A and/or 1802-B). A second base station may comprise the base station 1802-B. The messaging shown in FIG. 18 may comprise some or all of the messaging described above regarding FIG. 17, unless indicated otherwise herein. Steps 1805-1813 may correspond to steps 1705-1713, respectively, described above regarding FIG. 17, except that one or more steps by the base station DU 1702 may be performed by any combination of the base station DU 1802-A and/or the base station 1802-B.

At step 1808, the base station 1802-B may determine, based on the wireless device information, configuration parameters for the wireless device 1801. The base station 1802-B may determine, based on the wireless device information, configuration parameters (e.g., radio resource configuration parameters) for the wireless device 1801. At step 1809, the base station 1802-B may send, to the base station CU 1803, a second message. The second message may comprise configuration parameters. The configuration parameters may comprise radio resource configuration parameters for the wireless device 1801. The configuration parameters may comprise, for example, a configured grant for the wireless device 1801. At step 1810, the base station CU 1803 may send, to the base station DU 1802-A, a second RRC message. The second RRC message may comprise the configuration parameters for the wireless device 1801. At step 1811, the base station DU 1802-A may send (e.g., transmit, forward, etc.), to the wireless device 1801, the second RRC message comprising the configuration parameters.

Figure 19:
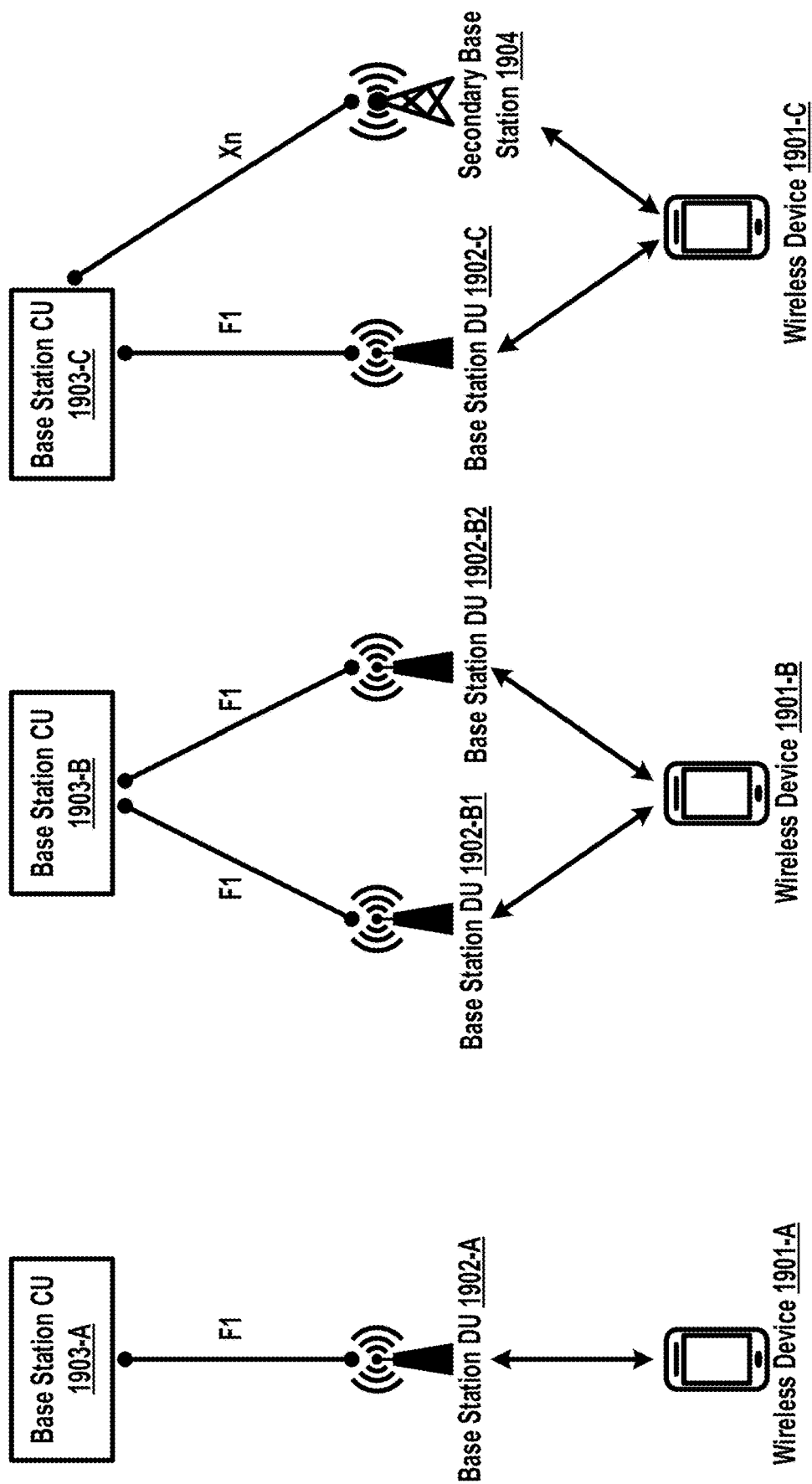
FIG. 19 shows examples of communications between a wireless device and a base station.

FIG. 19 shows examples of communications between a wireless device and a base station. Communications to and from devices in FIG. 19 may comprise any of the communications described above regarding FIGS. 16-18. A wireless device 1901-A may communicate with a base station CU 1903-A via a base station DU 1902-A. A wireless device 1901-B may communicate with a base station CU 1903-B via multiple base station DUs 1902-B1 and 1902-B2. The wireless device 1901-C may communicate with a base station CU 1903-C via a base station DU 1902-C and a secondary base station 1904. The base station CUs 1903-A, 1903-B, and 1903-C may communicate with the base station DUs 1902-A, 1902-B, and 1902-C, respectively, via an F1 interface. The base station CU 1903-C may communicate with the secondary base station 1904 via an Xn interface.

Figure 20:
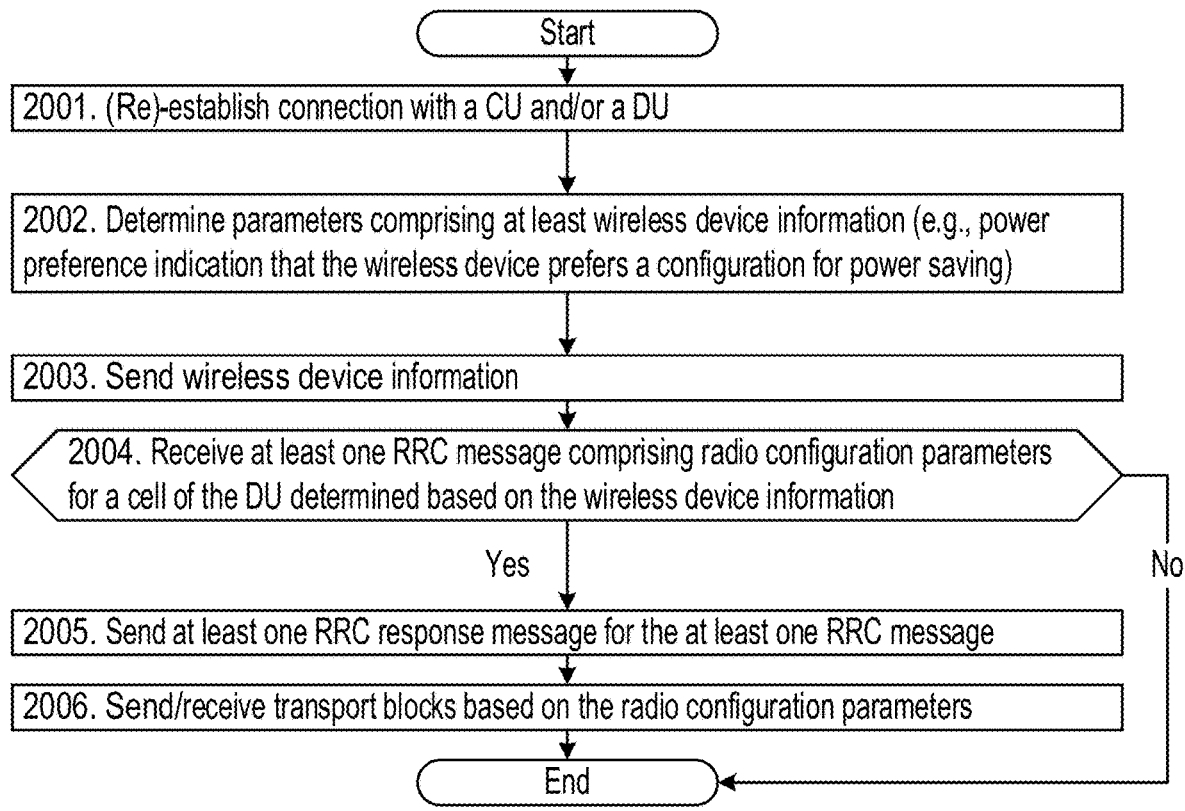
FIG. 20 shows an example of configuring a wireless device with one or more power configuration parameters based on wireless device information.

FIG. 20 shows an example of configuring a wireless device with parameters based on wireless device information (e.g., power preference indication that the wireless device prefers a configuration for power saving). At step 2001, a wireless device may establish and/or re-establish a connection with a base station, such as a base station CU and/or a base station DU. At step 2002, the wireless device may determine one or more parameters comprising at least wireless device information. The wireless device information may comprise one or more of: a random access report (e.g., IE), a connection establishment failure report (e.g., IE), a power preference indication (e.g., IE) indicating that the wireless device prefers a configuration for power saving, a bandwidth preference, an RLM report (e.g., IE), a delay budget report (e.g., IE) indicating a preferred adjustment to a connected mode DRX and/or coverage enhancement configuration, a logged measure report (e.g., IE), a mobility history report (e.g., IE) indicating at least one time value of stay in recently visited cells; and/or a MBSFN measurement result (e.g., IE). At step 2004, the wireless device may receive (and/or determine whether it receives), from the base station CU (e.g., via the base station DU), at least one RRC message. The at least one RRC message may comprise configuration parameters (e.g., radio configuration parameters) for a cell of the base station DU determined based on the wireless device information. If the wireless device receives (and/or determines that it receives) the at least one RRC message, the wireless device may send (e.g., transmit), to the base station CU (e.g., via the base station DU), at least one RRC response message for the at least one RRC message. At step 2006, the wireless device may send transport blocks to the base station DU and/or receive transport blocks from the base station DU. The wireless device may send and/or receive the transport blocks based on the configuration parameters (e.g., radio configuration parameters).

Figure 21:
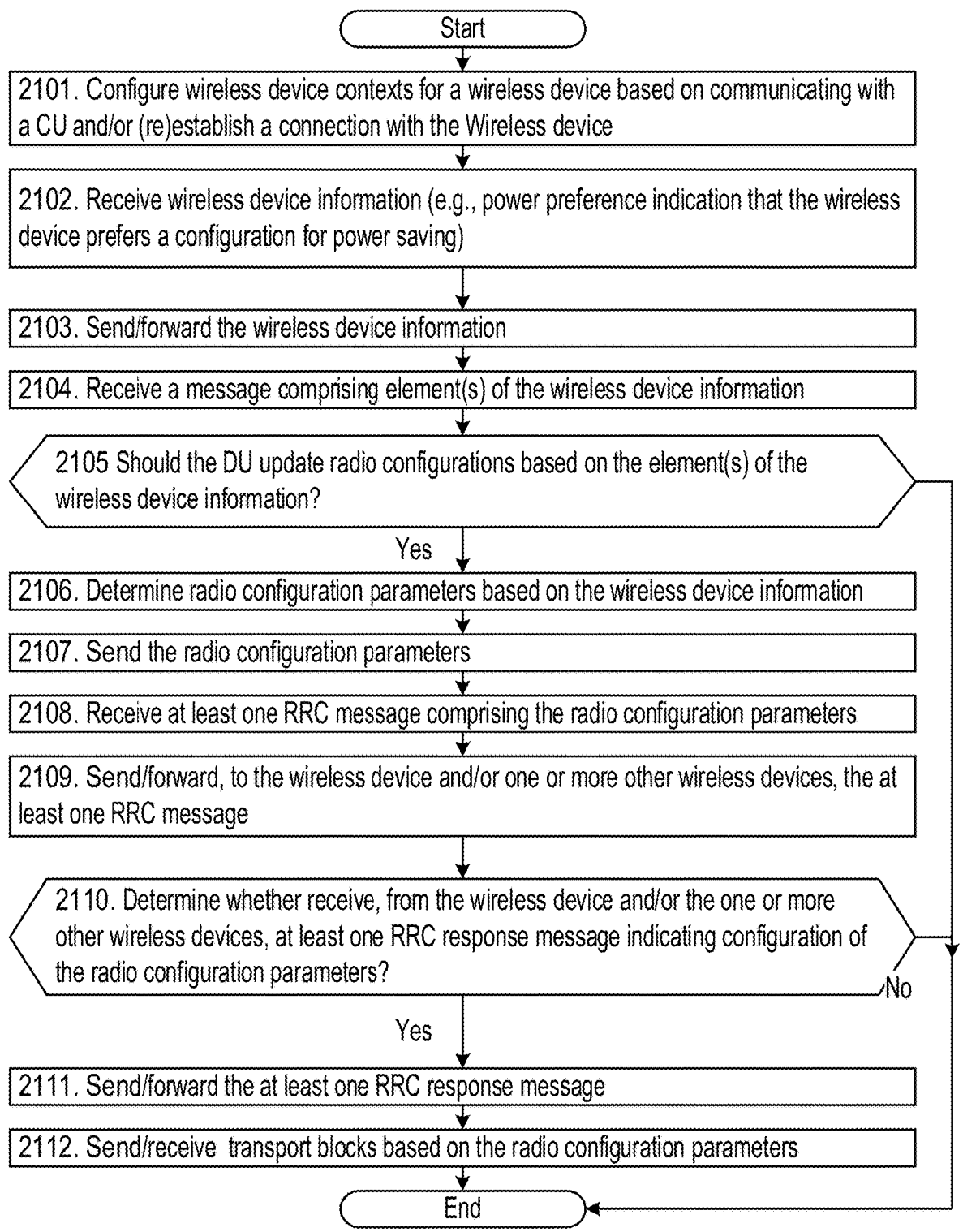
FIG. 21 shows an example of providing one or more power configuration parameters that may be performed by a base station distributed unit.

FIG. 21 shows an example of providing configuration parameters that may be performed by a base station distributed unit (DU). At step 2101, a base station DU may configure wireless device (e.g., UE) contexts for a wireless device and/or establish (and/or re-establish) a connection with the wireless device. The base station DU may configure the wireless device contexts based on communicating with a base station CU. At step 2102, the base station DU may receive, from the wireless device, wireless device (e.g., UE) information. The wireless device information may comprise, for example, a power preference indication that the wireless device prefers a configuration for power saving. The wireless device information may comprise at least one of: a random access report (e.g., IE), a connection establishment failure report (e.g., IE), a power preference indication (e.g., IE) indicating that the wireless device prefers a configuration for power saving, a bandwidth preference (e.g., IE), an RLM report (e.g., IE), a delay budget report (e.g., IE) indicating a preferred adjustment to a connection mode DRX and/or a coverage enhancement configuration, a logged measurement report (e.g., IE), a mobility history report (e.g., IE) indicating at least one time value of stay in recently visited cells, and/or an MBSFN measurement result (e.g., IE). At step 2103, the base station DU may send (e.g., transmit, forward, etc.), to the base station CU, the wireless device information. At step 2104, the base station DU may receive, from the base station CU, a message. The message may comprise one or more elements of the wireless device information.

At step 2105, the base station DU may determine whether the base station DU should (e.g., needs to) update radio configurations based on the one or more elements of the wireless device information. If the base station DU determines that it should update radio configurations, at step 2106, the base station DU may determine one or more radio configuration parameters based on the wireless device information. At step 2107, the base station DU may send (e.g., transmit, forward, etc.), to the base station CU, the one or more radio configuration parameters. At step 2108, the base station DU may receive, from the base station CU, at least one RRC message comprising the one or more radio configuration parameters. At step 2109, the base station DU may send (e.g., transmit, forward, etc.), to the wireless device and/or to one or more other wireless devices, the at least one RRC message comprising the one or more configuration parameters.

At step 2110, the base station DU may receive (and/or determine whether it receives), from the wireless device and/or from the one or more other wireless devices, at least one RRC response message indicating configuration of the radio configuration parameters. If the base station DU receives the at least one RRC response message, at step 2111, the base station DU may send (e.g., transmit, forward, etc.), to the base station CU, the at least one RRC response message. At step 2112, the base station DU may receive, from the wireless device based on the radio configuration parameters, one or more transport blocks; and/or the base station DU may send (e.g., transmit, forward), to the base station CU based on the radio configuration parameters, the one or more transport blocks and/or data of the one or more transport blocks.

Figure 22:
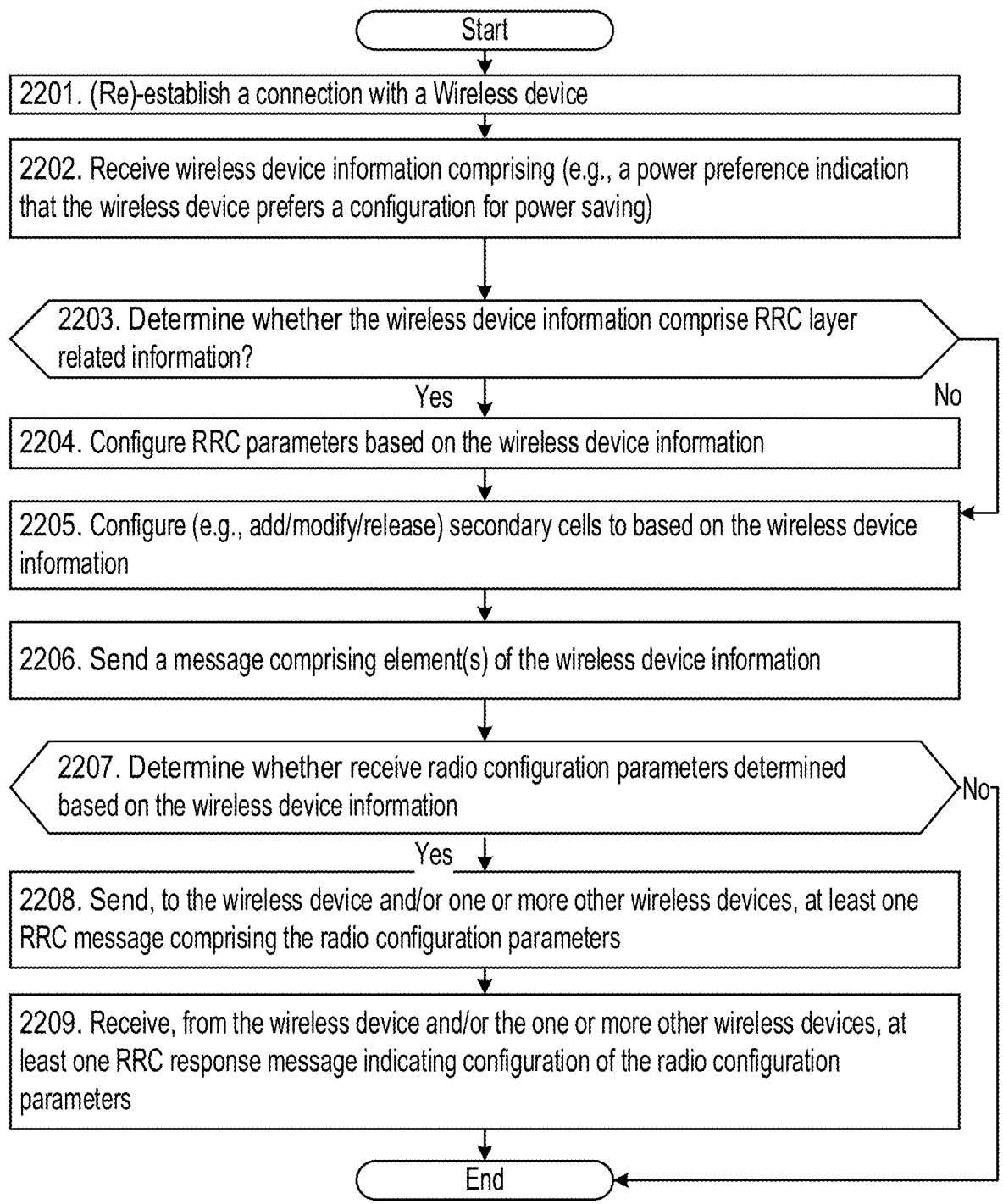
FIG. 22 shows an example of providing one or more power configuration parameters that may be performed by a base station central unit.

FIG. 22 shows an example of providing configuration parameters that may be performed by a base station central unit (CU). At step 2201, a base station CU may establish and/or re-establish a connection with a wireless device. At step 2202, the base station CU may receive, from the wireless device (e.g., via a base station DU), wireless device (e.g., UE) information. The wireless device information may comprise, for example, a power preference indication that the wireless device prefers a configuration for power saving. The wireless device information may comprise at least one of: a random access report (e.g., IE), a connection establishment failure report (e.g., IE), a power preference indication (e.g., IE) indicating that the wireless device prefers a configuration for power saving, a bandwidth preference (e.g., IE), an RLM report (e.g., IE), a delay budget report (e.g., IE) indicating a preferred adjustment to a connection mode DRX and/or a coverage enhancement configuration, a logged measurement report (e.g., IE), a mobility history report (e.g., IE) indicating at least one time value of stay in recently visited cells, and/or an MBSFN measurement result (e.g., IE). The traffic pattern information may indicate at least one of: a periodicity (e.g., a data arrival periodicity), an offset (e.g., a data arrival timing offset), and/or a size (e.g., a message size, a data size, etc.). At step 2203, the base station CU may determine whether the wireless device information comprises RRC layer related information (e.g., mobility preference, cell preference, moving speed, moving pattern, mobility history, and/or the like). If the base station determines that the wireless device information comprises RRC layer relation information, at step 2204, the base station CU may configure, based on the wireless device information, RRC parameters. At step 2205, the base station CU may configure (e.g., add, modify, and/or release) secondary cells based on the wireless device information. The base station CU may configure the secondary cells, for example, if the base station CU determines that the wireless device information does not comprise RRC layer related information (e.g., at step 2203) and/or if the base station CU configures RRC parameters based on the wireless device information (e.g., at step 2204). At step 2206, the base station CU may send (e.g., transmit), to a base station DU, a message. The message may comprise one or more elements of the wireless device information.

At step 2207, the base station CU may receive (and/or determine whether it receives), from the base station DU, one or more radio configuration parameters (e.g., that may be determined based on the wireless device information). The one or more radio configuration parameters may be determined, for example, based on the wireless device information. At step 2208, the base station CU may send (e.g., transmit), to the wireless device (e.g., via the base station DU) and/or to one or more other wireless devices (e.g., via the base station DU), at least one RRC message comprising the one or more radio configuration parameters. At step 2209, the base station CU may receive, from the wireless device (e.g., via the base station DU) and/or from the one or more other wireless devices (e.g., via the base station DU), at least one RRC response message. The at least one RRC response message may indicate configuration of the one or more radio configuration parameters.

A wireless device may determine wireless device information comprising an indication of a power configuration for the wireless device. The wireless device may send, to a base station distributed unit (DU) that may receive, a first radio resource control (RRC) message comprising wireless device information. The wireless device information may comprise an indication of a power configuration for the wireless device. The indication of the power configuration for the wireless device may comprise a power preference indication indicating that the wireless device prefers a configuration for power saving. The indication of the power configuration for the wireless device may comprise one or more of a random access report (e.g., random access report information element (IE)), a connection establishment failure report (e.g., a connection establishment failure report IE), a power preference indication (e.g., power preference indication IE) indicating that the wireless device prefers a power configuration for power saving, a bandwidth preference (e.g., a bandwidth preference IE), a radio link monitoring (RLM) report (e.g., an RLM report IE), a delay budget report (e.g., a delay budget report IE) indicating a preferred adjustment to connection mode discontinuous reception (DRX) or coverage enhancement configuration, a logged measurement report (e.g., a logged measurement report IE), a mobility history report (e.g., a mobility history report IE) which may indicate at least one time value of stay in recently visited cells, a measurement report, and/or a measurement result (e.g., a MeasResultMBSFN IE). The wireless device information may comprise at least one of: a first number of preambles sent IE indicating a first number of preambles sent during a random access process; or a first contention detected IE indicating contention was detected for at least one of transmitted preambles during the random access process. The wireless device information may comprise at least one of: an absolute time stamp IE indicating an absolute time that a logged measurement configuration logging is provided from a base station; or a trance reference IE. The wireless device information may comprise at least one of: a failed cell identifier of a failed cell, a location information IE, a failed cell measurement result IE, a second number of preambles sent IE indicating a second number of preambles, a second contention detected IE, a maximum transmission power reached IE, and/or a time since failure IE. The wireless device information may comprise a visited cell information list comprising at least one of: a visited cell identifier of at least one visited cell, or a time spent IE indicating that at least one time spent in the at least one visited cell. The wireless device information may comprise at least one of: a downlink preference IE indicating a preference for a configuration of a maximum physical downlink shared channel (PDSCH) bandwidth, an uplink IE indicating a preference for a configuration of a maximum physical uplink shared channel (PUSCH) bandwidth, and/or a sidelink (e.g., wireless device-to-wireless device) preference IE indicating a preference for a configuration of a maximum physical sidelink channel. The wireless device information may comprise at least one of: an RLM event (e.g., an RLM event IE) indicating an early-out-of-sync and/or an earlier-in-sync, and/or an excess repetition machine type communication physical downlink control channel (MPDCCH) IE indicating an excess repetition machine type communications on an MPDCCH. The wireless device information may comprise a delay budget report IE comprising at least one of: a type 1 IE, and/or a type 2 IE. The base station DU may send, to a base station central unit (CU) that may receive, the first RRC message comprising the wireless device information. The wireless device information may comprise overheating assistance information. The overheating assistance information may indicate that the wireless device is overheated and/or in a high load status. The overheating assistance information may provide recommended configurations to resolve overheating issue and/or overload status. The overheating assistance information may comprise at least one of: a reduced component carrier field, a reduced bandwidth field, a reduced MIMO field, and/or the like. The reduced component carrier field (e.g., reducedCCsDL, reducedCCsUL, etc.) may indicate that the wireless device needs to reduce the number of component carriers (e.g., secondary cells, serving cells, etc.) for uplink and/or downlink. The reduced component carrier field may indicate that the wireless device needs to use a less than or equal number of component carriers (e.g., secondary cells, serving cells, etc.) than a value indicated for uplink and/or downlink. The reduced bandwidth field (e.g., reducedBW-FR1-DL, reducedBW-FR1-UL, reducedBW-FR2-DL, reducedBW-FR2-UL, etc.) may indicate that the wireless device needs to reduce the number of aggregated bandwidth for uplink and/or downlink. The reduced bandwidth field may indicate that the wireless device needs to use a less than or equal number of aggregated bandwidth than a value indicated for uplink and/or downlink. The reduced MIMO field (e.g., reducedMIMO-LayersFR1-DL, reducedMIMO-LayersFR1-UL, reducedMIMO-LayersFR2-DL, reducedMIMO-LayersFR2-UL, etc.) may indicate that the wireless device needs to reduce the number of MIMO layers for uplink and/or downlink. The reduced MIMO field may indicate that the wireless device needs to employ a smaller or equal number of MIMO layers than/to a value indicated for uplink and/or downlink.

The base station DU may send the first RRC message by forwarding (e.g., without interpreting, without decoding, etc.), to the base station CU via an F1 interface, the first RRC message from the wireless device (e.g., without interpretation and/or decoding of the first RRC message). The base station CU may receive the first RRC message. The base station CU may determine that the wireless device information is associated with a wireless device that is associated with the base station DU. The base station CU may send to the base station DU that may receive, a first message comprising the wireless device information. The base station DU may determine, based on the wireless device information, at least one power configuration parameter. The base station DU may send, to the base station CU that may receive, a second message comprising the at least one power configuration parameter. The base station CU may send, to the wireless device (which may receive) via the base station DU (which may receive and/or forward), a second RRC message comprising a power configuration parameter (e.g., the at least one power configuration parameter and/or one or more other power configuration parameters) that are based on the wireless device information. The base station DU may forward (e.g., without interpreting, without decoding, etc.), to the wireless device which may receive, the second RRC message (e.g., without interpretation and/or decoding of the second RRC message). The wireless device may send, to the base station DU and based on a power configuration parameter (e.g., the at least one power configuration parameter and/or one or more other power configuration parameters), at least one transport block. The base station CU may determine at least one configuration parameter for at least a second wireless device (e.g., which may include the wireless device and one or more additional wireless devices). The base station CU may send, to the base station DU which may receive, a third message comprising that at least one configuration parameter for at least a second wireless device. The base station DU may forward (e.g., without interpreting, without decoding, etc.), to the at least the second wireless device, the third message comprising the at least one configuration parameter for the at least the second wireless device.

Figure 23:
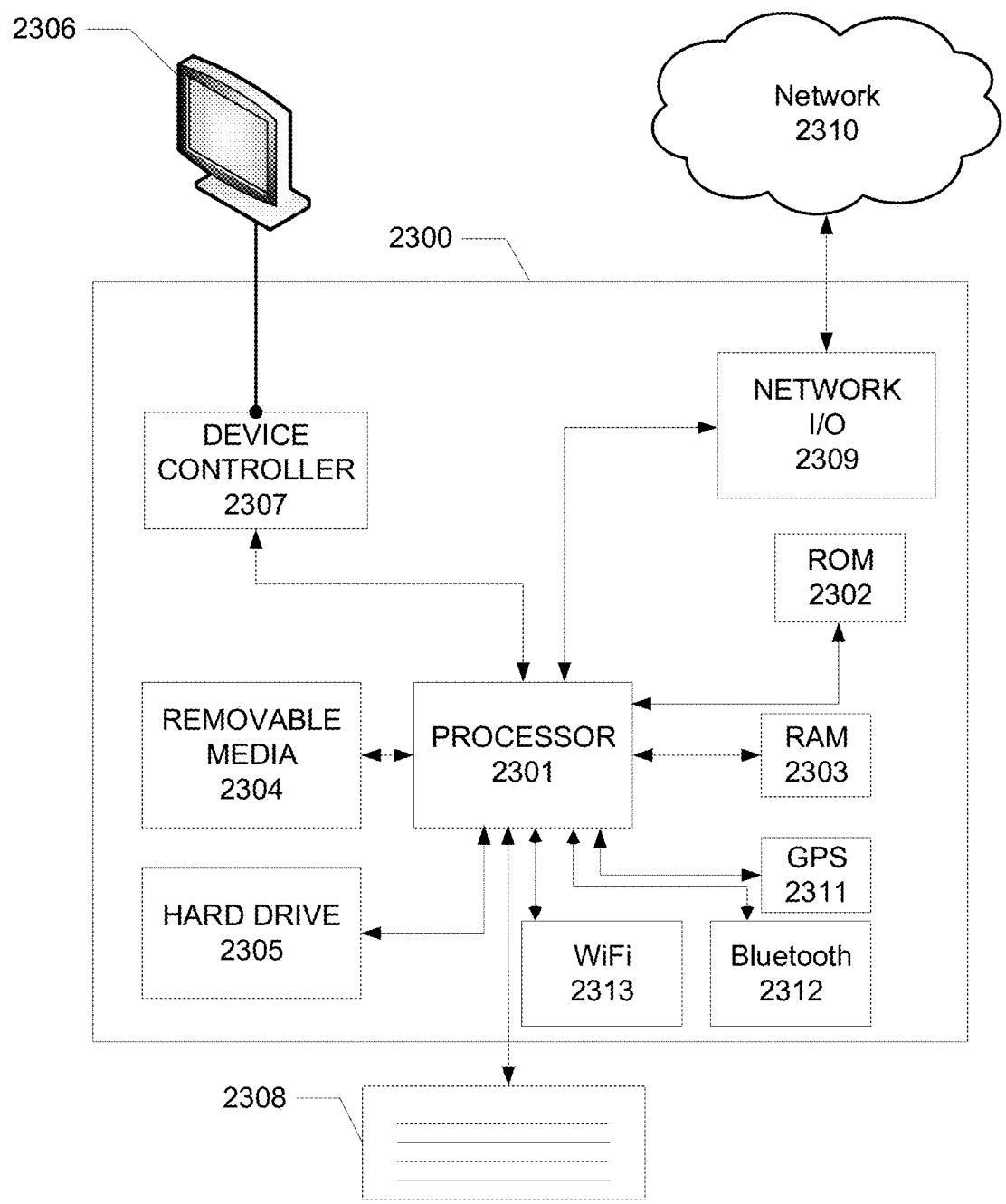
FIG. 23 shows example elements of a computing device that may be used to implement any of the various devices described herein.

FIG. 23 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 2300 may include one or more processors 2301, which may execute instructions stored in the random access memory (RAM) 2303, the removable media 2304 (such as a Universal Serial Bus (USB) drive, compact disk (CD) or digital versatile disk (DVD), or floppy disk drive), or any other desired storage medium. Instructions may also be stored in an attached (or internal) hard drive 2305. The computing device 2300 may also include a security processor (not shown), which may execute instructions of one or more computer programs to monitor the processes executing on the processor 2301 and any process that requests access to any hardware and/or software components of the computing device 2300 (e.g., ROM 2302, RAM 2303, the removable media 2304, the hard drive 2305, the device controller 2307, a network interface 2309, a GPS 2311, a Bluetooth interface 2312, a Wi-Fi interface 2313, etc.). The computing device 2300 may include one or more output devices, such as the display 2306 (e.g., a screen, a display device, a monitor, a television, etc.), and may include one or more output device controllers 2307, such as a video processor. There may also be one or more user input devices 2308, such as a remote control, keyboard, mouse, touch screen, microphone, etc. The computing device 2300 may also include one or more network interfaces, such as a network interface 2309, which may be a wired interface, a wireless interface, or a combination of the two. The network interface 2309 may provide an interface for the computing device 2300 to communicate with a network 2310 (e.g., a RAN, or any other network). The network interface 2309 may include a modem (e.g., a cable modem), and the external network 2310 may include communication links, an external network, an in-home network, a provider's wireless, coaxial, fiber, or hybrid fiber/coaxial distribution system (e.g., a DOCSIS network), or any other desired network. Additionally, the computing device 2300 may include a location-detecting device, such as a global positioning system (GPS) microprocessor 2311, which may be configured to receive and process global positioning signals and determine, with possible assistance from an external server and antenna, a geographic position of the computing device 2300.

The example in FIG. 23 may be a hardware configuration, although the components shown may be implemented as software as well. Modifications may be made to add, remove, combine, divide, etc. components of the computing device 2300 as desired. Additionally, the components may be implemented using basic computing devices and components, and the same components (e.g., processor 2301, ROM storage 2302, display 2306, etc.) may be used to implement any of the other computing devices and components described herein. For example, the various components described herein may be implemented using computing devices having components such as a processor executing computer-executable instructions stored on a computer-readable medium, as shown in FIG. 23. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, Wi-Fi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    sending, by a wireless device to a base station distributed unit (DU), a first radio resource control (RRC) message comprising an indication of a power configuration for the wireless device;
    receiving, by the wireless device from a base station central unit (CU) via the base station DU, a second RRC message comprising at least one power configuration parameter, wherein the at least one power configuration parameter is based on the indication; and
    sending, to the base station DU and based on the at least one power configuration parameter, at least one transport block.

2. The method of claim 1, wherein the power configuration for the wireless device comprises a power preference indication indicating that the wireless device prefers a configuration for power saving.

3. The method of claim 1, wherein the receiving the second RRC message comprises receiving the second RRC message forwarded by the base station DU from the base station CU.

4. The method of claim 1, wherein the at least one power configuration parameter is determined by the base station DU based on the indication of the power configuration for the wireless device.

5. The method of claim 1, wherein the first RRC message further comprises at least one of:
    random access information,
    connection establishment failure information,
    bandwidth preference information,
    radio link monitoring information,
    a logged measurement result, or
    mobility history information.

6. The method of claim 1, further comprising:
    sending, by the wireless device to the base station DU, one or more random access preambles.

7. The method of claim 1, wherein the second RRC message further comprises at least one of:
    a multicast-broadcast single frequency network (MBSFN) configuration parameter,
    a beamforming configuration parameter,
    a bandwidth part (BWP) configuration parameter, or
    a frequency configuration parameter.

8. The method of claim 1, further comprising:
    determining, by the wireless device, wireless device information comprising the indication of the power configuration for the wireless device.

9. A wireless device comprising:
one or more processors; and
memory storing instructions that, when executed by the one or more processors, cause the wireless device to:
send, to a base station distributed unit (DU), a first radio resource control (RRC) message comprising an indication of a power configuration for the wireless device;
receive, from a base station central unit (CU) via the base station DU, a second RRC message comprising at least one power configuration parameter, wherein the at least one power configuration parameter is based on the indication; and
send, to the base station DU and based on the at least one power configuration parameter, at least one transport block.

10. The wireless device of claim 9, wherein the power configuration for the wireless device comprises a power preference indication indicating that the wireless device prefers a configuration for power saving.

11. The wireless device of claim 9, wherein the instructions, when executed by the one or more processors, cause the wireless device to receive the second RRC message by receiving the second RRC message forwarded by the base station DU from the base station CU.

12. The wireless device of claim 9, wherein the at least one power configuration parameter is determined by the base station DU based on the indication of the power configuration for the wireless device.

13. The wireless device of claim 9, wherein the first RRC message further comprises at least one of:
random access information,
connection establishment failure information,
bandwidth preference information,
radio link monitoring information,
a logged measurement result, or
mobility history information.

14. The wireless device of claim 9, wherein the instructions, when executed by the one or more processors, further cause the wireless device to:
send, to the base station DU, one or more random access preambles.

15. The wireless device of claim 9, wherein the second RRC message further comprises at least one of:
a multicast-broadcast single frequency network (MBSFN) configuration parameter,
a beamforming configuration parameter,
a bandwidth part (BWP) configuration parameter, or
a frequency configuration parameter.

16. The wireless device of claim 9, wherein the instructions, when executed by the one or more processors, further cause the wireless device to:
determine wireless device information comprising the indication of the power configuration for the wireless device, wherein the first RRC message comprises the wireless device information.

17. A non-transitory computer-readable medium storing instructions that, when executed, configure a wireless device to:
send, to a base station distributed unit (DU), a first radio resource control (RRC) message comprising an indication of a power configuration for the wireless device;
receive, from a base station central unit (CU) via the base station DU, a second RRC message comprising at least one power configuration parameter, wherein the at least one power configuration parameter is based on the indication; and
send, to the base station DU and based on the at least one power configuration parameter, at least one transport block.

18. The non-transitory computer-readable medium of claim 17, wherein the power configuration for the wireless device comprises a power preference indication indicating that the wireless device prefers a configuration for power saving.

19. The non-transitory computer-readable medium of claim 17, wherein the instructions, when executed, configure the wireless device to receive the second RRC message by receiving the second RRC message forwarded by the base station DU from the base station CU.

20. The non-transitory computer-readable medium of claim 17, wherein the at least one power configuration parameter is determined by the base station DU based on the indication of the power configuration for the wireless device.

21. The non-transitory computer-readable medium of claim 17, wherein the first RRC message further comprises at least one of:
random access information,
connection establishment failure information,
bandwidth preference information,
radio link monitoring information,
a logged measurement result, or
mobility history information.

22. The non-transitory computer-readable medium of claim 17, wherein the instructions, when executed, further configure the wireless device to:
send, to the base station DU, one or more random access preambles.

23. The non-transitory computer-readable medium of claim 17, wherein the second RRC message further comprises at least one of:
a multicast-broadcast single frequency network (MBSFN) configuration parameter,
a beamforming configuration parameter,
a bandwidth part (BWP) configuration parameter, or
a frequency configuration parameter.

24. The non-transitory computer-readable medium of claim 17, wherein the instructions, when executed, further configure the wireless device to:
determine wireless device information comprising the indication of the power configuration for the wireless device, wherein the first RRC message comprises the wireless device information.

25. The method of claim 1, wherein the first RRC message comprises wireless device information.

26. A system comprising:
a base station central unit (CU); and
a wireless device configured to:
send, to a base station distributed unit (DU), a first radio resource control (RRC) message comprising an indication of a power configuration for the wireless device; and
send, to the base station DU and based on at least one power configuration parameter, at least one transport block,
wherein the base station CU is configured to:
send, to the wireless device via the base station DU, a second RRC message comprising the at least one power configuration parameter, wherein the at least one power configuration parameter is based on the indication.

27. The system of claim 26, wherein the power configuration for the wireless device comprises a power preference indication indicating that the wireless device prefers a configuration for power saving.

28. The system of claim 26, wherein the first RRC message further comprises at least one of:
   random access information,
   connection establishment failure information,
   bandwidth preference information,
   radio link monitoring information,
   a logged measurement result, or
   mobility history information.

29. The system of claim 26, wherein the wireless device is further configured to send, to the base station DU, one or more random access preambles.

30. The system of claim 26, wherein the second RRC message further comprises at least one of:
   a multicast-broadcast single frequency network (MBSFN) configuration parameter,
   a beamforming configuration parameter,
   a bandwidth part (BWP) configuration parameter, or
   a frequency configuration parameter.

31. The system of claim 26, wherein the wireless device is further configured to determine wireless device information comprising the indication of the power configuration for the wireless device, wherein the first RRC message comprises the wireless device information.

\* \* \* \* \*

UNITED STATES PATENT AND TRADEMARK OFFICE
CERTIFICATE OF CORRECTION

PATENT NO. : 11,678,264 B2
APPLICATION NO. : 17/545621
DATED : June 13, 2023
INVENTOR(S) : Park et al.

It is certified that error appears in the above-identified patent and that said Letters Patent is hereby corrected as shown below:

On the Title Page

Page 3, Column 2, item (56) Other Publications, Line 43:
Delete "fordownlink" and insert --for downlink-- therefor Page 3, Column 2, item (56) Other Publications, Line 60:
Delete "transactiosn" and insert --transactions-- therefor Page 5, Column 1, item (56) Other Publications, Line 37:
Delete "#9 9bis," and insert --#99bis,-- therefor Page 5, Column 2, item (56) Other Publications, Line 1:
Delete "#9 9bis," and insert --#99bis,-- therefor Page 6, Column 2, item (56) Other Publications, Line 70:
Delete "2019--Exended" and insert --2019-Extended-- therefor Page 7, Column 1, item (56) Other Publications, Line 4:
Delete "Specificaiton" and insert --Specification-- therefor In the Specification Column 12, Detailed Description, Line 38:
After "station 2", insert --120B-- therefor Column 13, Detailed Description, Line 66:
After "channel", insert --.-- therefor Column 18, Detailed Description, Line 9:
Delete "ADM-RS" and insert --A DM-RS-- therefor Signed and Sealed this
Seventeenth Day of September, 2024

Katherine Kelly Vidal
*Director of the United States Patent and Trademark Office*

Column 22, Detailed Description, Line 33:
After "channel", insert --.-- therefor Column 24, Detailed Description, Line 53:
Delete "statin" and insert --station-- therefor Column 26, Detailed Description, Line 62:
Delete "MN" and insert --SN-- therefor Column 27, Detailed Description, Line 51:
Delete "RRM" and insert --RRC-- therefor Column 28, Detailed Description, Line 11:
Delete "OAM" and insert --QAM-- therefor Column 31, Detailed Description, Line 39:
Delete "1250," and insert --1240,-- therefor Column 32, Detailed Description, Line 23:
After "channel", insert --.-- therefor Column 38, Detailed Description, Line 11:
Delete "gNB-CU UE FLAP" and insert --gNB-CU UE F1AP-- therefor Column 38, Detailed Description, Line 11:
Delete "gNB-DU UE FLAP" and insert --gNB-DU UE F1AP-- therefor Column 39, Detailed Description, Line 6:
Delete "1602 CU" and insert --CU 1603-- therefor Column 39, Detailed Description, Line 7:
Delete "1603)." and insert --1602).-- therefor Column 47, Detailed Description, Line 17:
Delete "F1 AP" and insert --F1AP-- therefor Column 47, Detailed Description, Line 18:
Delete "F1 AP ID, old gNB-DU UE F1 AP" and insert --F1AP ID, old gNB-DU UE F1AP-- therefor Column 47, Detailed Description, Line 27:
Delete "16-13-B" and insert --1613-B-- therefor Column 47, Detailed Description, Line 62:
Delete "1693" and insert --1603-- therefor